United States Patent
Volkerink et al.

(10) Patent No.: US 12,047,841 B2
(45) Date of Patent: Jul. 23, 2024

(54) DETECTING SPECIAL EVENTS AND STRATEGICALLY IMPORTANT AREAS IN AN IOT TRACKING SYSTEM

(71) Applicant: Trackonomy Systems, Inc., San Jose, CA (US)

(72) Inventors: Hendrik J Volkerink, Palo Alto, CA (US); Ajay Khoche, West San Jose, CA (US)

( * ) Notice: Subject to any disclaimer, the term of this patent is extended or adjusted under 35 U.S.C. 154(b) by 0 days.

(21) Appl. No.: 17/547,193

(22) Filed: Dec. 9, 2021

(65) Prior Publication Data

US 2022/0167122 A1 May 26, 2022

Related U.S. Application Data

(63) Continuation-in-part of application No. 17/450,980, filed on Oct. 14, 2021, and a continuation-in-part of application No. 17/448,346, filed on Sep. 21, 2021.
(Continued)

(51) Int. Cl.
*H04W 4/029* (2018.01)
*G16Y 30/00* (2020.01)
(Continued)

(52) U.S. Cl.
CPC ............. *H04W 4/029* (2018.02); *G16Y 30/00* (2020.01); *H04B 17/318* (2015.01);
(Continued)

(58) Field of Classification Search
CPC ..... H04W 4/029; H04W 4/021; H04W 4/023; H04W 4/38; H04W 88/16; G16Y 30/00
See application file for complete search history.

(56) References Cited

U.S. PATENT DOCUMENTS

| 5,478,991 A | 12/1995 | Watanabe et al. |
| 5,495,250 A | 2/1996 | Ghaem et al. |

(Continued)

FOREIGN PATENT DOCUMENTS

| AU | 2018204317 A1 | 1/2019 |
| AU | 2018250358 A1 | 5/2019 |

(Continued)

OTHER PUBLICATIONS

PCT Application No. PCT/2022/024507, International Search Report and Written Opinion dated Aug. 16, 2022, 10 pages.
(Continued)

*Primary Examiner* — Jamara A Franklin

(57) ABSTRACT

A wireless sensing system uses heartbeat signals to monitor locations and usage information for assets. Heartbeat signals are signals transmitted periodically. However, in fast-paced environments, assets may move too quickly for heartbeat signals to provide useful information. In these and other scenarios, the wireless sensing system receives a first set of data describing signal strength between a tape node associated with an asset and a first node associated with a first portion of an area and a second set of data describing signal strength between the tape node associated with the asset and a second node associated with a second portion of the area. Based on relative signal strengths described by the received data, the wireless sensing system determines a path of the tape node associated with the asset.

19 Claims, 24 Drawing Sheets

Related U.S. Application Data

(60) Provisional application No. 63/257,987, filed on Oct. 20, 2021, provisional application No. 63/123,451, filed on Dec. 9, 2020, provisional application No. 63/091,635, filed on Oct. 14, 2020, provisional application No. 63/081,284, filed on Sep. 21, 2020.

(51) Int. Cl.
*H04B 17/318* (2015.01)
*H04W 4/02* (2018.01)
*H04W 4/021* (2018.01)
*H04W 4/38* (2018.01)
*H04W 88/16* (2009.01)

(52) U.S. Cl.
CPC ........... *H04W 4/021* (2013.01); *H04W 4/023* (2013.01); *H04W 4/38* (2018.02); *H04W 88/16* (2013.01)

(56) References Cited

U.S. PATENT DOCUMENTS

| | | | |
|---|---|---|---|
| 5,499,717 A | 3/1996 | Hayashi | |
| 5,838,253 A | 11/1998 | Wurz et al. | |
| 5,917,433 A | 6/1999 | Keillor et al. | |
| 6,372,342 B1 | 4/2002 | Karaoglu | |
| 6,375,780 B1 | 4/2002 | Tuttle et al. | |
| 6,404,341 B1 | 6/2002 | Reid | |
| 6,478,229 B1 * | 11/2002 | Epstein | G06K 19/0776 342/51 |
| 6,499,025 B1 | 12/2002 | Horvitz et al. | |
| 6,502,033 B1 | 12/2002 | Phuyal | |
| 6,502,082 B1 | 12/2002 | Toyama et al. | |
| 6,614,392 B2 | 9/2003 | Howard | |
| 6,919,803 B2 | 7/2005 | Breed | |
| 7,009,517 B2 | 3/2006 | Wood | |
| 7,020,701 B1 | 3/2006 | Gelvin et al. | |
| 7,048,194 B2 | 5/2006 | Minami et al. | |
| 7,177,054 B2 | 2/2007 | Silverbrook et al. | |
| 7,259,030 B2 | 8/2007 | Daniels et al. | |
| 7,299,990 B2 | 11/2007 | Hoshina | |
| 7,321,167 B2 | 1/2008 | Zhong et al. | |
| 7,405,656 B2 | 7/2008 | Olsen | |
| 7,511,616 B2 | 3/2009 | Lake | |
| 7,540,603 B2 | 6/2009 | Otsuki | |
| 7,646,336 B2 | 1/2010 | Tan et al. | |
| 7,722,249 B2 | 5/2010 | Kim et al. | |
| 7,756,639 B2 | 7/2010 | Colley et al. | |
| 7,838,844 B2 | 11/2010 | Wagner et al. | |
| 7,884,727 B2 | 2/2011 | Tran | |
| 8,062,735 B2 | 11/2011 | Bi et al. | |
| 8,072,620 B2 | 12/2011 | Yamamoto et al. | |
| 8,110,254 B1 | 2/2012 | Sharma et al. | |
| 8,171,791 B2 | 5/2012 | Sy et al. | |
| 8,269,633 B2 | 9/2012 | Hollander et al. | |
| 8,292,173 B2 | 10/2012 | Yturralde et al. | |
| 8,401,238 B2 | 3/2013 | Stahlin et al. | |
| 8,448,530 B2 | 5/2013 | Leuenberger et al. | |
| 8,658,455 B2 | 2/2014 | Shin et al. | |
| 8,716,629 B2 | 5/2014 | Klewer et al. | |
| 8,751,151 B2 | 6/2014 | Funk et al. | |
| 8,751,162 B1 | 6/2014 | Barbeau et al. | |
| 8,774,830 B2 | 7/2014 | Ziskind et al. | |
| 8,786,510 B2 | 7/2014 | Coleman et al. | |
| 8,833,664 B2 | 9/2014 | Choi | |
| 8,879,276 B2 | 11/2014 | Wang | |
| 8,971,673 B2 | 3/2015 | Beinhocker | |
| 9,015,071 B2 | 4/2015 | Breed | |
| 9,070,286 B2 | 6/2015 | Moore | |
| 9,075,141 B2 | 7/2015 | Syed et al. | |
| 9,137,637 B2 | 9/2015 | Bilal et al. | |
| 9,146,113 B1 | 9/2015 | Funk et al. | |
| 9,159,635 B2 | 10/2015 | Elolampi et al. | |
| 9,182,231 B2 | 11/2015 | Skaaksrud | |
| 9,183,738 B1 | 11/2015 | Allen, Sr. et al. | |
| 9,189,226 B2 | 11/2015 | Driesen et al. | |
| 9,372,123 B2 | 6/2016 | Li et al. | |
| 9,473,902 B2 | 10/2016 | Bilal et al. | |
| 9,496,582 B1 | 11/2016 | Lim et al. | |
| 9,534,908 B2 | 1/2017 | Kitchel et al. | |
| 9,543,495 B2 | 1/2017 | Paschkewitz et al. | |
| 9,543,549 B2 | 1/2017 | Bai et al. | |
| 9,583,428 B2 | 2/2017 | Rafferty et al. | |
| 9,632,050 B2 | 4/2017 | Zhong et al. | |
| 9,643,460 B2 | 5/2017 | Peine et al. | |
| 9,644,401 B2 | 5/2017 | Nguyen et al. | |
| 9,664,521 B2 | 5/2017 | Funk et al. | |
| 9,684,081 B2 | 6/2017 | Giurgiu et al. | |
| 9,693,689 B2 | 7/2017 | Gannon et al. | |
| 9,753,568 B2 | 9/2017 | McMillen | |
| 9,766,344 B2 | 9/2017 | Ichinokawa | |
| 9,766,349 B1 | 9/2017 | Madhow et al. | |
| 9,781,825 B2 | 10/2017 | Farkas et al. | |
| 9,824,329 B2 | 11/2017 | Stirling et al. | |
| 9,860,688 B2 | 1/2018 | Kulkarni et al. | |
| 10,885,420 B2 | 1/2021 | Khoche | |
| 11,115,732 B2 | 9/2021 | Lucrecio et al. | |
| 2002/0193940 A1 | 12/2002 | Hashida | |
| 2003/0000128 A1 | 1/2003 | Wood et al. | |
| 2003/0018927 A1 | 1/2003 | Gadir et al. | |
| 2004/0044493 A1 | 3/2004 | Coulthard | |
| 2004/0075606 A1 | 4/2004 | Laiho et al. | |
| 2004/0131761 A1 | 7/2004 | Shakespeare | |
| 2006/0100299 A1 | 5/2006 | Malik et al. | |
| 2006/0281473 A1 | 12/2006 | Debany et al. | |
| 2007/0010940 A1 | 1/2007 | Tan et al. | |
| 2007/0049291 A1 | 3/2007 | Kim et al. | |
| 2007/0095905 A1 | 5/2007 | Kadaba | |
| 2007/0247316 A1 | 10/2007 | Wildman et al. | |
| 2007/0287473 A1 | 12/2007 | Dupray | |
| 2008/0079567 A1 | 4/2008 | Poor | |
| 2008/0082254 A1 | 4/2008 | Huhtala et al. | |
| 2008/0184795 A1 | 8/2008 | Woodard | |
| 2008/0198002 A1 | 8/2008 | Bartholf et al. | |
| 2008/0239282 A1 | 10/2008 | Zou et al. | |
| 2009/0009327 A1 | 1/2009 | Amidi | |
| 2009/0051530 A1 | 2/2009 | Brooks et al. | |
| 2009/0072974 A1 | 3/2009 | Miyashita et al. | |
| 2009/0174600 A1 | 7/2009 | Mazlum et al. | |
| 2009/0192709 A1 | 7/2009 | Yonker et al. | |
| 2009/0196267 A1 | 8/2009 | Walker, Sr. | |
| 2009/0280827 A1 | 11/2009 | Michaud | |
| 2009/0326809 A1 | 12/2009 | Colley et al. | |
| 2010/0082870 A1 | 4/2010 | Tokuhara | |
| 2010/0096181 A1 | 4/2010 | Nakamura et al. | |
| 2010/0180701 A1 | 7/2010 | Daniel et al. | |
| 2010/0201519 A1 | 8/2010 | Dagher et al. | |
| 2010/0230498 A1 | 9/2010 | Atherton | |
| 2010/0299401 A1 | 11/2010 | Lloyd | |
| 2011/0054979 A1 | 3/2011 | Cova et al. | |
| 2011/0110242 A1 | 5/2011 | Nixon et al. | |
| 2011/0192465 A1 | 8/2011 | Collings | |
| 2011/0251469 A1 | 10/2011 | Varadan | |
| 2011/0313648 A1 | 12/2011 | Newson et al. | |
| 2012/0161958 A1 | 6/2012 | Turon et al. | |
| 2012/0271540 A1 | 10/2012 | Miksa et al. | |
| 2012/0278676 A1 | 11/2012 | Teraura | |
| 2013/0039239 A1 | 2/2013 | Lin | |
| 2013/0107770 A1 | 5/2013 | Marsden et al. | |
| 2013/0131980 A1 | 5/2013 | Ginsberg | |
| 2013/0250357 A1 | 9/2013 | Yu | |
| 2013/0332064 A1 | 12/2013 | Funk et al. | |
| 2014/0014403 A1 | 1/2014 | Miller et al. | |
| 2014/0058661 A1 | 2/2014 | Choi et al. | |
| 2014/0172293 A1 | 6/2014 | Chang et al. | |
| 2014/0240088 A1 | 8/2014 | Robinette et al. | |
| 2014/0265915 A1 | 9/2014 | Huang et al. | |
| 2014/0268780 A1 | 9/2014 | Wang et al. | |
| 2014/0274139 A1 | 9/2014 | Bilal et al. | |
| 2014/0317406 A1 | 10/2014 | Lewis et al. | |
| 2015/0034635 A1 | 2/2015 | Dagher et al. | |
| 2015/0149073 A1 | 5/2015 | Ishigami et al. | |
| 2015/0154531 A1 | 6/2015 | Skaaksrud | |

(56) References Cited

U.S. PATENT DOCUMENTS

| | | |
|---|---|---|
| 2015/0230058 A1 | 8/2015 | Cho et al. |
| 2015/0285636 A1 | 10/2015 | Funk et al. |
| 2015/0324745 A1 | 11/2015 | Goodall et al. |
| 2015/0347959 A1 | 12/2015 | Skaaksrud |
| 2015/0349667 A1 | 12/2015 | Andosca et al. |
| 2015/0354973 A1 | 12/2015 | Wang et al. |
| 2015/0382154 A1 | 12/2015 | Bilal et al. |
| 2016/0011074 A1 | 1/2016 | Mian et al. |
| 2016/0026213 A1 | 1/2016 | Li et al. |
| 2016/0109583 A1 | 4/2016 | Willis |
| 2016/0110085 A1 | 4/2016 | Barton et al. |
| 2016/0147353 A1 | 5/2016 | Filiz et al. |
| 2016/0188181 A1 | 6/2016 | Smith |
| 2016/0205509 A1 | 7/2016 | Hopcraft et al. |
| 2016/0233927 A1 | 8/2016 | Wu |
| 2016/0239801 A1 | 8/2016 | Burch, V et al. |
| 2016/0269533 A1 | 9/2016 | Taylor et al. |
| 2016/0270215 A1 | 9/2016 | Goto |
| 2016/0358444 A1 | 12/2016 | Lundy |
| 2016/0370210 A1 | 12/2016 | Kapusta et al. |
| 2016/0377440 A1 | 12/2016 | Dorum |
| 2017/0010363 A1 | 1/2017 | Friend |
| 2017/0017872 A1 | 1/2017 | Kato et al. |
| 2017/0025547 A1 | 1/2017 | Cho et al. |
| 2017/0039666 A1 | 2/2017 | Kuersten et al. |
| 2017/0074659 A1 | 3/2017 | Giurgiu et al. |
| 2017/0079144 A1 | 3/2017 | Coleman et al. |
| 2017/0089717 A1 | 3/2017 | White et al. |
| 2017/0161679 A1 | 6/2017 | Stingel et al. |
| 2017/0219351 A1 | 8/2017 | Hamilton et al. |
| 2017/0337405 A1 | 11/2017 | Schutz |
| 2018/0003507 A1 | 1/2018 | Arslan et al. |
| 2018/0046964 A1 | 2/2018 | Leoni et al. |
| 2018/0104609 A1 | 4/2018 | Musliner |
| 2018/0165568 A1 | 6/2018 | Khoche |
| 2018/0190096 A1 | 7/2018 | Lundy |
| 2019/0037362 A1 | 1/2019 | Nogueira-Nine |
| 2019/0041836 A1 | 2/2019 | Cella et al. |
| 2019/0066036 A1 | 2/2019 | Roisen et al. |
| 2019/0250653 A1 | 8/2019 | Conlon |
| 2019/0265082 A1 | 8/2019 | Zafar et al. |
| 2020/0051007 A1 | 2/2020 | Huberman et al. |
| 2020/0072485 A1 | 3/2020 | LaPalme |
| 2020/0098238 A1 | 3/2020 | Skaaksrud |
| 2020/0100115 A1 | 3/2020 | Skaaksrud |
| 2020/0275369 A1 | 8/2020 | Foster et al. |
| 2021/0020012 A1 | 1/2021 | Shakedd |
| 2021/0027122 A1 | 1/2021 | Volkerink et al. |
| 2022/0100263 A1 | 3/2022 | Nagar et al. |

FOREIGN PATENT DOCUMENTS

| | | |
|---|---|---|
| CA | 3 061 878 A1 | 11/2018 |
| CA | 3 008 512 A1 | 12/2018 |
| EP | 1786143 A2 | 5/2007 |
| JP | 2008239282 A | 10/2008 |
| JP | 2009230500 A | 10/2009 |
| JP | 2011090670 A | 5/2011 |
| JP | 2012141995 A | 7/2012 |
| WO | WO 2014195756 A1 | 12/2014 |
| WO | WO 2016120628 | 8/2016 |
| WO | WO 2017046699 A1 | 3/2017 |
| WO | WO 2017100707 A3 | 7/2017 |

OTHER PUBLICATIONS

Dementyev, SensorTape: Modular and Programmable 3D-Aware Dense Sensor Network on a Tape, In Proc. of UIST 2015.
Pyo et al., Development of a Map Matching Method Using the Multiple Hypothesis Technique, 2001 IEEE.
Liu, Survey of Wireless Based Indoor Localization Technologies, arXiV:1709.01015v2 [cs.NI] Mar. 14, 2018.
Cheung et al., Least Squares Algorithms for Time-of-Arrival-Based Mobile Location, IEEE Transactions on Signal Processing, vol. 52, No. 4, Apr. 2004, pp. 1121-1128.
Frazier et al., Fully-Drawn Carbon-Based Chemical Sensors on Organic and Inorganic Surfaces, Lab Chip. Oct. 21, 2014; 14(20): 4059-4066. doi:10.1039/c4lc00864b.
Alsheikh et al., Machine Learning in Wireless Sensor Networks: Algorithms, Strategies, and Applications, arXiv:1405.4463v2 [cs.NI] Mar. 19, 2015.
Gong et al., Low-Cost Sensor Tape for Environment Sensing Based on Roll-to-Roll Manufacturing Process, In Proc. of IEEE Sensors 2012, 4 pages.
Olyazadeh, Least Square Approach on Indoor Positioning Measurement Techniques, 2012.
Zhang et al., Deep Neural Networks for Wireless Localization in Indoor and Outdoor Environments, Neurocomputing 194 (2016), pp. 279-287.
A. Celmins, Multidimensional Least-Squares Fitting of Fuzzy Models, Math Modelling, vol. 9. No. 9, pp. 669-690, 1987.
Fischer, "Selecting the length of a principal curve within a Gaussian model," Electronic Journal of Statistics, vol. 7 (2013) 342-363, Jan. 2013.
Krach et al., "Integration of Foot-Mounted Inertial Sensors into a Bayesian Location Estimation Framework," Proceedings of the 5th Workshop on Positioning, Navigation and Communication 2008 (WPNC'08), pp. 55-61.
C. Fouque et al., "Tightly-coupled GIS data in GNSS fix computations with integrity testing," Int. J. Intelligent Information and Database Systems, vol. 2, No. 2, 2008, pp. 167-186.
Brunsdon, "Path Estimation from GPS Tracks," Department of Geography. University of Leicester. University Road, Leicester LE1 7RU, pp. 1-9, 2007.
Scott, "Improved GPS Positioning for Motor Vehicles Through Map Matching," University of Technology, Sydney, ION-94, Salt Palace Convention Center, Salt Lake City, Utah, Sep. 20-23, 1994.
Einbeck et al. "Exploring multivariate data structures with local principal curves", in Proceedings of the 28th Annual Conference of the Gesellschaft fur Klassikation, Mar. 9-11, 2004, University of Dortmund. Heidelberg: Springer-Verlag, pp. 256-263.
Blewitt et al., "Mapping Dilution of Precision (MDOP) and map-matched GPS," Int. J. Geographical Information Science, 2002, vol. 16, No. 1, 55-67.
Biau et al., "Parameter Selection for Principal Curves" IEEE Transactions on Information Theory, vol. 58, No. 3, Mar. 2012, 16 pages.
Rabe et al, "Lane-level map-matching based on optimization" 2016 IEEE 19th International Conference on Intelligent Transportation Systems (ITSC), Windsor Oceanico Hotel, Rio de Janeiro, Brazil, Nov. 1-4, 2016.
Bierlaire et al., "A method of probabilistic map distribution of path likelihood," STRC 2009, 9th Swiss Transport Research Conference, Sep. 2009, pp. 1-13.
Quddus et al., "Current map-matching algorithms for transport applications: State-of-the art and future research directions," Transportation Research Part C: Emerging Technologies, vol. 15, Issue 5, Oct. 2007, pp. 312-328.
International Search Report and Written Opinion dated Mar. 29, 2019, in International Application No. PCT/US2018/064859, filed Dec. 11, 2018.
International Patent Application No. PCT/2021/053437, International Search Report and Written Opinion dated Jan. 11, 2022, 11 pages.
Daniel K. Griffin et al., Adhesive RFID Sensor Patch for Monitoring of Sweat Electrolytes, in IEEE transactions on bio-medical engineering—Nov. 2014.
Farooqui et al., "A paper based ink jet printed real time location tracking TAG," 2013 IEEE MTT-S International Microwave Symposium Digest (MTT).
Wimmer et al., Modular and deformable touch-sensitive surfaces based on time domain reflectometry, UIST 11 Proceedings of the 24th annual ACM symposium on User interface software and technology, pp. 517-526, Santa Barbara, California, USA—Oct. 16-19, 2011.

(56) References Cited

OTHER PUBLICATIONS

Olberding et al., A cuttable multi-touch sensor, Proceeding UIST '13 Proceedings of the 26th annual ACM symposium on User interface software and technology pp. 245-254, St. Andrews, Scotland, United Kingdom—Oct. 8-11, 2013.
Shen et al., "A mobility framework to improve heterogeneous wireless network services," Inderscience Enterprises Ltd., 2011.
International Application No. PCT/US2019/042488 International Search Report and Written Opinion dated Nov. 5, 2019.
Iacono, Wireless Sensor Network Protocols, Universidad De Mendoza, Argentina, 2011.
M.A. Matin et al., Overview of Wireless Sensor Network, Intech, 2012 (http://dx.doi.org/10.5772/49376.1).
Cimino et al., "Wireless communication, identification, and sensing technologies enabling integrated logistics: a study in the harbor environment," Research Gate, Oct. 2015 (https://www.researchgate. net/publication/283117890_Wireless_communicatio-n_identification_ and_sensing_technologies_enabling_integrated_logistics_a_-study_ in_the_harbor_environment).
International Application No. PCT/US2018/064919 International Search Report and Written Opinion dated Apr. 5, 2019, 7 pages.
Roundy et al., Energy Harvester for Rotating Environments Using Offset Pendulum and Nonlinear Dynamics, Smart Materials and Structures, IOP Publishing Ltd, Sep. 9, 2014.
Ku et al., Joint Power Waveforming and Beamforming for Wireless Power Transfer, IEEE Transactions on Signal Jrocessing, vol. 65, No. 24, Dec. 15, 2017, p. 6409.
International Patent Application No. PCT/US2021/062712 International Search Report and Written Opinion dated May 23, 2022, 10 pages.
U.S. Appl. No. 17/449,934 Notice of Allowance dated Jun. 14, 2022, 10 pages.

* cited by examiner

DETECTING SPECIAL EVENTS AND STRATEGICALLY IMPORTANT AREAS IN AN IOT TRACKING SYSTEM

CROSS-REFERENCE TO RELATED APPLICATIONS

This application claims priority to U.S. Provisional Patent Application 63/123,451, filed on Dec. 9, 2020, and to U.S. Provisional Patent Application 63/257,987, filed on Oct. 20, 2021, all of which are hereby incorporated in their entirety. This application is a continuation-in-part of U.S. Nonprovisional patent application Ser. No. 17/450,980, filed on Oct. 14, 2021, which claims priority to U.S. Provisional Patent Application No. 63/091,635, filed on Oct. 14, 2020, all of which are hereby incorporated in their entirety. This application is a continuation-in-part of U.S. Nonprovisional patent application Ser. No. 17/448,346, filed on Sep. 21, 2021, which claims priority to U.S. Provisional Patent Application No. 63/081,284, filed on Sep. 21, 2020, all of which are hereby incorporated in their entirety.

FIELD OF THE DISCLOSURE

The disclosure generally relates to asset management and more particularly to tracking assets using Internet of Things (IOT) devices.

BACKGROUND

In fast-paced environments such as hospitals, assets may be moved frequently throughout buildings, wards, or other sections of an area. It is valuable to track assets as movement occurs in order to ensure that assets are accounted for, e.g., are not lost or misrepresented as being in or out of use. In some cases, tracking devices may be used to track assets in an environment. However, because assets may be moved quickly and unpredictably, there are difficulties in optimizing power usage and accurate data collection for asset tracking, particularly in areas where assets are moving frequently or at high speeds.

SUMMARY

In an aspect, a wireless sensing system uses heartbeat signals to monitor locations and usage information for assets. Heartbeat signals are low-power signals transmitted periodically by nodes of the wireless sensing system associated with assets, e.g., tape nodes adhered or affixed to machines or items. For most applications, heartbeat signals are transmitted infrequently, e.g., once a day, once an hour. However, in fast-paced environments such as hospitals, it is possible for assets to be moved too quickly for heartbeat signals to provide useful information. For example, an asset such as a bed loaded onto an ambulance may be moved too quickly for the wireless sensing system to accurately receive data corresponding to the movement. While increasing the frequency of the heartbeat signals, e.g., a heartbeat per second, may accommodate fast-moving assets, high frequency heartbeats drains battery life of tape nodes.

In an embodiment, a wireless sensing system deploys one or more sets of gateway nodes through a building or area of interest to detect assets moving through gates, into or through areas, or past areas. Gates may be, for example, doorways, hallways, or other threshold areas. In an embodiment, a direction of movement through a gate may be used by the wireless sensing system to approximate a likely location for the asset. For example, an asset moving through an external loading door of a hospital is tagged by the wireless sensing system as most likely being loaded onto an ambulance. The one or more sets of gateway nodes are configured to receive heartbeat signals from tape nodes associated with assets and to determine, based on the respective signal strengths of the heartbeat signals, a direction of movement for assets.

In some embodiments, the one or more sets of gateway nodes are deployed in locations throughout a building or area of interest based on structural thresholds. For example, a first node of a set of gateway nodes is deployed on a front wall of a room and a second node of the set of gateway nodes is deployed on a back wall of the room, enabling the wireless sensing system to ensure that an asset is accurately tracked as passing through the door. The wireless sensing system determines based on relative signal strengths of communications received by the first node and the second node whether tape nodes associated with mobile assets have entered, moved through, or passed the room. In some examples, a node of a set of gateway nodes deployed inside of a room is further configured to conduct a check for an asset being within a room to confirm that the asset has moved through a doorway threshold.

In an embodiment, the wireless sensing system trains and applies a machine learned model. The machine learned model is trained to receive as input one or more signals associated with one or more signal strengths and to output a most likely direction of movement for an asset. For example, the machine learned model outputs a label identifying a direction (e.g., north, south, west, east), a name of a corresponding location (e.g., ambulance loading area, storage room, etc.), or the like.

In an embodiment, the wireless sensing system applies one or more clustering algorithms to data gathered describing movement of a plurality of assets through a building or other area of interest to determine strategically important zones. Strategically important zones may be, for example, areas wherein assets are likely to experience particular events (e.g., unloading or loading zones), areas wherein tape nodes associated with assets should enter a specific mode or initiate a specific mode of communication, and the like. In some embodiments, strategically important zones are delineated by geofences surrounding the strategically important zones. The wireless sensing system may determine appropriate geofences based on the clustering algorithms (e.g., automatically determining an appropriate size and shape of the strategically important zone based on historic movement of assets through or around the strategically important zone) or may request information describing strategically important zones from users of the wireless sensing system.

Responsive to identifying a strategically important zone, the wireless sensing system may transmit instructions to tape nodes based at least in part on proximity of the tape nodes to strategically important zones. For example, the wireless sensing system transmits instructions to tape nodes to identify certain contexts or locations in which a higher frequency heartbeat signal is required in order to optimize battery life while ensuring that adequate information is provided for each tape node. Because shorter range communications are more battery-efficient than longer range communications, it is beneficial for tape nodes to communicate heartbeat signals to gateway nodes when in short range. In an embodiment, gateway nodes are deployed to transmit leading indicator signals to other nodes of the system (e.g., tape nodes, gateway nodes, client devices, etc.) throughout a building or area of interest or around a strategically important zone. In response to receiving a leading indicator signal, tape nodes may increase a frequency of transmission for a heartbeat signal corresponding to the tape nodes approaching a gate or strategically important zone. For example, a gateway node is located at an entrance of a loading zone and transmits the leading indicator signal to tape nodes within the loading zone. In response, the tape nodes increase a frequency of heartbeat signal transmission as the tape nodes move towards a threshold door. In another example, one or more gateway nodes are located at conveyer belts and are configured to instruct tape nodes on the conveyer belt to increase a frequency of heartbeat signals within a threshold amount of time (e.g., increase heartbeat signal in 5 minutes).

In other embodiments, the gateway node may provide other or additional instructions to a tape node responsive to the tape node approaching or leaving a strategically important zone. For example, the gateway node may additionally instruct a tape node to increase or decrease an amount of sensor data collection, to increase or decrease an amount of data transmittal, to modify a means or channel for communication, to establish or disconnect to another entity of the wireless sensing system, and the like. In another example, the gateway node may instruct a tape node to decrease or reduce a frequency of heartbeat pings or other communications, e.g., at the threshold to a long-term storage room in which it is unlikely to be moved and, as such, can reduce communications to preserve battery life.

A method for determining direction of movement of assets through gates is also disclosed herein. A first node of a wireless sensing system receives a first set of data from a tape node associated with the mobile asset. The first set of data describes signal strength of communication between the tape node and the first node. A second node of the wireless sensing system receives a second set of data from the tape node associated with the mobile asset. The second set of data describes signal strength of communication between the tape node and the second node. The wireless sensing system compares the first and second sets of data and determines a path of the tape node associated with the mobile asset. In some embodiments, for example, the wireless sensing system compares relative times of peak signal strength for the first node and the second node. Based on the relative times of peak signal strength and known locations of the first node and the second node, the wireless sensing system determines the path of the tape node associated with the mobile asset.

Embodiments of the subject matter described in this specification include methods, processes, systems, apparatus, and tangible non-transitory carrier media encoded with one or more program instructions for carrying out one or more methods and processes for enabling the various functionalities of the described systems and apparatus.

Other features, aspects, objects, and advantages of the subject matter described in this specification will become apparent from the description, the drawings, and the claims.

DETAILED DESCRIPTION

Figure 1A:
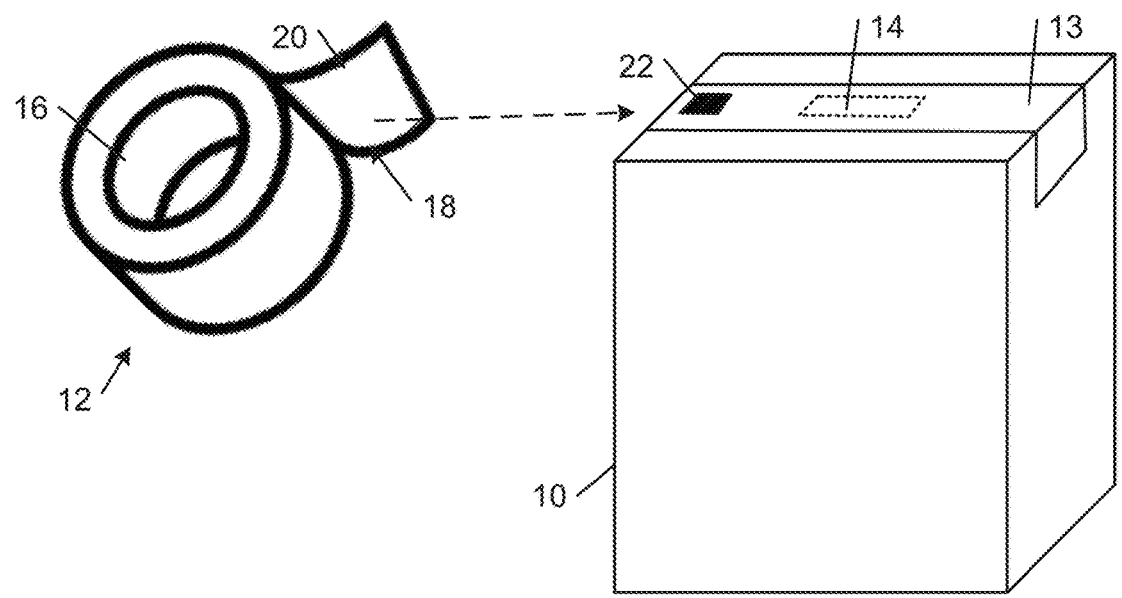
FIG. 1A is a diagrammatic view of an asset that has been sealed for shipment using a segment of an example adhesive tape platform dispensed from a roll, according to some embodiments.

In an aspect, a wireless sensing system uses heartbeat signals to monitor locations and usage information for assets. Heartbeat signals are low-power signals transmitted periodically by nodes of the wireless sensing system associated with assets, e.g., tape nodes adhered or affixed to machines or items. For most applications, heartbeat signals are transmitted infrequently, e.g., once a day, once an hour. However, in fast-paced environments such as hospitals, it is possible for assets to be moved too quickly for heartbeat signals to provide useful information. For example, an asset such as a bed loaded onto an ambulance may be moved too quickly for the wireless sensing system to accurately receive data corresponding to the movement. While increasing the frequency of the heartbeat signals, e.g., a heartbeat per second, may accommodate fast-moving assets, high frequency heartbeats drains battery life of tape nodes.

In an embodiment, a wireless sensing system deploys one or more sets of gateway nodes through a building or area of interest to detect assets moving through gates, into or through areas, or past areas. Gates may be, for example, doorways, hallways, or other threshold areas. In an embodiment, a direction of movement through a gate may be used by the wireless sensing system to approximate a likely location for the asset. For example, an asset moving through an external loading door of a hospital is tagged by the wireless sensing system as most likely being loaded onto an ambulance. The one or more sets of gateway nodes are configured to receive heartbeat signals from tape nodes associated with assets and to determine, based on the respective signal strengths of the heartbeat signals, a direction of movement for assets.

In some embodiments, the one or more sets of gateway nodes are deployed in locations throughout a building or area of interest based on structural thresholds. For example, a first node of a set of gateway nodes is deployed on a front wall of a room and a second node of the set of gateway nodes is deployed on a back wall of the room, enabling the wireless sensing system to ensure that an asset is accurately tracked as passing through the door. The wireless sensing system determines based on relative signal strengths of communications received by the first node and the second node whether tape nodes associated with mobile assets have entered, moved through, or passed the room. In some examples, a node of a set of gateway nodes deployed inside of a room is further configured to conduct a check for an asset being within a room to confirm that the asset has moved through a doorway threshold.

In an embodiment, the wireless sensing system trains and applies a machine learned model. The machine learned model is trained to receive as input one or more signals associated with one or more signal strengths and to output a most likely direction of movement for an asset. For example, the machine learned model outputs a label identifying a direction (e.g., north, south, west, east), a name of a corresponding location (e.g., ambulance loading area, storage room, etc.), or the like.

In an embodiment, the wireless sensing system applies one or more clustering algorithms to data gathered describing movement of a plurality of assets through a building or other area of interest to determine strategically important zones. Strategically important zones may be, for example, areas wherein assets are likely to experience particular events (e.g., unloading or loading zones), areas wherein tape nodes associated with assets should enter a specific mode or initiate a specific mode of communication, and the like. In some embodiments, strategically important zones are delineated by geofences surrounding the strategically important zones. The wireless sensing system may determine appropriate geofences based on the clustering algorithms (e.g., automatically determining an appropriate size and shape of the strategically important zone based on historic movement of assets through or around the strategically important zone) or may request information describing strategically important zones from users of the wireless sensing system.

Responsive to identifying a strategically important zone, the wireless sensing system may transmit instructions to tape nodes based at least in part on proximity of the tape nodes to strategically important zones. For example, the wireless sensing system transmits instructions to tape nodes to identify certain contexts or locations in which a higher frequency heartbeat signal is required in order to optimize battery life while ensuring that adequate information is provided for each tape node. Because shorter range communications are more battery-efficient than longer range communications, it is beneficial for tape nodes to communicate heartbeat signals to gateway nodes when in short range. In an embodiment, gateway nodes are deployed to transmit leading indicator signals to other nodes of the system (e.g., tape nodes, gateway nodes, client devices, etc.) throughout a building or area of interest or around a strategically important zone. In response to receiving a leading indicator signal, tape nodes may increase a frequency of transmission for a heartbeat signal corresponding to the tape nodes approaching a gate or strategically important zone. For example, a gateway node is located at an entrance of a loading zone and transmits the leading indicator signal to tape nodes within the loading zone. In response, the tape nodes increase a frequency of heartbeat signal transmission as the tape nodes move towards a threshold door. In another example, one or more gateway nodes are located at conveyer belts and are configured to instruct tape nodes on the conveyer belt to increase a frequency of heartbeat signals within a threshold amount of time (e.g., increase heartbeat signal in 5 minutes).

In other embodiments, the gateway node may provide other or additional instructions to a tape node responsive to the tape node approaching or leaving a strategically important zone. For example, the gateway node may additionally instruct a tape node to increase or decrease an amount of sensor data collection, to increase or decrease an amount of data transmittal, to modify a means or channel for communication, to establish or disconnect to another entity of the wireless sensing system, and the like. In another example, the gateway node may instruct a tape node to decrease or reduce a frequency of heartbeat pings or other communications, e.g., at the threshold to a long-term storage room in which it is unlikely to be moved and, as such, can reduce communications to preserve battery life.

A method for determining direction of movement of assets through gates is also disclosed herein. A first node of a wireless sensing system receives a first set of data from a tape node associated with the mobile asset. The first set of data describes signal strength of communication between the tape node and the first node. A second node of the wireless sensing system receives a second set of data from the tape node associated with the mobile asset. The second set of data describes signal strength of communication between the tape node and the second node. The wireless sensing system compares the first and second sets of data and determines a path of the tape node associated with the mobile asset. In some embodiments, for example, the wireless sensing system compares relative times of peak signal strength for the first node and the second node. Based on the relative times of peak signal strength and known locations of the first node and the second node, the wireless sensing system determines the path of the tape node associated with the mobile asset.

Embodiments of the subject matter described in this specification include methods, processes, systems, apparatus, and tangible non-transitory carrier media encoded with one or more program instructions for carrying out one or more methods and processes for enabling the various functionalities of the described systems and apparatus.

Other features, aspects, objects, and advantages of the subject matter described in this specification will become apparent from the description, the drawings, and the claims.

In some embodiments, the wireless IOT device is an adhesive tape platform or a segment thereof. The adhesive tape platform includes wireless transducing components and circuitry that perform communication and/or sensing. The adhesive tape platform has a flexible adhesive tape form-factor that allows it to function as both an adhesive tape for adhering to and/or sealing objects and a wireless sensing device.

In the following description, like reference numbers are used to identify like elements. Furthermore, the drawings are intended to illustrate major features of exemplary embodiments in a diagrammatic manner. The drawings are not intended to depict every feature of actual embodiments nor relative dimensions of the depicted elements and are not drawn to scale.

As used herein, the term "or" refers to an inclusive "or" rather than an exclusive "or." In addition, the articles "a" and "an" as used in the specification and claims mean "one or more" unless specified otherwise or clear from the context to refer the singular form.

The term "tape node" refers to an adhesive tape platform or a segment thereof that is equipped with sensor, processor, memory, energy source/harvesting mechanism, and wireless communications functionality, where the adhesive tape platform (also referred to herein as an "adhesive product" or an "adhesive tape product") has a variety of different form factors, including a multilayer roll or a sheet that includes a plurality of divisible adhesive segments. Once deployed, each tape node can function, for example, as an adhesive tape, label, sticker, decal, or the like, and as a wireless communications device.

The terms "adhesive tape node," "wireless node," or "tape node" may be used interchangeably in certain contexts, and refer to an adhesive tape platform or a segment thereof that is equipped with sensor, processor, memory, energy source/harvesting mechanism, and wireless communications functionality, where the adhesive product has a variety of different form factors, including a multilayer roll or a sheet that includes a plurality of divisible adhesive segments. Once deployed, each tape node or wireless node can function, for example, as an adhesive tape, label, sticker, decal, or the like, and as a wireless communications device. A "peripheral" tape node or wireless node, also referred to as an outer node, leaf node, or terminal node, refers to a node that does not have any child nodes.

In certain contexts, the terms "parcel," "envelope," "box," "package," "container," "pallet," "carton," "wrapping," and the like are used interchangeably herein to refer to a packaged item or items.

In certain contexts, the terms "wireless tracking system," "hierarchical communications network," "distributed agent operating system," and the like are used interchangeably herein to refer to a system or network of wireless nodes.

Introduction

This specification describes a low-cost, multi-function adhesive tape platform with a form factor that unobtrusively integrates the components useful for implementing a combination of different asset tracking and management functions and also is able to perform a useful ancillary function that otherwise would have to be performed with the attendant need for additional materials, labor, and expense. In an aspect, the adhesive tape platform is implemented as a collection of adhesive products that integrate wireless communications and sensing components within a flexible adhesive structure in a way that not only provides a cost-effective platform for interconnecting, optimizing, and protecting the components of the tracking system but also maintains the flexibility needed to function as an adhesive product that can be deployed seamlessly and unobtrusively into various asset management and tracking applications and workflows, including person and object tracking applications, and asset management workflows such as manufacturing, storage, shipping, delivery, and other logistics associated with moving products and other physical objects, including logistics, sensing, tracking, locationing, warehousing, parking, safety, construction, event detection, road management and infrastructure, security, and healthcare. In some examples, the adhesive tape platforms are used in various aspects of asset management, including sealing assets, transporting assets, tracking assets, monitoring the conditions of assets, inventorying assets, and verifying asset security. In these examples, the assets typically are transported from one location to another by truck, train, ship, or aircraft or within premises, e.g., warehouses by forklift, trolleys etc.

In disclosed examples, an adhesive tape platform includes a plurality of segments that can be separated from the adhesive product (e.g., by cutting, tearing, peeling, or the like) and adhesively attached to a variety of different surfaces to inconspicuously implement any of a wide variety of different wireless communications based network communications and transducing (e.g., sensing, actuating, etc.) applications. Examples of such applications include: event detection applications, monitoring applications, security applications, notification applications, and tracking applications, including inventory tracking, asset tracking, person tracking, animal (e.g., pet) tracking, manufactured parts tracking, and vehicle tracking. In example embodiments, each segment of an adhesive tape platform is equipped with an energy source, wireless communication functionality, transducing functionality, and processing functionality that enable the segment to perform one or more transducing functions and report the results to a remote server or other computer system directly or through a network of tapes. The components of the adhesive tape platform are encapsulated within a flexible adhesive structure that protects the components from damage while maintaining the flexibility needed to function as an adhesive tape (e.g., duct tape or a label) for use in various applications and workflows. In addition to single function applications, example embodiments also include multiple transducers (e.g., sensing and/or actuating transducers) that extend the utility of the platform by, for example, providing supplemental information and functionality relating characteristics of the state and or environment of, for example, an article, object, vehicle, or person, over time.

Systems and processes for fabricating flexible multifunction adhesive tape platforms in efficient and low-cost ways also are described. In addition to using roll-to-roll and/or sheet-to-sheet manufacturing techniques, the fabrication systems and processes are configured to optimize the placement and integration of components within the flexible adhesive structure to achieve high flexibility and ruggedness. These fabrication systems and processes are able to create useful and reliable adhesive tape platforms that can provide local sensing, wireless transmitting, and locationing functionalities. Such functionality together with the low cost of production is expected to encourage the ubiquitous deployment of adhesive tape platform segments and thereby alleviate at least some of the problems arising from gaps in conventional infrastructure coverage that prevent continuous monitoring, event detection, security, tracking, and other asset tracking and management applications across heterogeneous environments.

Adhesive Tape Platform

FIG. 1A shows an example asset 10 that is sealed for shipment using an example adhesive tape platform 12 that includes embedded components of a wireless transducing circuit 14 (collectively referred to herein as a "tape node"). In this example, a length 13 of the adhesive tape platform 12 is dispensed from a roll 16 and affixed to the asset 10. The adhesive tape platform 12 includes an adhesive side 18 and a non-adhesive side 20. The adhesive tape platform 12 can be dispensed from the roll 16 in the same way as any conventional packing tape, shipping tape, or duct tape. For example, the adhesive tape platform 12 may be dispensed from the roll 16 by hand, laid across the seam where the two top flaps of the asset 10 meet, and cut to a suitable length either by hand or using a cutting instrument (e.g., scissors or an automated or manual tape dispenser). Examples of such tapes include tapes having non-adhesive sides 20 that carry one or more coatings or layers (e.g., colored, light reflective, light absorbing, and/or light emitting coatings or layers).

Figure 1B:
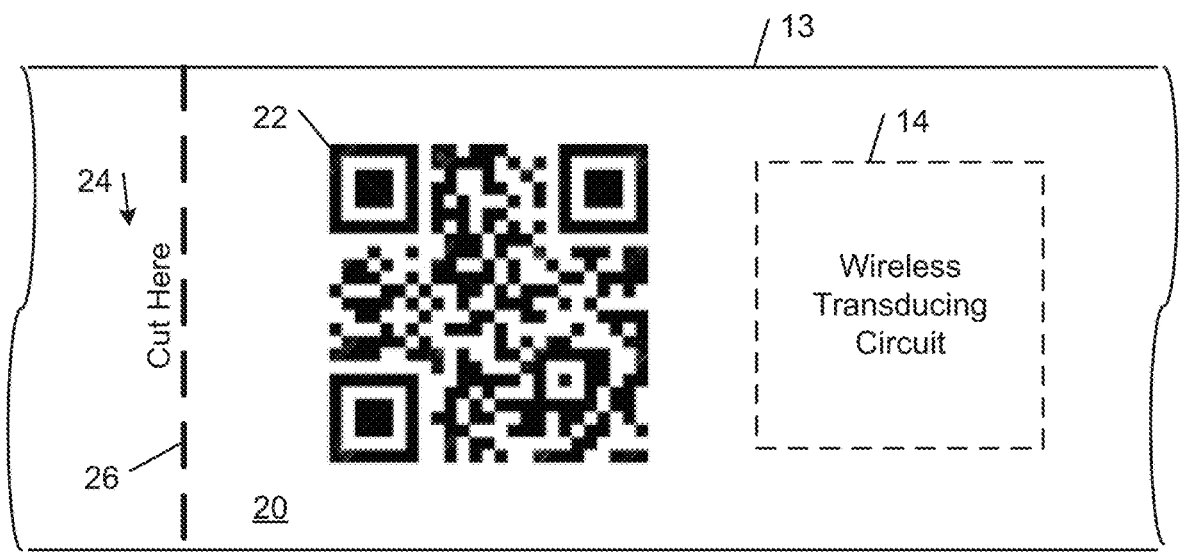
FIG. 1B is a diagrammatic top view of a portion of the segment of the example adhesive tape platform shown in FIG. 1A, according to some embodiments.

Referring to FIG. 1B, in some examples, the non-adhesive side 20 of the length 13 of the adhesive tape platform 12 includes writing or other markings that convey instructions, warnings, or other information to a person or machine (e.g., a bar code reader), or may simply be decorative and/or entertaining. For example, different types of adhesive tape platforms may be marked with distinctive colorations to distinguish one type of adhesive tape platform from another. In the illustrated example, the length 13 of the adhesive tape platform 12 includes a two-dimensional bar code (e.g., a QR Code) 22, written instructions 24 (i.e., "Cut Here"), and an associated cut line 26 that indicates where the user should cut the adhesive tape platform 12. The written instructions 24 and the cut line 26 typically are printed or otherwise marked on the top non-adhesive surface 20 of the adhesive tape platform 12 during manufacture. The two-dimensional bar code 22, on the other hand, may be marked on the non-adhesive surface 20 of the adhesive tape platform 12 during the manufacture of the adhesive product 12 or, alternatively, may be marked on the non-adhesive surface 20 of the adhesive tape platform 12 as needed using, for example, a printer or other marking device.

In order to avoid damage to the functionality of the segments of the adhesive tape platform 12, the cut lines 26 typically demarcate the boundaries between adjacent segments at locations that are free of any active components of the wireless transducing circuit 14. The spacing between the wireless transducing circuit components 14 and the cut lines 26 may vary depending on the intended communication, transducing and/or adhesive taping application. In the example illustrated in FIG. 1A, the length of the adhesive tape platform 12 that is dispensed to seal the asset 10 corresponds to a single segment of the adhesive tape platform 12. In other examples, the length of the adhesive tape platform 12 needed to seal a asset or otherwise serve the adhesive function for which the adhesive tape platform 12 is being applied may include multiple segments 13 of the adhesive tape platform 12, one or more of which segments 13 may be activated upon cutting the length of the adhesive tape platform 12 from the roll 16 and/or applying the length of the adhesive tape platform to the asset 10.

In some examples, the transducing components 14 that are embedded in one or more segments 13 of the adhesive tape platform 12 are activated when the adhesive tape platform 12 is cut along the cut line 26. In these examples, the adhesive tape platform 12 includes one or more embedded energy sources (e.g., thin film batteries, which may be printed, or conventional cell batteries, such as conventional watch style batteries, rechargeable batteries, or other energy storage device, such as a super capacitor or charge pump) that supply power to the transducing components 14 in one or more segments of the adhesive tape platform 12 in response to being separated from the adhesive tape platform 12 (e.g., along the cut line 26).

In some examples, each segment 13 of the adhesive tape platform 12 includes its own respective energy source including energy harvesting elements that can harvest energy from the environment. In some of these examples, each energy source is configured to only supply power to the components in its respective adhesive tape platform segment regardless of the number of contiguous segments 13 that are in a given length of the adhesive tape platform 12. In other examples, when a given length of the adhesive tape platform 12 includes multiple segments 13, the energy sources in the respective segments 13 are configured to supply power to the transducing components 14 in all of the segments 13 in the given length of the adhesive tape platform 12. In some of these examples, the energy sources are connected in parallel and concurrently activated to power the transducing components 14 in all of the segments 13 at the same time. In other examples, the energy sources are connected in parallel and alternately activated to power the transducing components 14 in respective ones of the adhesive tape platform segments 13 at different time periods, which may or may not overlap.

Figure 2:
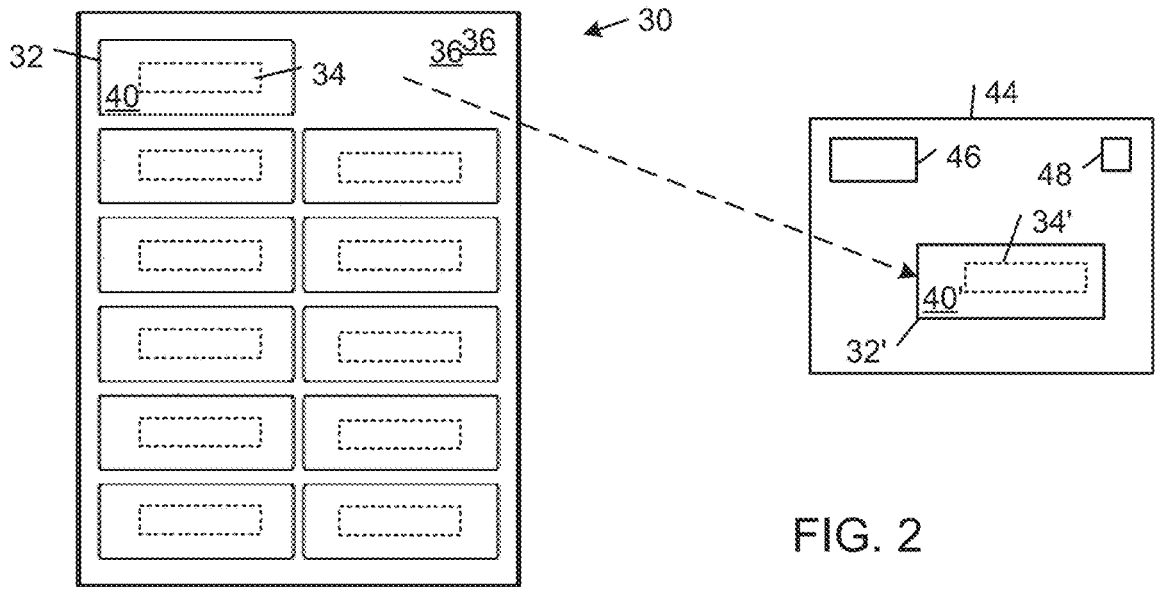
FIG. 2 is a diagrammatic view of an example of an envelope carrying a segment of an example adhesive tape platform dispensed from a backing sheet, according to some embodiments.

FIG. 2 shows an example adhesive tape platform 30 that includes a set of adhesive tape platform segments 32 each of which includes a respective set of embedded wireless transducing circuit components 34, and a backing sheet 36 with a release coating that prevents the adhesive segments 32 from adhering strongly to the backing sheet 36. Each adhesive tape platform segment 32 includes an adhesive side facing the backing sheet 36, and an opposing non-adhesive side 40. In this example, a particular segment 32' of the adhesive tape platform 30 has been removed from the backing sheet 36 and affixed to an envelope 44. Each segment 32 of the adhesive tape platform 30 can be removed from the backing sheet 36 in the same way that adhesive labels can be removed from a conventional sheet of adhesive labels (e.g., by manually peeling a segment 32 from the backing sheet 36). In general, the non-adhesive side 40' of the segment 32' may include any type of writing, markings, decorative designs, or other ornamentation. In the illustrated example, the non-adhesive side 40' of the segment 32' includes writing or other markings that correspond to a destination address for the envelope 44. The envelope 44 also includes a return address 46 and, optionally, a postage stamp or mark 48.

In some examples, segments of the adhesive tape platform 12 are deployed by a human operator. The human operator may be equipped with a mobile phone or other device that allows the operator to authenticate and initialize the adhesive tape platform 12. In addition, the operator can take a picture of a asset including the adhesive tape platform and any barcodes associated with the asset and, thereby, create a persistent record that links the adhesive tape platform 12 to the asset. In addition, the human operator typically will send the picture to a network service and/or transmit the picture to the adhesive tape platform 12 for storage in a memory component of the adhesive tape platform 12.

In some examples, the wireless transducing circuit components 34 that are embedded in a segment 32 of the adhesive tape platform 12 are activated when the segment 32 is removed from the backing sheet 32. In some of these examples, each segment 32 includes an embedded capacitive sensing system that can sense a change in capacitance when the segment 32 is removed from the backing sheet 36. As explained in detail below, a segment 32 of the adhesive tape platform 30 includes one or more embedded energy sources (e.g., thin film batteries, common disk-shaped cell batteries, or rechargeable batteries or other energy storage devices, such as a super capacitor or charge pump) that can be configured to supply power to the wireless transducing circuit components 34 in the segment 32 in response to the detection of a change in capacitance between the segment 32 and the backing sheet 36 as a result of removing the segment 32 from the backing sheet 36.

Figure 3:
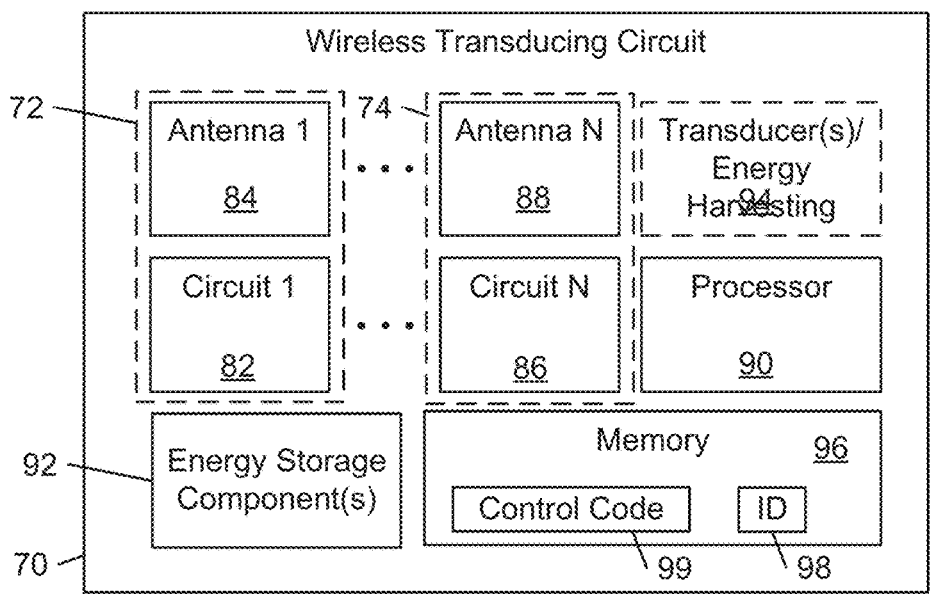
FIG. 3 is a schematic view of an example segment of an adhesive tape platform, according to some embodiments.

FIG. 3 shows a block diagram of the components of an example wireless transducing circuit 70 that includes a number of communication systems 72, 74. Example communication systems 72, 74 include a GPS system that includes a GPS receiver circuit 82 (e.g., a receiver integrated circuit) and a GPS antenna 84, and one or more wireless communication systems each of which includes a respective transceiver circuit 86 (e.g., a transceiver integrated circuit) and a respective antenna 88. Example wireless communication systems include a cellular communication system (e.g., GSM/GPRS), a Wi-Fi communication system, an RF communication system (e.g., LoRa), a Bluetooth communication system (e.g., a Bluetooth Low Energy system), a Z-wave communication system, and a ZigBee communication system. The wireless transducing circuit 70 also includes a processor 90 (e.g., a microcontroller or microprocessor), one or more energy storage devices 92 (e.g., non-rechargeable or rechargeable printed flexible battery, conventional single or multiple cell battery, and/or a super capacitor or charge pump), one or more transducers 94 (e.g., sensors and/or actuators, and, optionally, one or more energy harvesting transducer components). In some examples, the conventional single or multiple cell battery may be a watch style disk or button cell battery that is associated electrical connection apparatus (e.g., a metal clip) that electrically connects the electrodes of the battery to contact pads on the flexible circuit 116.

Examples of sensing transducers 94 include a capacitive sensor, an altimeter, a gyroscope, an accelerometer, a temperature sensor, a strain sensor, a pressure sensor, a piezoelectric sensor, a weight sensor, an optical or light sensor (e.g., a photodiode or a camera), an acoustic or sound sensor (e.g., a microphone), a smoke detector, a radioactivity sensor, a chemical sensor (e.g., an explosives detector), a biosensor (e.g., a blood glucose biosensor, odor detectors, antibody based pathogen, food, and water contaminant and toxin detectors, DNA detectors, microbial detectors, pregnancy detectors, and ozone detectors), a magnetic sensor, an electromagnetic field sensor, and a humidity sensor. Examples of actuating (e.g., energy emitting) transducers 94 include light emitting components (e.g., light emitting diodes and displays), electro-acoustic transducers (e.g., audio speakers), electric motors, and thermal radiators (e.g., an electrical resistor or a thermoelectric cooler).

In some examples, the wireless transducing circuit 70 includes a memory 96 for storing data, including, e.g., profile data, state data, event data, sensor data, localization data, security data, and one or more unique identifiers (ID) 98 associated with the wireless transducing circuit 70, such as a product ID, a type ID, and a media access control (MAC) ID, and control code 99. In some examples, the memory 96 may be incorporated into one or more of the processor 90 or transducers 94, or may be a separate component that is integrated in the wireless transducing circuit 70 as shown in FIG. 3. The control code typically is implemented as programmatic functions or program modules that control the operation of the wireless transducing circuit 70, including a tape node communication manager that manages the manner and timing of tape node communications, a tape node power manager that manages power consumption, and a tape node connection manager that controls whether connections with other tape nodes are secure connections or unsecure connections, and a tape node storage manager that securely manages the local data storage on the node. The tape node connection manager ensures the level of security required by the end application and supports various encryption mechanisms. The tape node power manager and tape communication manager work together to optimize the battery consumption for data communication. In some examples, execution of the control code by the different types of tape nodes described herein may result in the performance of similar or different functions.

Figure 4:
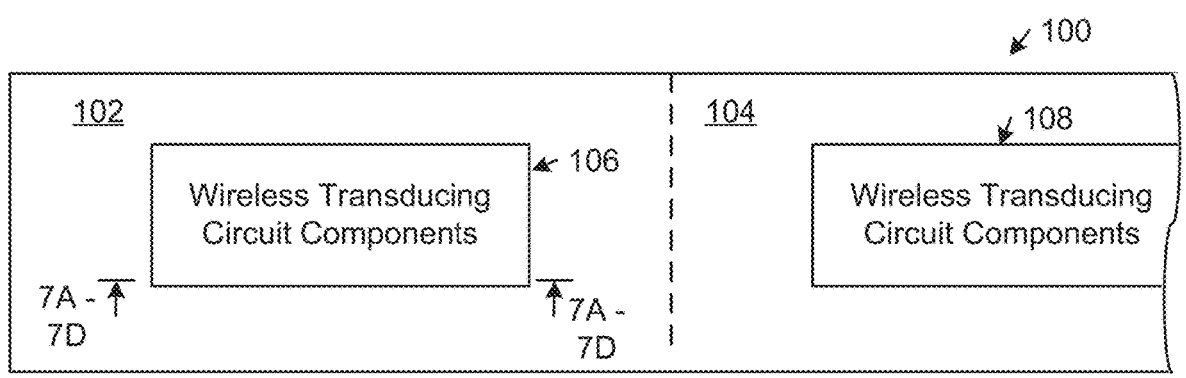
FIG. 4 is a diagrammatic top view of a length of an example adhesive tape platform, according to some embodiments.

FIG. 4 is a top view of a portion of an example flexible adhesive tape platform 100 that shows a first segment 102 and a portion of a second segment 104. Each segment 102, 104 of the flexible adhesive tape platform 100 includes a respective set 106, 108 of the components of the wireless transducing circuit 70. The segments 102, 104 and their respective sets of components 106, 108 typically are identical and configured in the same way. In some other embodiments, however, the segments 102, 104 and/or their respective sets of components 106, 108 are different and/or configured in different ways. For example, in some examples, different sets of the segments of the flexible adhesive tape platform 100 have different sets or configurations of tracking and/or transducing components that are designed and/or optimized for different applications, or different sets of segments of the flexible adhesive tape platform may have different ornamentations (e.g., markings on the exterior surface of the platform) and/or different (e.g., alternating) lengths.

An example method of fabricating the adhesive tape platform 100 (see FIG. 4) according to a roll-to-roll fabrication process is described in connection with FIGS. 6, 7A, and 7B of U.S. Pat. No. 10,262,255, issued Apr. 16, 2019, the entirety of which is incorporated herein by reference.

The instant specification describes an example system of adhesive tape platforms (also referred to herein as "tape nodes") that can be used to implement a low-cost wireless network infrastructure for performing monitoring, tracking, and other asset management functions relating to, for example, parcels, persons, tools, equipment and other physical assets and objects. The example system includes a set of three different types of tape nodes that have different respective functionalities and different respective cover markings that visually distinguish the different tape node types from one another. In one non-limiting example, the covers of the different tape node types are marked with different colors (e.g., white, green, and black). In the illustrated examples, the different tape node types are distinguishable from one another by their respective wireless communications capabilities and their respective sensing capabilities.

Figure 5A:
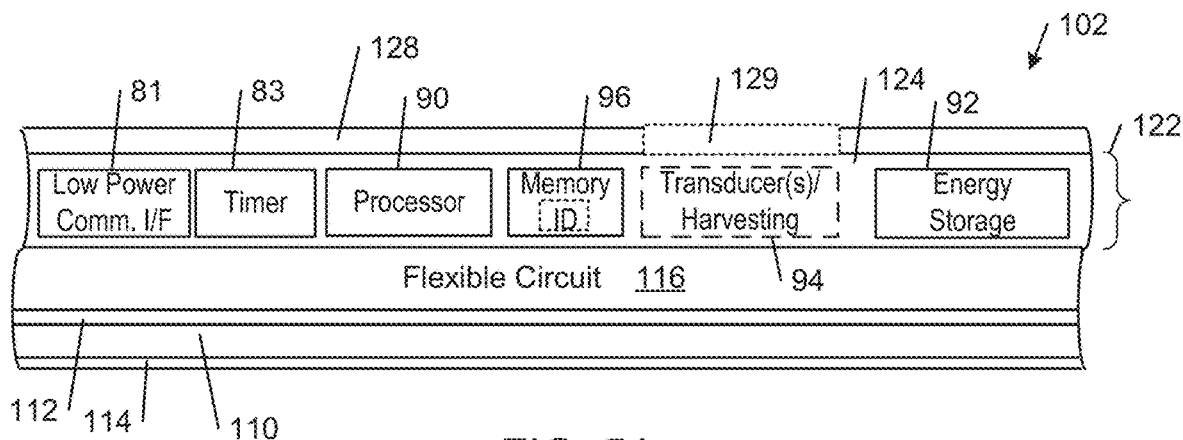
FIGS. 5A-5C show diagrammatic cross-sectional side views of portions of different respective adhesive tape platforms, according to some embodiments.

FIG. 5A shows a cross-sectional side view of a portion of an example segment 102 of the flexible adhesive tape platform 100 that includes a respective set of the components of the wireless transducing circuit 106 corresponding to the first tape node type (i.e., white). The flexible adhesive tape platform segment 102 includes an adhesive layer 112, an optional flexible substrate 110, and an optional adhesive layer 114 on the bottom surface of the flexible substrate 110. If the bottom adhesive layer 114 is present, a release liner (not shown) may be (weakly) adhered to the bottom surface of the adhesive layer 114. In some examples, the adhesive layer 114 includes an adhesive (e.g., an acrylic foam adhesive) that has a high bond strength that is sufficient to prevent removal of the adhesive segment 102 from a surface on which the adhesive layer 114 is adhered without destroying the physical or mechanical integrity of the adhesive segment 102 and/or one or more of its constituent components. In some examples, the optional flexible substrate 110 is implemented as a prefabricated adhesive tape that includes the adhesive layers 112, 114 and the optional release liner. In other examples, the adhesive layers 112, 114 are applied to the top and bottom surfaces of the flexible substrate 110 during the fabrication of the adhesive tape platform 100. The adhesive layer 112 bonds the flexible substrate 110 to a bottom surface of a flexible circuit 116, that includes one or more wiring layers (not shown) that connect the processor 90, a low power wireless communication interface 81 (e.g., a Zigbee, Bluetooth® Low Energy (BLE) interface, or other low power communication interface), a timer circuit 83, transducing and/or energy harvesting component(s) 94 (if present), the memory 96, and other components in a device layer 122 to each other and to the energy storage component 92 and, thereby, enable the transducing, tracking and other functionalities of the flexible adhesive tape platform segment 102. The low power wireless communication interface 81 typically includes one or more of the antennas 84, 88 and one or more of the wireless circuits 82, 86.

Figure 5B:
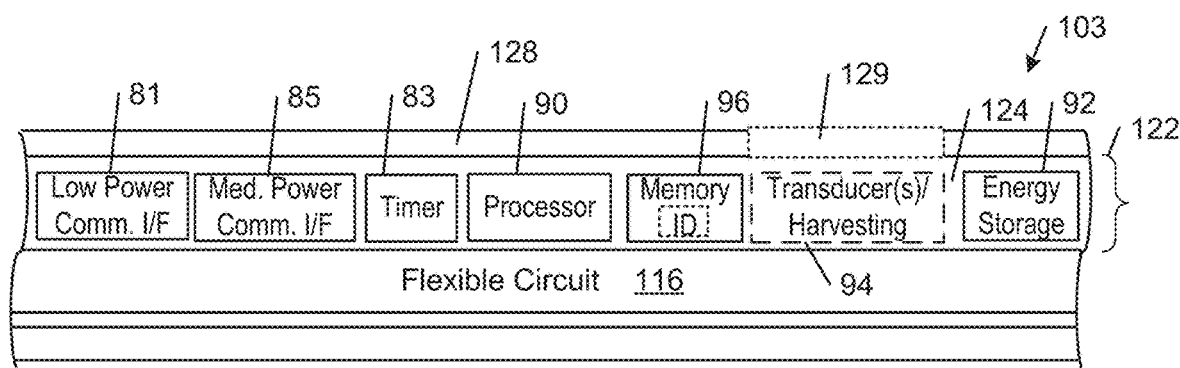

FIG. 5B shows a cross-sectional side view of a portion of an example segment 103 of the flexible adhesive tape platform 100 that includes a respective set of the components of the wireless transducing circuit 106 corresponding to the second tape node type (i.e., green). In this example, the flexible adhesive tape platform segment 103 differs from the segment 102 shown in FIG. 5A by the inclusion of a medium power communication interface 85 (e.g., a LoRa interface) in addition to the low power communications interface that is present in the first tape node type (i.e., white). The medium power communication interface has longer communication range than the low power communication interface. In some examples, one or more other components of the flexible adhesive tape platform segment 103 differ, for example, in functionality or capacity (e.g., larger energy source).

Figure 5C:
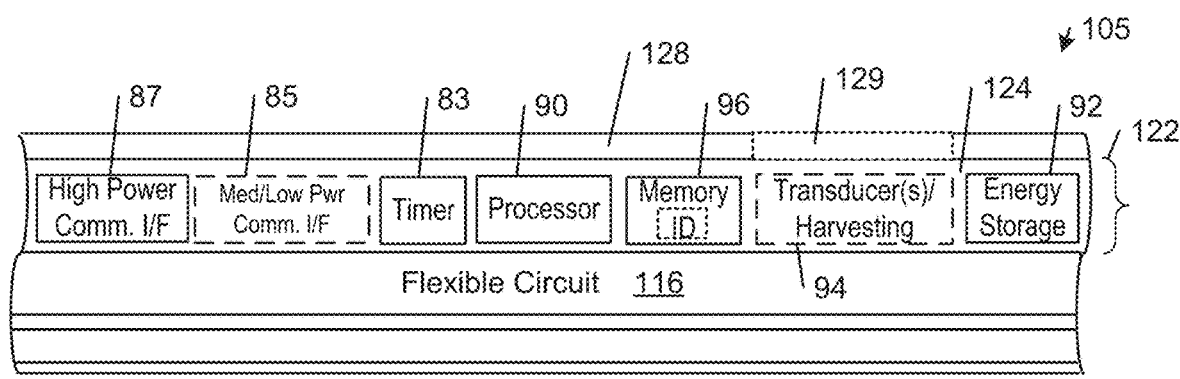

FIG. 5C shows a cross-sectional side view of a portion of an example segment 105 of the flexible adhesive tape platform 100 that includes a respective set of the components of the wireless transducing circuit 106 corresponding to the third tape node type (i.e., black). In this example, the flexible adhesive tape platform segment 105 includes a high power communications interface 87 (e.g., a cellular interface; e.g., GSM/GPRS) and an optional medium and/or low power communications interface 85. The high power communication range provides global coverage to available infrastructure (e.g. the cellular network). In some examples, one or more other components of the flexible adhesive tape platform segment 105 differ, for example, in functionality or capacity (e.g., larger energy source).

FIGS. 5A-5C show examples in which the cover layer 128 of the flexible adhesive tape platform 100 includes one or more interfacial regions 129 positioned over one or more of the transducers 94. In examples, one or more of the interfacial regions 129 have features, properties, compositions, dimensions, and/or characteristics that are designed to improve the operating performance of the platform 100 for specific applications. In some examples, the flexible adhesive tape platform 100 includes multiple interfacial regions 129 over respective transducers 94, which may be the same or different depending on the target applications. Example interfacial regions include an opening, an optically transparent window, and/or a membrane located in the interfacial region 129 of the cover 128 that is positioned over the one or more transducers and/or energy harvesting components 94. Additional details regarding the structure and operation of example interfacial regions 129 are described in U.S. Provisional Patent Application No. 62/680,716, filed Jun. 5, 2018, PCT Patent Application No. PCT/US2018/064919, filed Dec. 11, 2018, U.S. Pat. No. 10,885,420, issued Jan. 4, 2021, U.S. Pat. No. 10,902,310 issued Jan. 25, 2021, and U.S. Provisional Patent Application No. 62/670,712, filed May 11, 2018, all of which are incorporated herein in their entirety.

In some examples, a flexible polymer layer 124 encapsulates the device layer 122 and thereby reduces the risk of damage that may result from the intrusion of contaminants and/or liquids (e.g., water) into the device layer 122. The flexible polymer layer 124 also planarizes the device layer 122. This facilitates optional stacking of additional layers on the device layer 122 and also distributes forces generated in, on, or across the adhesive tape platform segment 102 so as to reduce potentially damaging asymmetric stresses that might be caused by the application of bending, torqueing, pressing, or other forces that may be applied to the flexible adhesive tape platform segment 102 during use. In the illustrated example, a flexible cover 128 is bonded to the planarizing polymer 124 by an adhesive layer (not shown).

The flexible cover 128 and the flexible substrate 110 may have the same or different compositions depending on the intended application. In some examples, one or both of the flexible cover 128 and the flexible substrate 110 include flexible film layers and/or paper substrates, where the film layers may have reflective surfaces or reflective surface coatings. Example compositions for the flexible film layers include polymer films, such as polyester, polyimide, polyethylene terephthalate (PET), and other plastics. The optional adhesive layer on the bottom surface of the flexible cover 128 and the adhesive layers 112, 114 on the top and bottom surfaces of the flexible substrate 110 typically include a pressure-sensitive adhesive (e.g., a silicon-based adhesive). In some examples, the adhesive layers are applied to the flexible cover 128 and the flexible substrate 110 during manufacture of the adhesive tape platform 100 (e.g., during a roll-to-roll or sheet-to-sheet fabrication process). In other examples, the flexible cover 128 may be implemented by a prefabricated single-sided pressure-sensitive adhesive tape and the flexible substrate 110 may be implemented by a prefabricated double-sided pressure-sensitive adhesive tape; both kinds of tape may be readily incorporated into a roll-to-roll or sheet-to-sheet fabrication process. In some examples, the flexible polymer layer 124 is composed of a flexible epoxy (e.g., silicone).

In some examples, the energy storage device 92 is a flexible battery that includes a printed electrochemical cell, which includes a planar arrangement of an anode and a cathode and battery contact pads. In some examples, the flexible battery may include lithium-ion cells or nickel-cadmium electro-chemical cells. The flexible battery typically is formed by a process that includes printing or laminating the electro-chemical cells on a flexible substrate (e.g., a polymer film layer). In some examples, other components may be integrated on the same substrate as the flexible battery. For example, the low power wireless communication interface 81 and/or the processor(s) 90 may be integrated on the flexible battery substrate. In some examples, one or more of such components also (e.g., the flexible antennas and the flexible interconnect circuits) may be printed on the flexible battery substrate.

In some examples, the flexible circuit 116 is formed on a flexible substrate by printing, etching, or laminating circuit patterns on the flexible substrate. In some examples, the flexible circuit 116 is implemented by one or more of a single-sided flex circuit, a double access or back bared flex circuit, a sculpted flex circuit, a double-sided flex circuit, a multi-layer flex circuit, a rigid flex circuit, and a polymer thick film flex circuit. A single-sided flexible circuit has a single conductor layer made of, for example, a metal or conductive (e.g., metal filled) polymer on a flexible dielectric film. A double access or back bared flexible circuit has a single conductor layer but is processed so as to allow access to selected features of the conductor pattern from both sides. A sculpted flex circuit is formed using a multi-step etching process that produces a flex circuit that has finished copper conductors that vary in thickness along their respective lengths. A multilayer flex circuit has three of more layers of conductors, where the layers typically are interconnected using plated through holes. Rigid flex circuits are a hybrid construction of flex circuit consisting of rigid and flexible substrates that are laminated together into a single structure, where the layers typically are electrically interconnected via plated through holes. In polymer thick film (PTF) flex circuits, the circuit conductors are printed onto a polymer base film, where there may be a single conductor layer or multiple conductor layers that are insulated from one another by respective printed insulating layers.

In the example flexible adhesive tape platform segments 102 shown in FIGS. 5A-5C, the flexible circuit 116 is a single access flex circuit that interconnects the components of the adhesive tape platform on a single side of the flexible circuit 116. In other examples, the flexible circuit 116 is a double access flex circuit that includes a front-side conductive pattern that interconnects the low power communications interface 81, the timer circuit 83, the processor 90, the one or more transducers 94 (if present), and the memory 96, and allows through-hole access (not shown) to a back-side conductive pattern that is connected to the flexible battery (not shown). In these examples, the front-side conductive pattern of the flexible circuit 116 connects the communications circuits 82, 86 (e.g., receivers, transmitters, and transceivers) to their respective antennas 84, 88 and to the processor 90, and also connects the processor 90 to the one or more sensors 94 and the memory 96. The backside conductive pattern connects the active electronics (e.g., the processor 90, the communications circuits 82, 86, and the transducers) on the front-side of the flexible circuit 116 to the electrodes of the flexible battery 116 via one or more through holes in the substrate of the flexible circuit 116.

Depending on the target application, the wireless transducing circuits 70 are distributed across the flexible adhesive tape platform 100 according to a specified sampling density, which is the number of wireless transducing circuits 70 for a given unit size (e.g., length or area) of the flexible adhesive tape platform 100. In some examples, a set of multiple flexible adhesive tape platforms 100 are provided that include different respective sampling densities in order to seal different asset sizes with a desired number of wireless transducing circuits 70. In particular, the number of wireless transducing circuits per asset size is given by the product of the sampling density specified for the adhesive tape platform and the respective size of the adhesive tape platform 100 needed to seal the asset. This allows an automated packaging system to select the appropriate type of flexible adhesive tape platform 100 to use for sealing a given asset with the desired redundancy (if any) in the number of wireless transducer circuits 70. In some example applications (e.g., shipping low value goods), only one wireless transducing circuit 70 is used per asset, whereas in other applications (e.g., shipping high value goods) multiple wireless transducing circuits 70 are used per asset. Thus, a flexible adhesive tape platform 100 with a lower sampling density of wireless transducing circuits 70 can be used for the former application, and a flexible adhesive tape platform 100 with a higher sampling density of wireless transducing circuits 70 can be used for the latter application. In some examples, the flexible adhesive tape platforms 100 are color-coded or otherwise marked to indicate the respective sampling densities with which the wireless transducing circuits 70 are distributed across the different types of adhesive tape platforms 100.

Figure 6A:
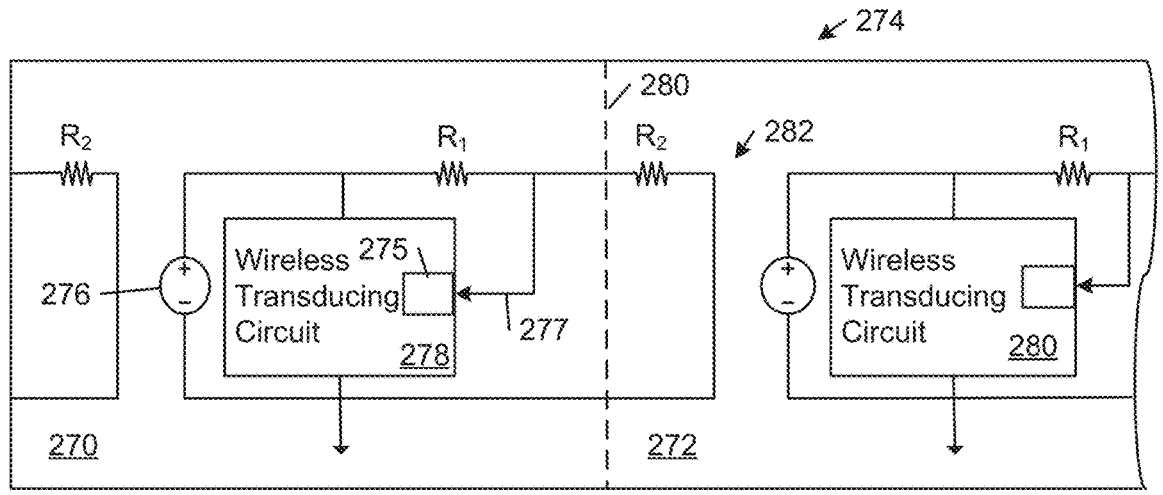
FIGS. 6A-6B are diagrammatic top views of a length of an example adhesive tape platform, according to some embodiments.

Referring to FIG. 6A, in some examples, each of one or more of the segments 270, 272 of a flexible adhesive tape platform 274 includes a respective one-time wake circuit 275 that delivers power from the respective energy source 276 to the respective wireless circuit 278 (e.g., a processor, one or more transducers, and one or more wireless communications circuits) in response to an event. In some of these examples, the wake circuit 275 is configured to transition from an off state to an on state when the voltage on the wake node 277 exceeds a threshold level, at which point the wake circuit transitions to an on state to power-on the segment 270. In the illustrated example, this occurs when the user separates the segment from the adhesive tape platform 274, for example, by cutting across the adhesive tape platform 274 at a designated location (e.g., along a designated cut-line 280). In particular, in its initial, un-cut state, a minimal amount of current flows through the resistors R1 and R2. As a result, the voltage on the wake node 277 remains below the threshold turn-on level. After the user cuts across the adhesive tape platform 274 along the designated cut-line 280, the user creates an open circuit in the loop 282, which pulls the voltage of the wake node above the threshold level and turns on the wake circuit 275. As a result, the voltage across the energy source 276 will appear across the wireless circuit 278 and, thereby, turn on the segment 270. In particular embodiments, the resistance value of resistor R1 is greater than the resistance value of R2. In some examples, the resistance values of resistors R1 and R2 are selected based on the overall design of the adhesive product system (e.g., the target wake voltage level and a target leakage current).

In some examples, each of one or more of the segments of an adhesive tape platform includes a respective sensor and a respective wake circuit that delivers power from the respective energy source to the respective one or more of the respective wireless circuit components 278 in response to an output of the sensor. In some examples, the respective sensor is a strain sensor that produces a wake signal based on a change in strain in the respective segment. In some of these examples, the strain sensor is affixed to a adhesive tape platform and configured to detect the stretching of the tracking adhesive tape platform segment as the segment is being peeled off a roll or a sheet of the adhesive tape platform. In some examples, the respective sensor is a capacitive sensor that produces a wake signal based on a change in capacitance in the respective segment. In some of these examples, the capacitive sensor is affixed to an adhesive tape platform and configured to detect the separation of the tracking adhesive tape platform segment from a roll or a sheet of the adhesive tape platform. In some examples, the respective sensor is a flex sensor that produces a wake signal based on a change in curvature in the respective segment. In some of these examples, the flex sensor is affixed to a adhesive tape platform and configured to detect bending of the tracking adhesive tape platform segment as the segment is being peeled off a roll or a sheet of the adhesive tape platform. In some examples, the respective sensor is a near field communications sensor that produces a wake signal based on a change in inductance in the respective segment.

Figure 6B:
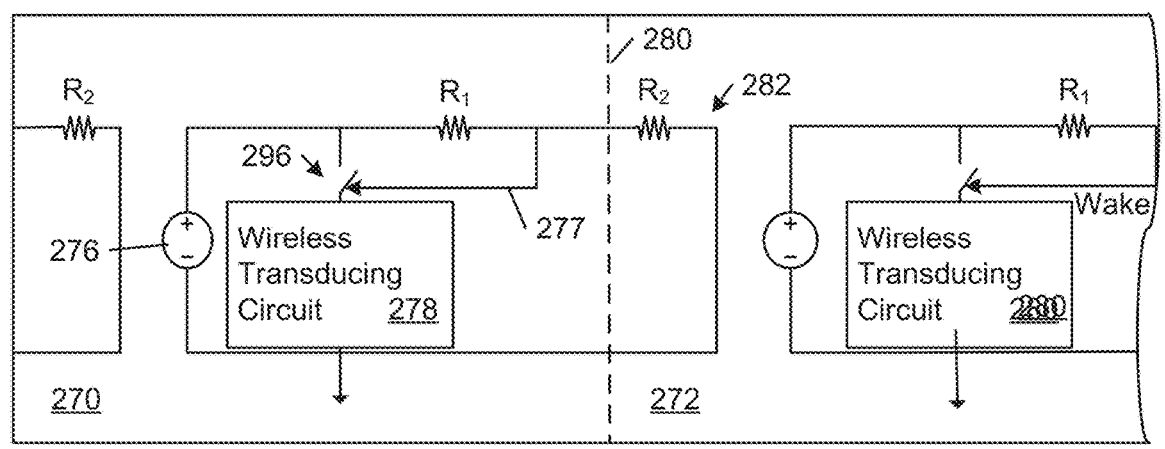

FIG. 6B shows another example of an adhesive tape platform 294 that delivers power from the respective energy source 276 to the respective tracking circuit 278 (e.g., a processor, one or more transducers, and one or more wireless communications circuits) in response to an event. This example is similar in structure and operation as the adhesive tape platform 294 shown in FIG. 6A, except that the wake circuit 275 is implemented by a switch 296 that is configured to transition from an open state to a closed state when the voltage on the switch node 277 exceeds a threshold level. In the initial state of the adhesive tape platform 294, the voltage on the switch node is below the threshold level as a result of the low current level flowing through the resistors R1 and R2. After the user cuts across the adhesive tape platform 294 along the designated cut-line 280, the user creates an open circuit in the loop 282, which pulls up the voltage on the switch node above the threshold level to close the switch 296 and turn on the wireless circuit 278.

Figure 6C:
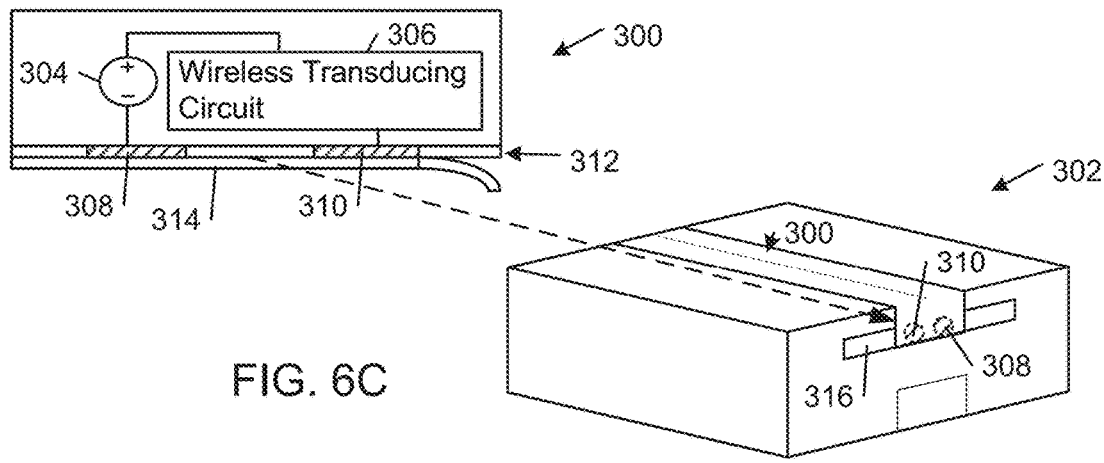
FIG. 6C is a diagrammatic view of a length of an example adhesive tape platform adhered to an asset, according to some embodiments.

FIG. 6C shows a diagrammatic cross-sectional front view of an example adhesive tape platform 300 and a perspective view of an example asset 302. Instead of activating the adhesive tape platform in response to separating a segment of the adhesive tape platform from a roll or a sheet of the adhesive tape platform, this example is configured to supply power from the energy source 302 to turn on the wireless transducing circuit 306 in response to establishing an electrical connection between two power terminals 308, 310 that are integrated into the adhesive tape platform. In particular, each segment of the adhesive tape platform 300 includes a respective set of embedded tracking components, an adhesive layer 312, and an optional backing sheet 314 with a release coating that prevents the segments from adhering strongly to the backing sheet 314. In some examples, the power terminals 308, 310 are composed of an electrically conductive material (e.g., a metal, such as copper) that may be printed or otherwise patterned and/or deposited on the backside of the adhesive tape platform 300. In operation, the adhesive tape platform can be activated by removing the backing sheet 314 and applying the exposed adhesive layer 312 to a surface that includes an electrically conductive region 316. In the illustrated embodiment, the electrically conductive region 316 is disposed on a portion of the asset 302. When the adhesive backside of the adhesive tape platform 300 is adhered to the asset with the exposed terminals 308, 310 aligned and in contact with the electrically conductive region 316 on the asset 302, an electrical connection is created through the electrically conductive region 316 between the exposed terminals 308, 310 that completes the circuit and turns on the wireless transducing circuit 306. In particular embodiments, the power terminals 308, 310 are electrically connected to any respective nodes of the wireless transducing circuit 306 that would result in the activation of the tracking circuit 306 in response to the creation of an electrical connection between the power terminals 308, 310.

In some examples, after a tape node is turned on, it will communicate with the network service to confirm that the user/operator who is associated with the tape node is an authorized user who has authenticated himself or herself to the network service 54. In these examples, if the tape node cannot confirm that the user/operator is an authorized user, the tape node will turn itself off.

Deployment of Tape Nodes

Figure 7:
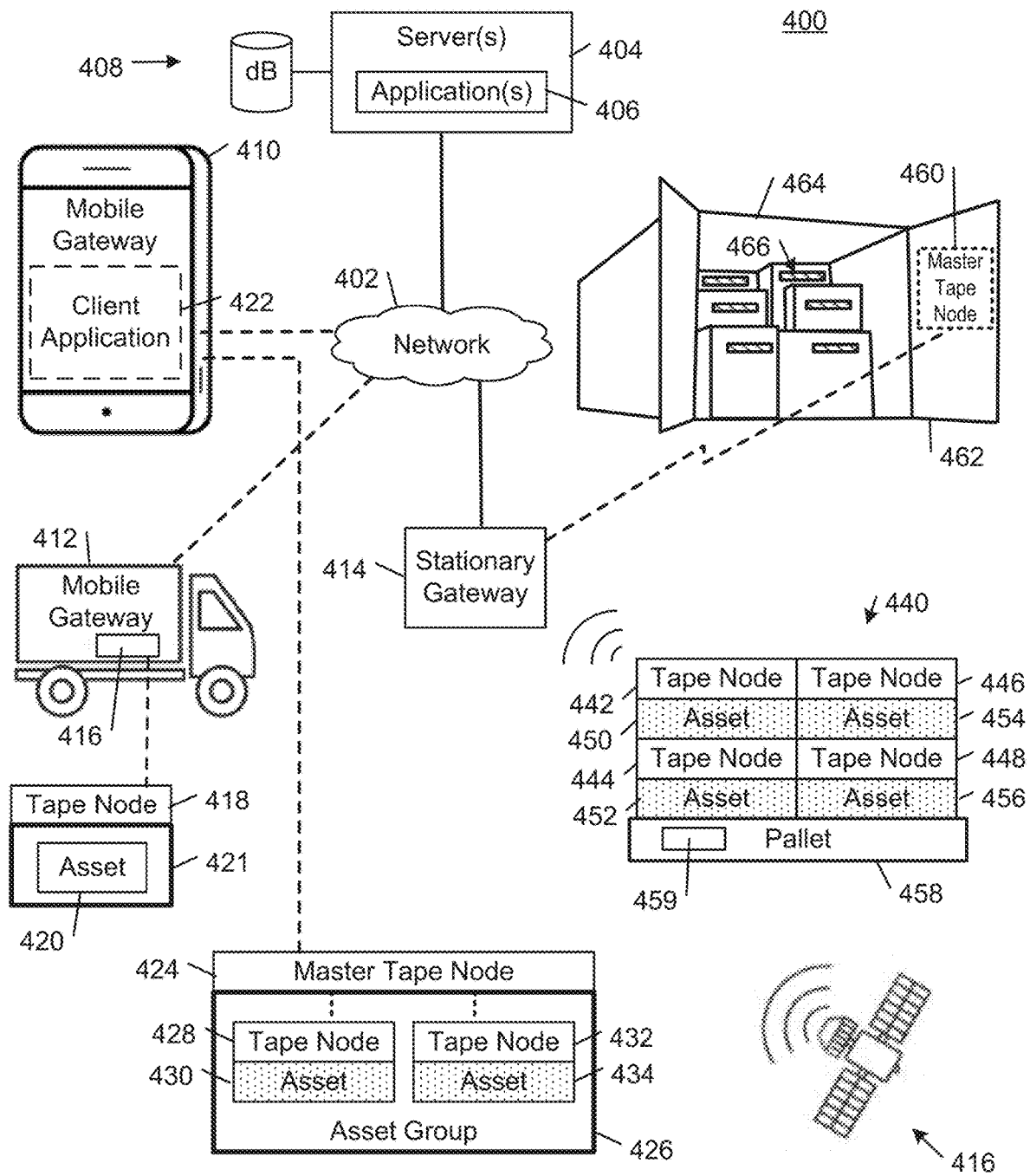
FIG. 7 is a diagrammatic view of an example of a network environment supporting communications with segments of an adhesive tape platform, according to some embodiments.

FIG. 7 shows an example network communications environment 400 (also referred to herein as an "IOT system" or "Tracking System" 400) that includes a network 402 that supports communications between one or more servers 404 executing one or more applications of a network service 408, mobile gateways 410, 412, a stationary gateway 414, and various types of tape nodes that are associated with various assets (e.g., parcels, equipment, tools, persons, and other things). Each member of the IOT system 400 may be referred to as a node of the IOT system 400, including the tape nodes, other wireless IOT devices, gateways (stationary and mobile), client devices, and servers. In some examples, the network 402 includes one or more network communication systems and technologies, including any one or more of wide area networks, local area networks, public networks (e.g., the internet), private networks (e.g., intranets and extranets), wired networks, and wireless networks. For example, the network 402 includes communications infrastructure equipment, such as a geolocation satellite system 416 (e.g., GPS, GLONASS, and NAVSTAR), cellular communication systems (e.g., GSM/GPRS), Wi-Fi communication systems, RF communication systems (e.g., LoRa), Bluetooth communication systems (e.g., a Bluetooth Low Energy system), Z-wave communication systems, and ZigBee communication systems.

In some examples, the one or more network service applications 406 leverage the above-mentioned communications technologies to create a hierarchical wireless network of tape nodes that improves asset management operations by reducing costs and improving efficiency in a wide range of processes, from asset packaging, asset transporting, asset tracking, asset condition monitoring, asset inventorying, and asset security verification. Communication across the network is secured by a variety of different security mechanisms. In the case of existing infrastructure, a communication link the communication uses the infrastructure security mechanisms. In case of communications among tapes nodes, the communication is secured through a custom security mechanism. In certain cases, tape nodes can also be configured to support block chain to protect the transmitted and stored data.

A set of tape nodes can be configured by the network service 408 to create hierarchical communications network. The hierarchy can be defined in terms of one or more factors, including functionality (e.g., wireless transmission range or power), role (e.g., master tape node vs. peripheral tape node), or cost (e.g., a tape node equipped with a cellular transceiver vs. a peripheral tape node equipped with a Bluetooth LE transceiver). Tape nodes can be assigned to different levels of a hierarchical network according to one or more of the above-mentioned factors. For example, the hierarchy can be defined in terms of communication range or power, where tape nodes with higher power or longer communication range transceivers are arranged at a higher level of the hierarchy than tape nodes with lower power or lower range transceivers. In another example, the hierarchy is defined in terms of role, where, e.g., a master tape node is programmed to bridge communications between a designated group of peripheral tape nodes and a gateway node or server node. The problem of finding an optimal hierarchical structure can be formulated as an optimization problem with battery capacity of nodes, power consumption in various modes of operation, desired latency, external environment, etc. and can be solved using modern optimization methods e.g. neural networks, artificial intelligence, and other machine learning computing systems that take expected and historical data to create an optimal solution and can create algorithms for modifying the system's behavior adaptively in the field.

The tape nodes may be deployed by automated equipment or manually. In this process, a tape node typically is separated from a roll or sheet and adhered to a asset, or other stationary or mobile object (e.g., a structural element of a warehouse, or a vehicle, such as a delivery truck) or stationary object (e.g., a structural element of a building). This process activates the tape node and causes the tape node to communicate with a server 404 of the network service 408. In this process, the tape node may communicate through one or more other tape nodes in the communication hierarchy. In this process, the network server 404 executes the network service application 406 to programmatically configure tape nodes that are deployed in the environment 400. In some examples, there are multiple classes or types of tape nodes, where each tape node class has a different respective set of functionalities and/or capacities.

In some examples, the one or more network service servers 404 communicate over the network 402 with one or more gateways that are configured to send, transmit, forward, or relay messages to the network 402 and activated tape nodes that are associated with respective assets and within communication range. Example gateways include mobile gateways 410, 412 and a stationary gateway 414. In some examples, the mobile gateways 410, 412, and the stationary gateway 414 are able to communicate with the network 402 and with designated sets or groups of tape nodes.

In some examples, the mobile gateway 412 is a vehicle (e.g., a delivery truck or other mobile hub) that includes a wireless communications unit 416 that is configured by the network service 408 to communicate with a designated set of tape nodes, including a peripheral tape node 418 in the form of a label that is adhered to an asset 420 contained within a parcel 421 (e.g., an envelope), and is further configured to communicate with the network service 408 over the network 402. In some examples, the peripheral tape node 418 includes a lower power wireless communications interface of the type used in, e.g., tape node 102 (shown in FIG. 5A), and the wireless communications unit 416 is implemented by a tape node (e.g., one of tape node 103 or tape node 105, respectively shown in FIGS. 5B and 5C) that includes a lower power communications interface for communicating with tape nodes within range of the mobile gateway 412 and a higher power communications interface for communicating with the network 402. In this way, the tape nodes 418 and 416 create a hierarchical wireless network of nodes for transmitting, forwarding, bridging, relaying, or otherwise communicating wireless messages to, between, or on behalf of the peripheral tape node 418 and the network service 408 in a power-efficient and cost-effective way.

In some examples, the mobile gateway 410 is a mobile phone that is operated by a human operator and executes a client application 422 that is configured by the network service 408 to communicate with a designated set of tape nodes, including a master tape node 424 that is adhered to a parcel 426 (e.g., a box), and is further configured to communicate with the network service 408 over the network 402. In the illustrated example, the parcel 426 contains a first parcel labeled or sealed by a tape node 428 and containing a first asset 430, and a second parcel labeled or sealed by a tape node 432 and containing a second asset 434. As explained in detail below, the master tape node 424 communicates with each of the peripheral tape nodes 428, 432 and communicates with the mobile gateway 408 in accordance with a hierarchical wireless network of tape nodes. In some examples, each of the peripheral tape nodes 428, 432 includes a lower power wireless communications interface of the type used in, e.g., tape node 102 (shown in FIG. 5A), and the master tape node 424 is implemented by a tape node (e.g., tape node 103, shown in FIG. 5B) that includes a lower power communications interface for communicating with the peripheral tape nodes 428, 432 contained within the parcel 426, and a higher power communications interface for communicating with the mobile gateway 410. The master tape node 424 is operable to relay wireless communications between the tape nodes 428, 432 contained within the parcel 426 and the mobile gateway 410, and the mobile gateway 410 is operable to relay wireless communications between the master tape node 424 and the network service 408 over the wireless network 402. In this way, the master tape node 424 and the peripheral tape nodes 428 and 432 create a hierarchical wireless network of nodes for transmitting, forwarding, relaying, or otherwise communicating wireless messages to, between, or on behalf of the peripheral tape nodes 428, 432 and the network service 408 in a power-efficient and cost-effective way.

In some examples, the stationary gateway 414 is implemented by a server executing a server application that is configured by the network service 408 to communicate with a designated set 440 of tape nodes 442, 444, 446, 448 that are adhered to respective parcels containing respective assets 450, 452, 454, 456 on a pallet 458. In other examples, the stationary gateway 414 is implemented by a tape node (e.g., one of tape node 103 or tape node 105, respectively shown in FIGS. 5B and 5C) that is adhered to, for example, a wall, column or other infrastructure component of the environment 400, and includes a lower power communications interface for communicating with tape nodes within range of the stationary gateway 414 and a higher power communications interface for communicating with the network 402. In one embodiment, each of the tape nodes 442-448 is a peripheral tape node and is configured by the network service 408 to communicate individually with the stationary gateway 414, which relays communications from the tape nodes 442-448 to the network service 408 through the stationary gateway 414 and over the communications network 402. In another embodiment, one of the tape nodes 442-448 at a time is configured as a master tape node that transmits, forwards, relays, or otherwise communicate wireless messages to, between, or on behalf of the other tape nodes on the pallet 458. In this embodiment, the master tape node may be determined by the tape nodes 442-448 or designated by the network service 408. In some examples, the tape node with the longest range or highest remaining power level is determined to be the master tape node. In some examples, when the power level of the current master tape node drops below a certain level (e.g., a fixed power threshold level or a threshold level relative to the power levels of one or more of the other tape nodes), another one of the tape nodes assumes the role of the master tape node. In some examples, a master tape node 459 is adhered to the pallet 458 and is configured to perform the role of a master node for the tape nodes 442-448. In these ways, the tape nodes 442-448, 458 are configurable to create different hierarchical wireless networks of nodes for transmitting, forwarding, relaying, bridging, or otherwise communicating wireless messages with the network service 408 through the stationary gateway 414 and over the network 402 in a power-efficient and cost-effective way.

In the illustrated example, the stationary gateway 414 also is configured by the network service 408 to communicate with a designated set of tape nodes, including a master tape node 460 that is adhered to the inside of a door 462 of a shipping container 464, and is further configured to communicate with the network service 408 over the network 402. In the illustrated example, the shipping container 464 contains a number of parcels labeled or sealed by respective peripheral tape nodes 466 and containing respective assets. The master tape node 416 communicates with each of the peripheral tape nodes 466 and communicates with the stationary gateway 415 in accordance with a hierarchical wireless network of tape nodes. In some examples, each of the peripheral tape nodes 466 includes a lower power wireless communications interface of the type used in, e.g., tape node 102 (shown in FIG. 5A), and the master tape node 460 is implemented by a tape node (e.g., tape node 103, shown in FIG. 5B) that includes a lower power communications interface for communicating with the peripheral tape nodes 466 contained within the shipping container 464, and a higher power communications interface for communicating with the stationary gateway 414.

In some examples, when the doors of the shipping container 464 are closed, the master tape node 460 is operable to communicate wirelessly with the peripheral tape nodes 466 contained within the shipping container 464. In an example, the master tape node 460 is configured to collect sensor data from the peripheral tape nodes and, in some embodiments, process the collected data to generate, for example, one or more histograms from the collected data. When the doors of the shipping container 464 are open, the master tape node 460 is programmed to detect the door opening (e.g., with an accelerometer component of the master tape node 460) and, in addition to reporting the door opening event to the network service 408, the master tape node 460 is further programmed to transmit the collected data and/or the processed data in one or more wireless messages to the stationary gateway 414. The stationary gateway 414, in turn, is operable to transmit the wireless messages received from the master tape node 460 to the network service 408 over the wireless network 402. Alternatively, in some examples, the stationary gateway 414 also is operable to perform operations on the data received from the master tape node 460 with the same type of data produced by the master node 459 based on sensor data collected from the tape nodes 442-448. In this way, the master tape node 460 and the peripheral tape nodes 466 create a hierarchical wireless network of nodes for transmitting, forwarding, relaying, or otherwise communicating wireless messages to, between, or on behalf of the peripheral tape nodes 466 and the network service 408 in a power-efficient and cost-effective way.

In an example of the embodiment shown in FIG. 7, there are three classes of tape nodes: a short range tape node, a medium range tape node, and a long range tape node, as respectively shown in FIGS. 5A-5C. The short range tape nodes typically are adhered directly to parcels containing assets. In the illustrated example, the tape nodes 418, 428, 432, 442-448, 466 are short range tape nodes. The short range tape nodes typically communicate with a low power wireless communication protocol (e.g., Bluetooth LE, Zigbee, or Z-wave). The medium range tape nodes typically are adhered to objects (e.g., a box 426 and a shipping container 460) that are associated with multiple parcels that are separated from the medium range tape nodes by a barrier or a large distance. In the illustrated example, the tape nodes 424 and 460 are medium range tape nodes. The medium range tape nodes typically communicate with a medium power wireless communication protocol (e.g., LoRa or Wi-Fi). The long-range tape nodes typically are adhered to mobile or stationary infrastructure of the wireless communication environment 400. In the illustrated example, the mobile gateway tape node 412 and the stationary gateway tape node 414 are long range tape nodes. The long range tape nodes typically communicate with other nodes using a high power wireless communication protocol (e.g., a cellular data communication protocol). In some examples, the mobile gateway tape node 436 is adhered to a mobile vehicle (e.g., a truck). In these examples, the mobile gateway 412 may be moved to different locations in the environment 400 to assist in connecting other tape nodes to the server 404. In some examples, the stationary gateway tape node 414 may be attached to a stationary structure (e.g., a wall) in the environment 400 with a known geographic location. In these examples, other tape nodes in the environment can determine their geographic location by querying the gateway tape node 414.

Wireless Communications Network

Figure 8:
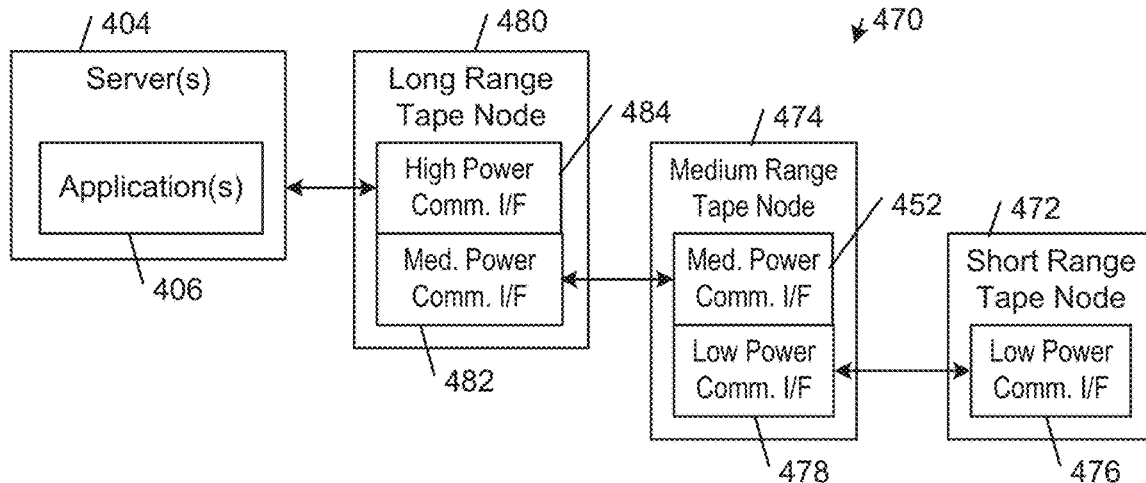
FIG. 8 is a diagrammatic view of a hierarchical communications network, according to some embodiments.

FIG. 8 shows an example hierarchical wireless communications network of tape nodes 470. In this example, the short range tape node 472 and the medium range tape node 474 communicate with one another over their respective low power wireless communication interfaces 476, 478. The medium range tape node 474 and the long range tape node 480 communicate with one another over their respective medium power wireless communication interfaces 478, 482. The long range tape node 480 and the network server 404 communicate with one another over the high power wireless communication interface 484. In some examples, the low power communication interfaces 476, 478 establish wireless communications with one another in accordance with the Bluetooth LE protocol, the medium power communication interfaces 452, 482 establish wireless communications with one another in accordance with the LoRa communications protocol, and the high power communication interface 484 establishes wireless communications with the server 404 in accordance with a cellular communications protocol.

In some examples, the different types of tape nodes are deployed at different levels in the communications hierarchy according to their respective communications ranges, with the long range tape nodes generally at the top of the hierarchy, the medium range tape nodes generally in the middle of the hierarchy, and the short range tape nodes generally at the bottom of the hierarchy. In some examples, the different types of tape nodes are implemented with different feature sets that are associated with component costs and operational costs that vary according to their respective levels in the hierarchy. This allows system administrators flexibility to optimize the deployment of the tape nodes to achieve various objectives, including cost minimization, asset tracking, asset localization, and power conservation.

In some examples, a server 404 of the network service 408 designates a tape node at a higher level in a hierarchical communications network as a master node of a designated set of tape nodes at a lower level in the hierarchical communications network. For example, the designated master tape node may be adhered to a parcel (e.g., a box, pallet, or shipping container) that contains one or more tape nodes that are adhered to one or more assets containing respective assets. In order to conserve power, the tape nodes typically communicate according to a schedule promulgated by the server 404 of the network service 408. The schedule usually dictates all aspects of the communication, including the times when particular tape nodes should communicate, the mode of communication, and the contents of the communication. In one example, the server 404 transmits programmatic Global Scheduling Description Language (GSDL) code to the master tape node and each of the lower-level tape nodes in the designated set. In this example, execution of the GSDL code causes each of the tape nodes in the designated set to connect to the master tape node at a different respective time that is specified in the GSDL code, and to communicate a respective set of one or more data packets of one or more specified types of information over the respective connection. In some examples, the master tape node simply forwards the data packets to the server network node 404, either directly or indirectly through a gateway tape node (e.g., the long range tape node 416 adhered to the mobile vehicle 412 or the long range tape node 414 adhered to an infrastructure component of the environment 400). In other examples, the master tape node processes the information contained in the received data packets and transmits the processed information to the server network node 404.

Figure 9:
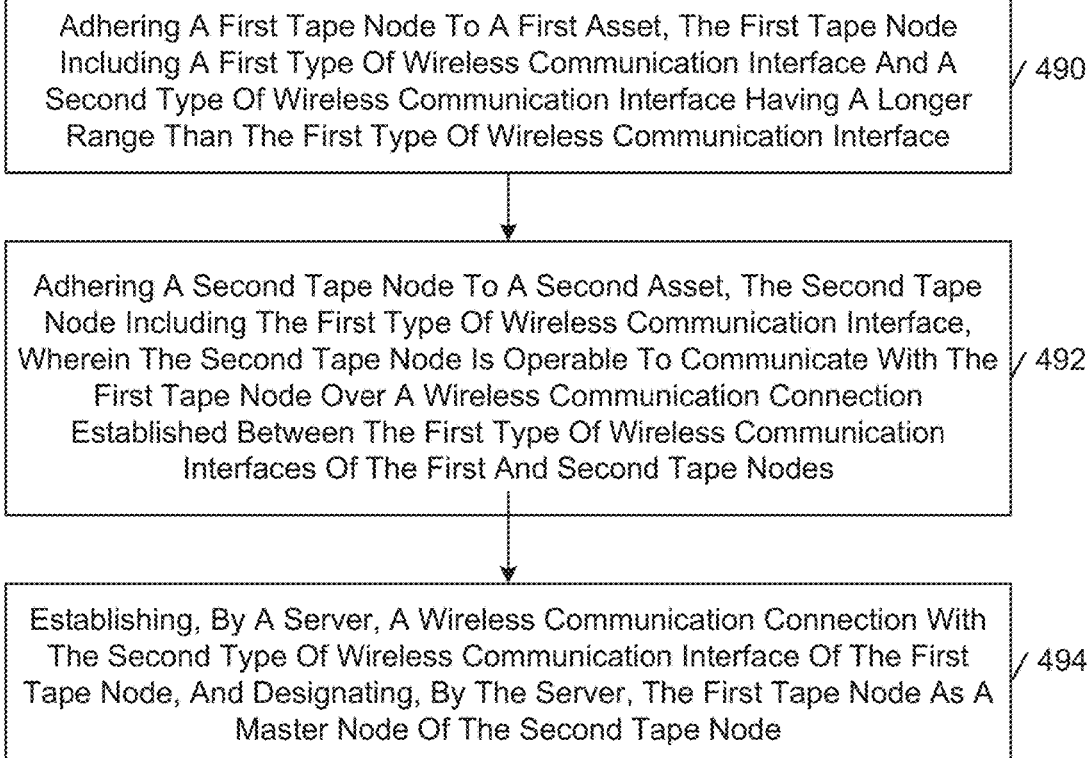
FIG. 9 is a flow diagram of a method of creating a hierarchical communications network, according to some embodiments.

FIG. 9 shows an example method of creating a hierarchical communications network. In accordance with this method, a first tape node is adhered to a first asset in a set of associated assets, the first tape node including a first type of wireless communication interface and a second type of wireless communication interface having a longer range than the first type of wireless communication interface (FIG. 9, block 490). A second tape node is adhered to a second asset in the set, the second tape node including the first type of wireless communication interface, wherein the second tape node is operable to communicate with the first tape node over a wireless communication connection established between the first type of wireless communication interfaces of the first and second tape nodes (FIG. 9, block 492). An application executing on a computer system (e.g., a server 404 of a network service 408) establishes a wireless communication connection with the second type of wireless communication interface of the first tape node, and the application transmits programmatic code executable by the first tape node to function as a master tape node with respect to the second tape node (FIG. 9, block 494).

In other embodiments, the second tape node is assigned the role of the master node of the first tape node.

Distributed Agent Operating System

As used herein, the term "node" refers to both a tape node and a non-tape node (i.e., a node or wireless device that is not an adhesive tape platform) unless the node is explicitly designated as a "tape node" or a "non-tape node." In some embodiments, a non-tape node may have the same or similar communication, sensing, processing and other functionalities and capabilities as the tape nodes described herein, except without being integrated into a tape platform. In some embodiments, non-tape nodes can interact seamlessly with tape nodes. Each node may be assigned a respective unique identifier, according to some embodiments.

The following disclosure describes a distributed software operating system that is implemented by distributed hardware nodes executing intelligent agent software to perform various tasks or algorithms. In some embodiments, the operating system distributes functionalities (e.g., performing analytics on data or statistics collected or generated by nodes) geographically across multiple intelligent agents that are bound to items (e.g., parcels, containers, packages, boxes, pallets, a loading dock, a door, a light switch, a vehicle such as a delivery truck, a shipping facility, a port, a hub, etc.). In addition, the operating system dynamically allocates the hierarchical roles (e.g., master and slave roles) that nodes perform over time in order to improve system performance, such as optimizing battery life across nodes, improving responsiveness, and achieving overall objectives. In some embodiments, optimization is achieved using a simulation environment for optimizing key performance indicators (PKIs).

In some embodiments, the nodes are programmed to operate individually or collectively as autonomous intelligent agents. In some embodiments, nodes are configured to communicate and coordinate actions and respond to events. In some embodiments, a node is characterized by its identity, its mission, and the services that it can provide to other nodes. A node's identity is defined by its capabilities (e.g., battery life, sensing capabilities, and communications interfaces). A node's mission (or objective) is defined by the respective program code, instructions, or directives it receives from another node (e.g., a server or a master node) and the actions or tasks that it performs in accordance with that program code, instructions, or directives (e.g., sense temperature every hour and send temperature data to a master node to upload to a server). A node's services define the functions or tasks that it is permitted to perform for other nodes (e.g., retrieve temperature data from a peripheral node and send the received temperature data to the server). At least for certain tasks, once programmed and configured with their identities, missions, and services, nodes can communicate with one another and request services from and provide services to one another independently of the server.

Thus, in accordance with the runtime operating system every agent knows its objectives (programmed). Every agent knows which capabilities/resources it needs to fulfill objective. Every agent communicates with every other node in proximity to see if it can offer the capability. Examples include communicate data to the server, authorize going to lower power level, temperature reading, send an alert to local hub, send location data, triangulate location, any boxes in same group that already completed group objectives.

Nodes can be associated with items. Examples of an item includes, but are not limited to for example, a package, a box, pallet, a container, a truck or other conveyance, infrastructure such as a door, a conveyor belt, a light switch, a road, or any other thing that can be tracked, monitored, sensed, etc. or that can transmit data concerning its state or environment. In some examples, a server or a master node may associate the unique node identifiers with the items.

Communication paths between tape and/or non-tape nodes may be represented by a graph of edges between the corresponding assets (e.g., a storage unit, truck, or hub). In some embodiments, each node in the graph has a unique identifier. A set of connected edges between nodes is represented by a sequence of the node identifiers that defines a communication path between a set of nodes.

Figure 10A:
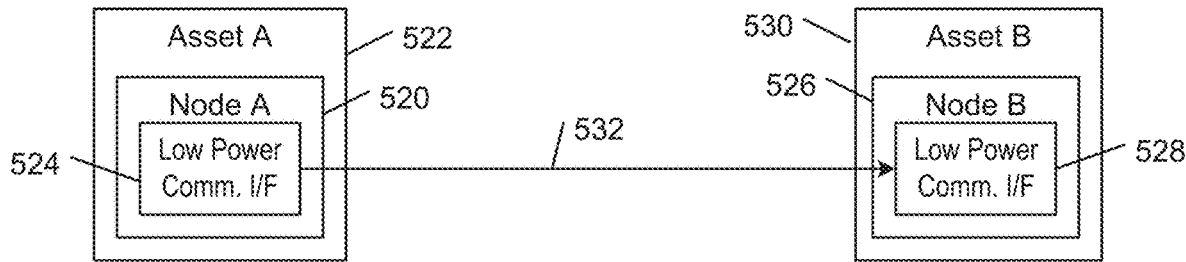
FIGS. 10A-10E are diagrammatic views of exemplary use cases for a distributed agent operating system, according to some embodiments.

Referring to FIG. 10A, a node 520 (Node A) is associated with an asset 522 (Asset A). In some embodiments, the node 520 may be implemented as a tape node that is used to seal the asset 522 or it may be implemented as a label node that is used to label the asset 522; alternatively, the node 520 may be implemented as a non-tape node that is inserted within the asset 522 or embedded in or otherwise attached to the interior or exterior of the asset 522. In the illustrated embodiment, the node 520 includes a low power communications interface 524 (e.g., a Bluetooth Low Energy communications interface). Another node 526 (Node B), which is associated with another asset 530 (Asset B), is similarly equipped with a compatible low power communications interface 528 (e.g., a Bluetooth Low Energy communications interface).

In an example scenario, in accordance with the programmatic code stored in its memory, node 526 (Node B) requires a connection to node 520 (Node A) to perform a task that involves checking the battery life of Node A. Initially, Node B is unconnected to any other nodes. In accordance with the programmatic code stored in its memory, Node B periodically broadcasts advertising packets into the surrounding area. When the other node 520 (Node A) is within range of Node B and is operating in a listening mode, Node A will extract the address of Node B and potentially other information (e.g., security information) from an advertising packet. If, according to its programmatic code, Node A determines that it is authorized to connect to Node B, Node A will attempt to pair with Node B. In this process, Node A and Node B determine each other's identities, capabilities, and services. For example, after successfully establishing a communication path 532 with Node A (e.g., a Bluetooth Low Energy formatted communication path), Node B determines Node A's identity information (e.g., master node), Node A's capabilities include reporting its current battery life, and Node A's services include transmitting its current battery life to other nodes. In response to a request from Node B, Node A transmits an indication of its current battery life to Node B.

Figure 10B:
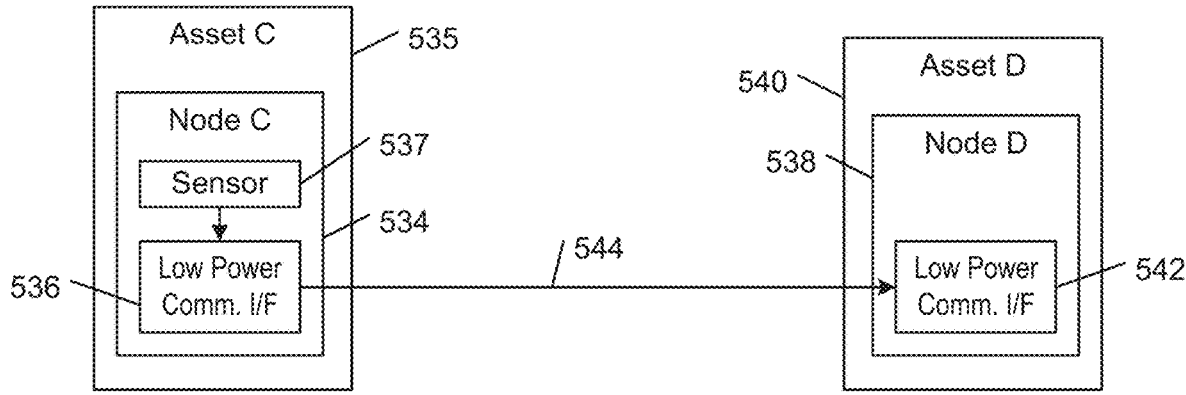

Referring to FIG. 10B, a node 534 (Node C) is associated with an asset 535 (Asset C). In the illustrated embodiment, the Node C includes a low power communications interface 536 (e.g., a Bluetooth Low Energy communications interface), and a sensor 537 (e.g., a temperature sensor). Another node 538 (Node D), which is associated with another asset 540 (Asset D), is similarly equipped with a compatible low power communications interface 542 (e.g., a Bluetooth Low Energy communications interface).

In an example scenario, in accordance with the programmatic code stored in its memory, Node D requires a connection to Node C to perform a task that involves checking the temperature in the vicinity of Node C. Initially, Node D is unconnected to any other nodes. In accordance with the programmatic code stored in its memory, Node D periodically broadcasts advertising packets in the surrounding area. When Node C is within range of Node D and is operating in a listening mode, Node C will extract the address of Node D and potentially other information (e.g., security information) from the advertising packet. If, according to its programmatic code, Node C determines that it is authorized to connect to Node D, Node C will attempt to pair with Node D. In this process, Node C and Node D determine each other's identities, capabilities, and services. For example, after successfully establishing a communication path 544 with Node C (e.g., a Bluetooth Low Energy formatted communication path), Node D determines Node C's identity information (e.g., a peripheral node), Node C's capabilities include retrieving temperature data, and Node C's services include transmitting temperature data to other nodes. In response to a request from Node D, Node C transmits its measured and/or locally processed temperature data to Node D.

Figure 10C:
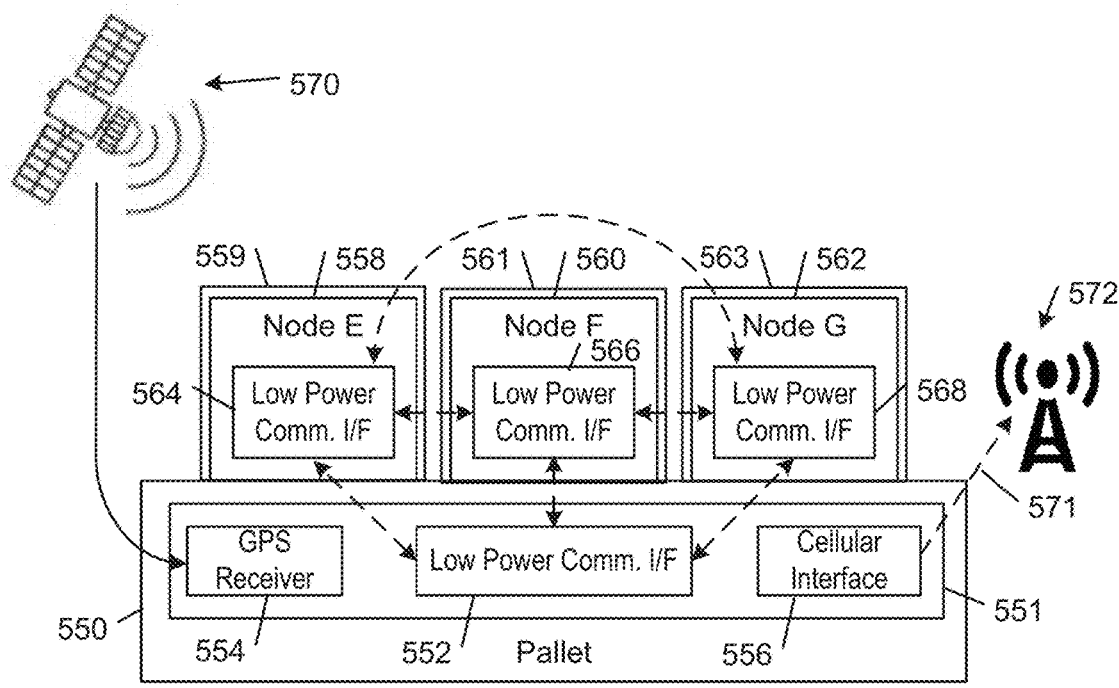

Referring to FIG. 10C, a pallet 550 is associated with a master node 551 that includes a low power communications interface 552, a GPS receiver 554, and a cellular communications interface 556. In some embodiments, the master node 551 may be implemented as a tape node or a label node that is adhered to the pallet 550. In other embodiments, the master node 551 may be implemented as a non-tape node that is inserted within the body of the pallet 550 or embedded in or otherwise attached to the interior or exterior of the pallet 550.

The pallet 550 provides a structure for grouping and containing assets 559, 561, 563 each of which is associated with a respective peripheral node 558, 560, 562 (Node E, Node F, and Node G). Each of the peripheral nodes 558, 560, 562 includes a respective low power communications interface 564, 566, 568 (e.g., Bluetooth Low Energy communications interface). In the illustrated embodiment, each of the nodes E, F, G and the master node 551 are connected to each of the other nodes over a respective low power communications path (shown by dashed lines).

In some embodiments, the assets 559, 561, 563 are grouped together because they are related. For example, the assets 559, 561, 563 may share the same shipping itinerary or a portion thereof. In an example scenario, the master pallet node 550 scans for advertising packets that are broadcasted from the peripheral nodes 558, 560, 562. In some examples, the peripheral nodes broadcast advertising packets during respective scheduled broadcast intervals. The master node 551 can determine the presence of the assets 559, 561, 563 in the vicinity of the pallet 550 based on receipt of one or more advertising packets from each of the nodes E, F, and G. In some embodiments, in response to receipt of advertising packets broadcasted by the peripheral nodes 558, 560, 562, the master node 551 transmits respective requests to the server to associate the master node 551 and the respective peripheral nodes 558, 560, 562. In some examples, the master tape node requests authorization from the server to associate the master tape node and the peripheral tape nodes. If the corresponding assets 559, 561, 563 are intended to be grouped together (e.g., they share the same itinerary or certain segments of the same itinerary), the server authorizes the master node 551 to associate the peripheral nodes 558, 560, 562 with one another as a grouped set of assets. In some embodiments, the server registers the master node and peripheral tape node identifiers with a group identifier. The server also may associate each node ID with a respective physical label ID that is affixed to the respective asset.

In some embodiments, after an initial set of assets is assigned to a multi-asset group, the master node 551 may identify another asset arrives in the vicinity of the multi-asset group. The master node may request authorization from the server to associate the other asset with the existing multi-asset group. If the server determines that the other asset is intended to ship with the multi-asset group, the server instructs the master node to merge one or more other assets with currently grouped set of assets. After all assets are grouped together, the server authorizes the multi-asset group to ship. In some embodiments, this process may involve releasing the multi-asset group from a containment area (e.g., customs holding area) in a shipment facility.

In some embodiments, the peripheral nodes 558, 560, 562 include environmental sensors for obtaining information regarding environmental conditions in the vicinity of the associated assets 559, 561, 563. Examples of such environmental sensors include temperature sensors, humidity sensors, acceleration sensors, vibration sensors, shock sensors, pressure sensors, altitude sensors, light sensors, and orientation sensors.

In the illustrated embodiment, the master node 551 can determine its own location based on geolocation data transmitted by a satellite-based radio navigation system 570 (e.g., GPS, GLONASS, and NAVSTAR) and received by the GPS receiver 554 component of the master node 551. In an alternative embodiment, the location of the master pallet node 551 can be determined using cellular based navigation techniques that use mobile communication technologies (e.g., GSM, GPRS, CDMA, etc.) to implement one or more cell-based localization techniques. After the master node 551 has ascertained its location, the distance of each of the assets 559, 561, 563 from the master node 551 can be estimated based on the average signal strength of the advertising packets that the master node 551 receives from the respective peripheral node. The master node 551 can then transmit its own location and the locations of the asset nodes E, F, and G to a server over a cellular interface connection with a cell tower 572. Other methods of determining the distance of each of the assets 559, 561, 563 from the master node 551, such as Received Signal-Strength Index (RSSI) based indoor localization techniques, also may be used.

In some embodiments, after determining its own location and the locations of the peripheral nodes, the master node 551 reports the location data and the collected and optionally processed (e.g., either by the peripheral nodes peripheral nodes 558, 560, 562 or the master node 551) sensor data to a server over a cellular communication path 571 on a cellular network 572.

In some examples, nodes are able to autonomously detect logistics execution errors if assets that suppose to travel together no longer travel together, and raise an alert. For example, a node (e.g., the master node 551 or one of the peripheral nodes 558, 560, 562) alerts the server when the node determines that a particular asset 559 is being or has already been improperly separated from the group of assets. The node may determine that there has been an improper separation of the particular asset 559 in a variety of ways. For example, the associated node 558 that is bound to the particular asset 559 may include an accelerometer that generates a signal in response to movement of the asset from the pallet. In accordance with its intelligent agent program code, the associated node 558 determines that the master node 551 has not disassociated the particular asset 559 from the group and therefore broadcasts advertising packets to the master node, which causes the master node 551 to monitor the average signal strength of the advertising packets and, if the master node 551 determines that the signal strength is decreasing over time, the master node 551 will issue an alert either locally (e.g., through a speaker component of the master node 551) or to the server.

Figure 10D:
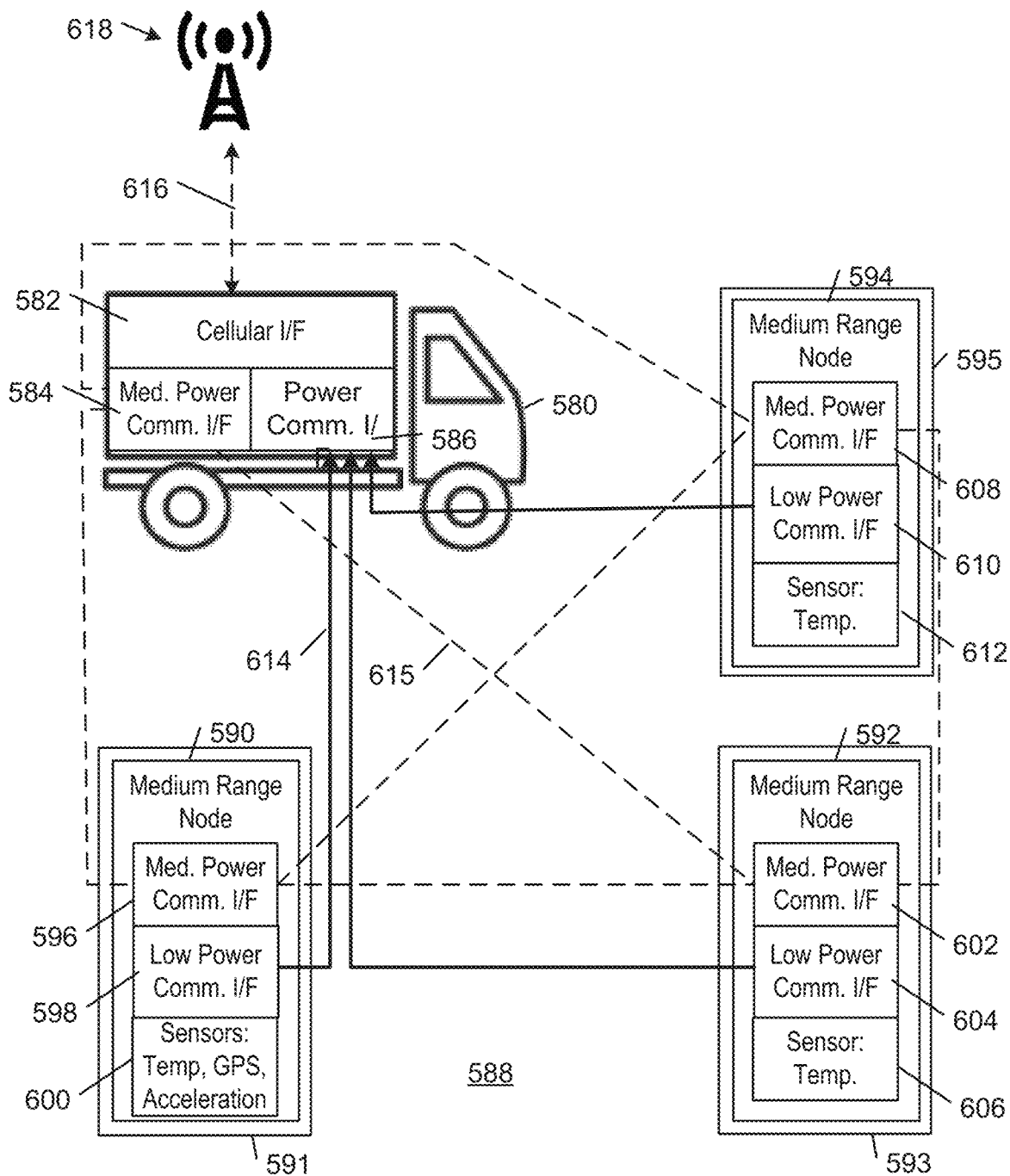

Referring to FIG. 10D, a truck 580 is configured as a mobile node or mobile hub that includes a cellular communications interface 582, a medium power communications interface 584, and a low power communications interface 586. The communications interfaces 580-586 may be implemented on one or more tape and non-tape nodes. In an illustrative scenario, the truck 580 visits a storage facility, such as a warehouse 588, to wirelessly obtain temperature data generated by temperature sensors in the medium range nodes 590, 592, 594. The warehouse 588 contains nodes 590, 592, and 594 that are associated with respective assets 591, 593, 595. In the illustrated embodiment, each node 590-594 is a medium range node that includes a respective medium power communications interface 596, 602, 608, a respective low power communications interface 598, 604, 610 and one or more respective sensors 600, 606, 612. In the illustrated embodiment, each of the asset nodes 590, 592, 594 and the truck 580 is connected to each of the other ones of the asset nodes through a respective medium power communications path (shown by dashed lines). In some embodiments, the medium power communications paths are LoRa formatted communication paths.

In some embodiments, the communications interfaces 584 and 586 (e.g., a LoRa communications interface and a Bluetooth Low Energy communications interface) on the node on the truck 580 is programmed to broadcast advertisement packets to establish connections with other network nodes within range of the truck node. A warehouse 588 includes medium range nodes 590, 592, 594 that are associated with respective containers 591, 593, 595 (e.g., assets, boxes, pallets, and the like). When the truck node's low power interface 586 is within range of any of the medium range nodes 590, 592, 594 and one or more of the medium range nodes is operating in a listening mode, the medium range node will extract the address of truck node and potentially other information (e.g., security information) from the advertising packet. If, according to its programmatic code, the truck node determines that it is authorized to connect to one of the medium range nodes 590, 592, 594, the truck node will attempt to pair with the medium range node. In this process, the truck node and the medium range node determine each other's identities, capabilities, and services. For example, after successfully establishing a communication path with the truck node (e.g., a Bluetooth Low Energy formatted communication path 614 or a LoRa formatted communication path 615), the truck node determines the identity information for the medium range node 590 (e.g., a peripheral node), the medium range node's capabilities include retrieving temperature data, and the medium range node's services include transmitting temperature data to other nodes. Depending of the size of the warehouse 588, the truck 580 initially may communicate with the nodes 590, 592, 594 using a low power communications interface (e.g., Bluetooth Low Energy interface). If any of the anticipated nodes fails to respond to repeated broadcasts of advertising packets by the truck 580, the truck 580 will try to communicate with the non-responsive nodes using a medium power communications interface (e.g., LoRa interface). In response to a request from the truck node 584, the medium range node 590 transmits an indication of its measured temperature data to the truck node. The truck node repeats the process for each of the other medium range nodes 592, 594 that generate temperature measurement data in the warehouse 588. The truck node reports the collected (and optionally processed, either by the medium range nodes 590, 592, 594 or the truck node) temperature data to a server over a cellular communication path 616 with a cellular network 618.

Figure 10E:
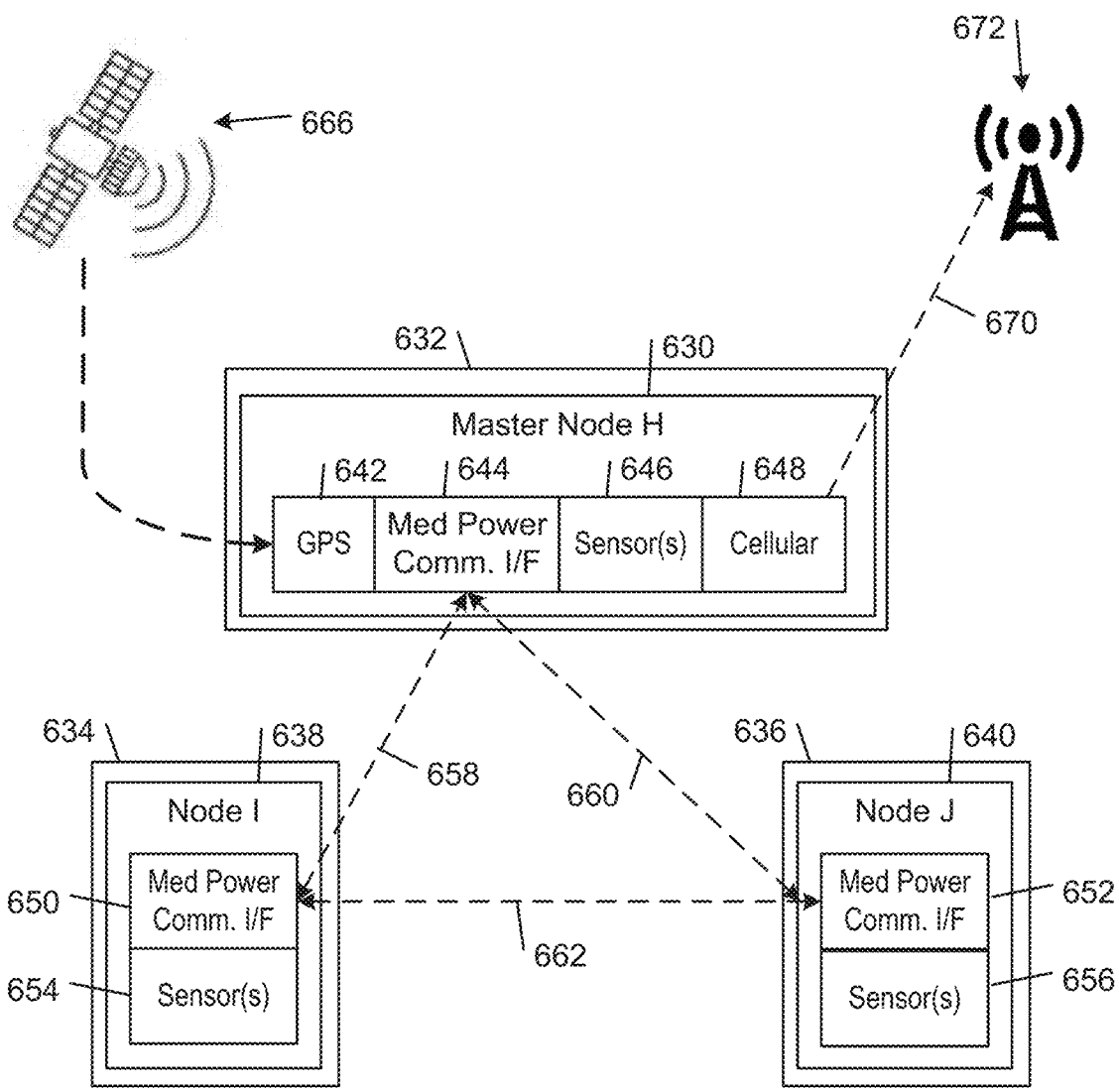

Referring to FIG. 10E, a master node 630 is associated with an item 632 (e.g., an asset) and grouped together with other items 634, 636 (e.g., assets) that are associated with respective peripheral nodes 638, 640. The master node 630 includes a GPS receiver 642, a medium power communications interface 644, one or more sensors 646, and a cellular communications interface 648. Each of the peripheral nodes 638, 640 includes a respective medium power communications interface 650, 652 and one or more respective sensors 654, 656. In the illustrated embodiment, the peripheral and master nodes are connected to one another other over respective pairwise communications paths (shown by dashed lines). In some embodiments, the nodes 630 638, 640 communicate through respective LoRa communications interfaces over LoRa formatted communications paths 658, 660, 662.

In the illustrated embodiment, the master and peripheral nodes 638, 638, 640 include environmental sensors for obtaining information regarding environmental conditions in the vicinity of the associated assets 632, 634, 636. Examples of such environmental sensors include temperature sensors, humidity sensors, acceleration sensors, vibration sensors, shock sensors, pressure sensors, altitude sensors, light sensors, and orientation sensors.

In accordance with the programmatic code stored in its memory, the master node 630 periodically broadcasts advertising packets in the surrounding area. When the peripheral nodes 638, 640 are within range of master node 630, and are operating in a listening mode, the peripheral nodes 638, 640 will extract the address of master node 630 and potentially other information (e.g., security information) from the advertising packets. If, according to their respective programmatic code, the peripheral nodes 638, 640 determine that hey are authorized to connect to the master node 630, the peripheral nodes 638, 640 will attempt to pair with the master node 630. In this process, the peripheral nodes 638, 640 and the master node and the peripheral nodes determine each other's identities, capabilities, and services. For example, after successfully establishing a respective communication path 658, 660 with each of the peripheral nodes 638, 640 (e.g., a LoRa formatted communication path), the master node 630 determines certain information about the peripheral nodes 638, 640, such as their identity information (e.g., peripheral nodes), their capabilities (e.g., measuring temperature data), and their services include transmitting temperature data to other nodes.

After establishing LoRa formatted communications paths 658, 660 with the peripheral nodes 638, 640, the master node 630 transmits requests for the peripheral nodes 638, 640 to transmit their measured and/or locally processed temperature data to the master node 630.

In the illustrated embodiment, the master node 630 can determine its own location based on geolocation data transmitted by a satellite-based radio navigation system 666 (e.g., GPS, GLONASS, and NAVSTAR) and received by the GPS receiver 642 component of the master node 630. In an alternative embodiment, the location of the master node 630 can be determined using cellular based navigation techniques that use mobile communication technologies (e.g., GSM, GPRS, CDMA, etc.) to implement one or more cell-based localization techniques. After the master node 630 has ascertained its location, the distance of each of the assets 634, 636 from the master node 630 can be estimated based on the average signal strength of the advertising packets that the master node 630 receives from the respective peripheral node. The master node 630 can then transmit its own location and the locations of the asset nodes E, F, and G to a server over a cellular interface connection with a cell tower 672. Other methods of determining the distance of each of the assets 634, 636 from the master node 630, such as Received Signal-Strength Index (RSSI) based indoor localization techniques, also may be used.

In some embodiments, after determining its own location and the locations of the peripheral nodes, the master node 630 reports the location data the collected and optionally processed (e.g., either by the peripheral nodes peripheral nodes 634, 636 or the master node 630) sensor data to a server over a cellular communication path 670 on a cellular network 672.

Dynamic Form Factors to Detect Path of Movement and Strategically Important Zones In fast-paced environments such as hospitals, assets may be moved frequently throughout buildings, wards, rooms, hallways, between outdoor and indoor areas, other areas, or other sections of an area. It is valuable to track assets and the location of the assets as movement occurs in order to ensure that assets are accounted for, e.g., are not lost or misrepresented as being in or out of use. However, because assets may be moved quickly and unpredictably, there are difficulties in optimizing power usage and accurate data collection for asset tracking.

A wireless sensing system monitors heartbeat signals received from tracking devices on assets to monitor locations and usage information for the assets. The tracking device is a tape node, according to some embodiments. Heartbeat signals are signals transmitted periodically by tracking devices or nodes of the wireless sensing system associated with assets, e.g., tape nodes adhered or affixed to machines or items. The heartbeat signals allow for the monitoring of the assets, while minimizing the power consumption of the tracking devices. For example, the heartbeat signal may include a lower volume of data than other signals transmitted by the tracking device. In some embodiments, the data included in the heartbeat signal includes a unique identifier for the tracking device and an indicator for whether the tracking device is functioning. For most applications, heartbeat signals are transmitted infrequently, e.g., once a day, once an hour. However, in fast-paced environments such as hospitals, it is possible for assets to be moved too quickly for heartbeat signals to provide enough information to accurately track the assets, especially when the heartbeat signal is transmitted at a low frequency. For example, an asset such as a bed loaded onto an ambulance may be moved too quickly for the wireless sensing system to accurately determine the movement and location of the asset based on the received heartbeat signal. While increasing the frequency of the heartbeat signals, e.g., a heartbeat per second, may accommodate fast-moving assets, increasing the frequency of transmission increases the power consumption and reduces the battery life of the tracking devices.

In an embodiment, a wireless sensing system deploys one or more sets of gateway nodes through a building or area of interest to detect assets moving through gates, into or through areas, or past areas. The gateway nodes may be a wireless communication device incorporated into the infrastructure of a room, building, or an area, according to some embodiments. For example, the gateway node may be a wireless communication device that can be plugged into a power outlet. In other embodiments, the gateway node is an adhesive tape node that is installed on a portion of a room, building, or an area. The gateway node may be an adhesive tape node that has a longer communication range (e.g., a tape node including a LoRa, cellular, or satellite communication system) than a tape node installed on an asset for tracking the asset. Gates may be, for example, doorways, hallways, or other threshold areas. The gateway nodes may also be installed in areas other than a gate, such as a wall of a room. In an embodiment, a direction of movement through a gate may be used by the wireless sensing system to approximate a likely location for the asset. For example, an asset moving through an external loading door of a hospital is tagged by the wireless sensing system as most likely being loaded onto an ambulance. The one or more sets of gateway nodes are configured to receive heartbeat signals from tape nodes associated with assets and to determine, based on the respective signal strengths of the heartbeat signals, a direction of movement for assets.

In some embodiments, the one or more sets of gateway nodes are deployed in locations throughout a building or area of interest based on structural thresholds. For example, a first node of a set of gateway nodes is deployed on a front wall of a room and a second node of the set of gateway nodes is deployed on a back wall of the room, enabling the wireless sensing system to ensure that an asset is accurately tracked as passing through the door. The wireless sensing system determines based on relative signal strengths of communications received by the first node and the second node whether tape nodes associated with mobile assets have entered, moved through, or passed the room. In some examples, a node of a set of gateway nodes deployed inside of a room is further configured to conduct a check for an asset being within a room to confirm that the asset has moved through a doorway threshold.

In other embodiments, the one or more sets of gateway nodes are deployed in locations that correspond to boundaries of an area that are not defined by a structural threshold or component. For example, an area of interest may be a section of a room, hallway, outdoor area, or other area. A tape node may be installed on one or more objects or portions of the area that corresponds to a border or boundary of the area. The wireless sensing system may thus, track the movement of assets through the area, as described herein.

In an embodiment, the wireless sensing system trains and applies a machine learning model. The machine learning model is trained to receive as input one or more signals relevant to tracked locations of assets and to output a most likely direction of movement for the assets. The one or more signals may be, for example, one or more measurements of signal strength between nodes associated with assets and gateway nodes (e.g., RSSI signals from the gateway nodes), GPS or other location data associated with gateway nodes or nodes associated with assets, and the like. For example, the machine learning model generates a label identifying a direction (e.g., north, south, west, east), a name of a corresponding location (e.g., ambulance loading area, storage room, etc.), or the like based on one or more input signals that are relevant to the tracked location of the asset. In other examples, the trained machine learning model generates a prediction of whether the asset is in an area of interest (e.g., a room) based on one or more input signals that are relevant to the tracked location of the asset. In other examples, the trained machine learning model generates a prediction of whether the asset has entered, exited, or passed by an area of interest (e.g., a room) based on one or more input signals that are relevant to the tracked location of the asset In an embodiment, the wireless sensing system applies one or more clustering algorithms to data gathered describing movement of a plurality of assets through a building or other area of interest to determine strategically important zones. Strategically important zones may be, for example, areas wherein assets are likely to experience particular events (e.g., unloading or loading zones), areas wherein tape nodes associated with assets should enter a specific mode or initiate a specific mode of communication, and the like. In some embodiments, strategically important zones are delineated by geofences surrounding the strategically important zones. The wireless sensing system may determine appropriate geofences based on the clustering algorithms (e.g., automatically determining an appropriate size and shape of the strategically important zone based on historic movement of assets through or around the strategically important zone) or may request information describing strategically important zones from users of the wireless sensing system.

Responsive to identifying a strategically important zone, the wireless sensing system may transmit instructions to tape nodes based at least in part on proximity of the tape nodes to strategically important zones. For example, the wireless sensing system transmits instructions to tape nodes to identify certain contexts or locations in which a higher frequency heartbeat signal is required in order to optimize battery life while ensuring that adequate information is provided for each tape node. Because shorter range communications are more battery-efficient than longer range communications, it is beneficial for tape nodes to communicate heartbeat signals to gateway nodes when in short range. In an embodiment, gateway nodes are deployed to transmit leading indicator signals to tape nodes, gateway nodes, client devices, and/or other nodes of the system located throughout a building or area of interest or around a strategically important zone. In response to receiving the leading indicator signal, the tape nodes increase a frequency of transmission for a heartbeat signal corresponding to the tape nodes approaching a gate or strategically important zone. For example, a gateway node is located at an entrance of a loading zone and transmits the leading indicator signal to tape nodes within the loading zone. The tape nodes increase a frequency of heartbeat signal as the tape nodes move towards a threshold door, in response. In another example, one or more gateway nodes are located at conveyer belts and are configured to instruct tape nodes on the conveyer belt to increase a frequency of heartbeat signals within a threshold amount of time (e.g., increase heartbeat signal in 5 minutes).

In other embodiments, the gateway node may provide other or additional instructions to a tape node responsive to the tape node approaching or leaving a strategically important zone. For example, the gateway node may additionally instruct a tape node to increase or decrease an amount of sensor data collection, to increase or decrease an amount of data transmittal, to modify a means or channel for communication, to establish or disconnect to another entity of the wireless sensing system, and the like. In another example, the gateway node may instruct a tape node to decrease or reduce a frequency of heartbeat pings or other communications, e.g., at the threshold to a long-term storage room in which it is unlikely to be moved and, as such, can reduce communications to preserve battery life.

Figure 11A:
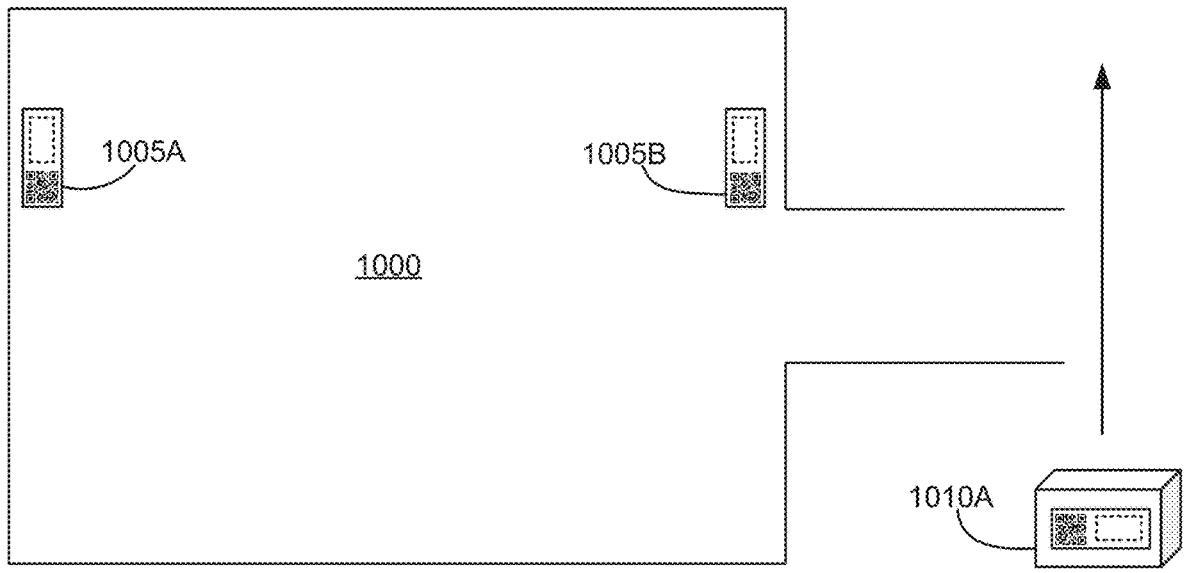
FIGS. 11A-11F are example illustrations using relative signal strength to determine paths for mobile assets, according to some embodiments.

FIGS. 11A-11F are example illustrations using relative signal strength to determine paths for mobile assets. In FIG. 11A, an environment 1000 comprises a first tape node 1005A affixed or adhered to a back wall of the environment and a second tape node 1005B affixed or adhered to a front wall of the environment. Collectively, the tape node 1005A and the tape node 1005B may be referred to as the tape nodes 1005. For example, the environment 1000 is a room, container, or other area of interest, and the tape nodes 1005 are affixed or adhered using an adhesive or other form factor. In some embodiments, one or more of the tape node 1005A and the tape node 1005B is not an embodiment of the adhesive tape platform, but a wireless communication device with a different form factor. For example, the tape node 1005A or the tape node 1005B may be a gateway device with a different form factor (e.g., a rigid form factor) than the adhesive tape platform. A tape node associated with a mobile asset 1010A moves past an entrance of the environment 1000, e.g., past a room without entering the room. Ivan embodiment, the tape node associated with the mobile asset 1010A establishes a communication connection with the first tape node 1005A and the second tape node 1005B and transmits sets of data to the first and second tape nodes. In other embodiments, the tape node 1010A transmits the sets of data to other nodes of the wireless sensing system 400. For example, the tape node 1010A may wirelessly transmit the data directly to a client device or a server of the wireless sensing system 400. In other embodiments, the tape nodes 1005 affixed or adhered to walls of the environment may capture data describing signal strength between the respective tape nodes 1005 and the tape node associated with the mobile asset 1010A. For example, the tape nodes 1005 may receive or determine an RSSI value for a signal received from the tape node associated with the mobile asset 1010A. The tape nodes 1005 transmit the sets of data to a server or cloud of the wireless sensing system 400 or to other nodes of the wireless sensing system 400, e.g., such that the tape node associated with the mobile asset 1010A does not capture, store, or transmit the signal strength data.

Figure 11B:
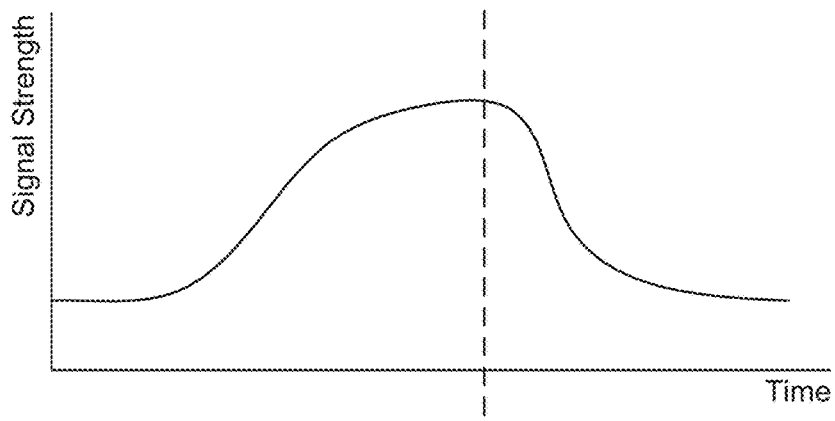
Figure 11B:
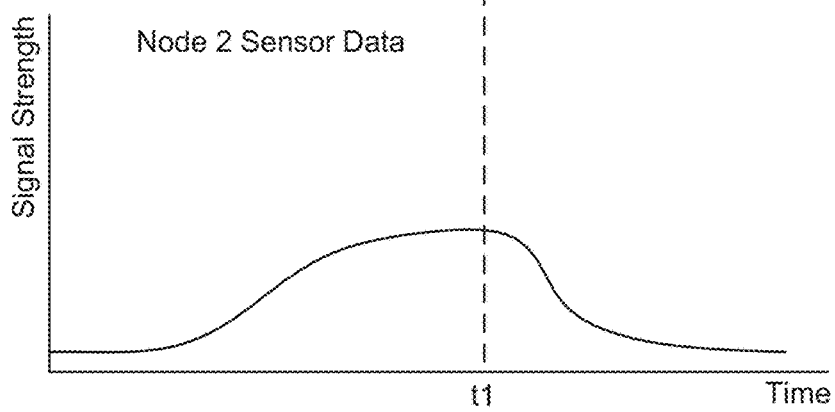

FIG. 11B is an example illustration of the sets of signal strength data describing movement of the mobile asset as shown in FIG. 11A. In an embodiment, the sets of data are received by the first and second tape nodes 1005 from the tape node associated with the mobile asset 1010A. In other embodiments, the tape nodes 1005 generate the data shown in FIG. 11B based on a wireless connection with the tape node associated with the mobile asset 1010A. The data illustrated by the curve 1115 show the signal strength of the communication between the first tape node 1005A and the tape node associated with the mobile asset 1010A. The signal strength peaks at a time t1, as seen in FIG. 11B. The data illustrated by the curve 1120 show the signal strength of the communication between the second tape node 1005B and the tape node associated with the mobile asset 1010A. The signal strength of the communication between the second tape node 1005B and the tape node associated with the mobile asset 1010A peaks at the same time t1. The signal strengths shown in FIGS. 11B, 11D, and 11F may be received signal strength indicator (RSSI) values, according to some embodiments. In the embodiment of FIG. 11A, the peaks occur at substantially the same time t1. The wireless sensing system determines that the mobile asset has moved perpendicularly past the first and second tape nodes 1005, and as such has not entered the environment 1000.

In other embodiments, the peaks of the RSSI values may occur at different times. For example, the mobile asset may move past the environment 1000 in a different (e.g., non-perpendicular) orientation. In another example, one or more of the tape nodes 1005 may experience latency affecting the relative peaks of the RSSI values. In another example, one or more of the tape nodes 1005 may be deployed in different areas of the environment 1000 impacting the relative peaks of the RSSI values, e.g., if the tape nodes are not deployed to be perpendicular to a path outside of the environment 1000 due to, for example, a configuration of a room or doors, windows, or other items within the room. In these embodiments, the wireless sensing system may determine that the mobile asset has moved past the first and second tape nodes 1005 and has not entered the environment 1000 based on both curves 1115, 1120 having a relative peak (or local peak, in some embodiments) RSSI value within a threshold amount of time from each other e. For example, if the threshold amount of time is 3 seconds, then the wireless sensing system may determine that the mobile asset has moved past the room (and not entered the room), based one of the curves having a relative peak less than 3 seconds before or after a corresponding peak in the other curve. In another embodiment, the wireless sensing system may determine that the mobile asset has moved past the first and second tape nodes 1005 and has not entered the environment 1000 based on both curves 1115, 1120 reaching a zero or near-zero RSSI value after a threshold amount of time has passed, e.g., such that the mobile asset has passed and moved out of range of the tape nodes 1005. In other embodiments, other patterns in the curves 1115, 1120 may occur while the mobile asset moves past the room without entering and staying in the room. Different patterns may arise which are based on the configuration and/or orientation of the tape nodes 1010 in the environment 1000. The wireless sensing system determines the trajectory of the mobile asset based on curves that correspond to the configuration, arrangement, and/or orientation of the tape nodes 1010 in the environment and the RSSI data.

Figure 11C:
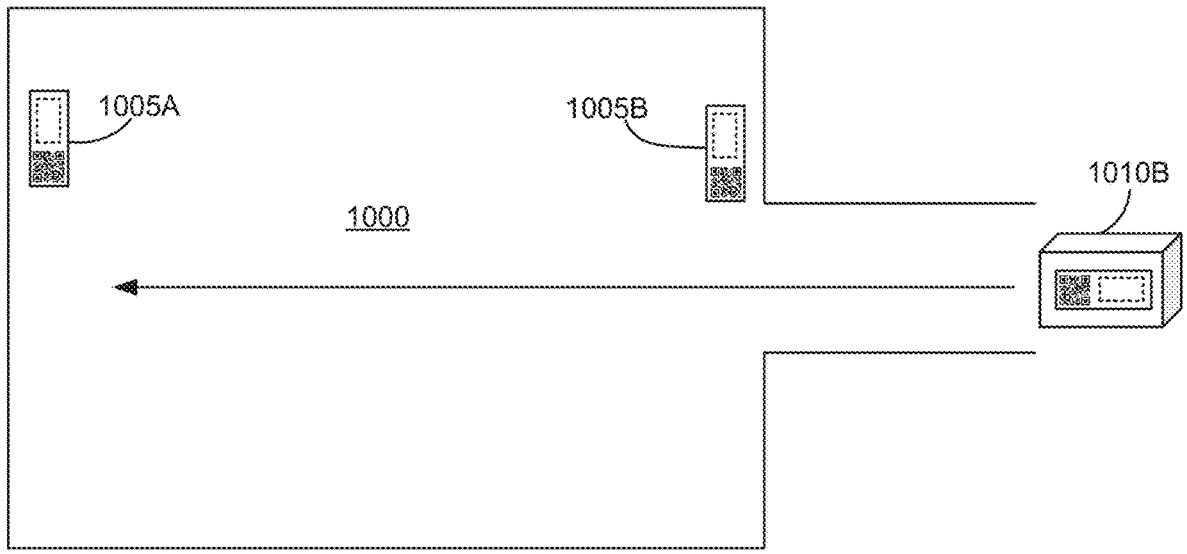

FIG. 11C illustrates the same environment 1000 as FIG. 11A, comprising a first tape node 1005A affixed or adhered to a back wall of the environment and a second tape node 1005B affixed or adhered to a front wall of the environment. A tape node associated with a mobile asset 1010B moves into or through the environment 1000, e.g., through a hallway or into a room. As discussed in conjunction with FIG. 11A, in some embodiments, the tape node associated with the mobile asset 1010B establishes a communication connection with the first tape node 1005A and the second tape node 1005B and transmits sets of data to the first and second tape nodes. In other embodiments, the tape nodes 1005 affixed or adhered to walls of the environment may capture data describing signal strength between the respective tape nodes 1005 and the tape node associated with the mobile asset 1010A. The tape nodes 1005 transmit the sets of data to a server or cloud of the wireless sensing system 400 or to other nodes of the wireless sensing system 400, e.g., such that the tape node associated with the mobile asset 1010A does not capture, store, or transmit the signal strength data.

Figure 11D:
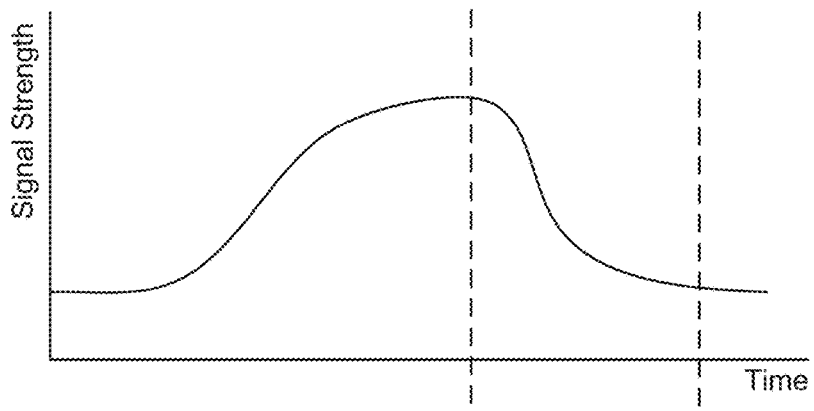
Figure 11D:
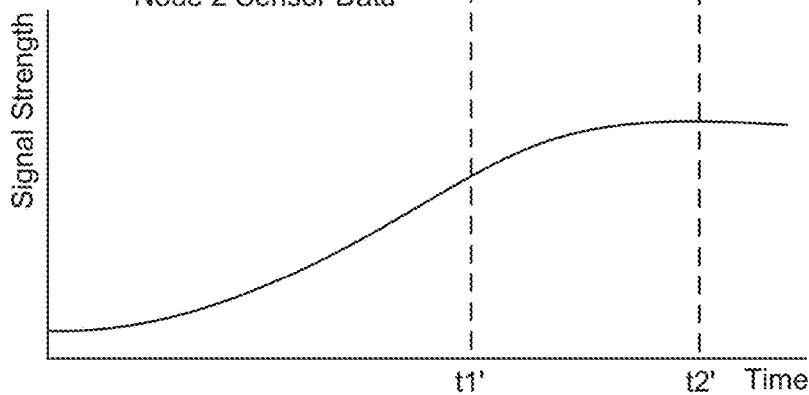

FIG. 11D is an example illustration of sets of data received by the first and second tape nodes 1005 from the tape node associated with the mobile asset 1010B. A first curve 1125 representing RSSI values (or other signal strength indicator values) for the communication between the first tape node 1005A and the tape node associated with the mobile asset 1010B peaks at a time t1'. A second curve 1130 representing RSSI values for the communication between the second tape node 1005B and the tape node associated with the mobile asset 1010A peaks at a later time t2'. In the embodiment illustrated in FIG. 11C, because the peaks occur at substantially different times t1' and t2' and the second curve 1130 experiences increasing RSSI values over time, the wireless sensing system determines that the mobile asset has moved parallel to the first and second tape nodes 1005 into the environment 1000. In some embodiments, the wireless sensing system determines that the mobile asset 1010B has moved into the environment 1000 based on one of the peaks occurring more than a threshold period of time before or after the occurrence of the other peak. In other embodiments, the wireless sensing system makes the determination based on the peaks occurring sequentially (e.g., at different times t1' and t2' that are more than a threshold amount of time apart), based on one or more threshold signal strengths being reached, based on the peak RSSI values of the second curve 1130 reaching a plateau for more than a threshold amount of time (or failing to decline more than a threshold amount for the threshold amount of time), or based on other patterns, methods, or data analysis. In some embodiments, the curve 1130 does not reach a peak (for example, if the mobile asset enters the room and then stops moving without moving farther away from the tape node 1005A. The wireless sensing system may determine that the mobile asset 1010B entered the environment 1000 based on the first curve 1125 having a peak and the second curve 1130 not having a peak.

Figure 11E:
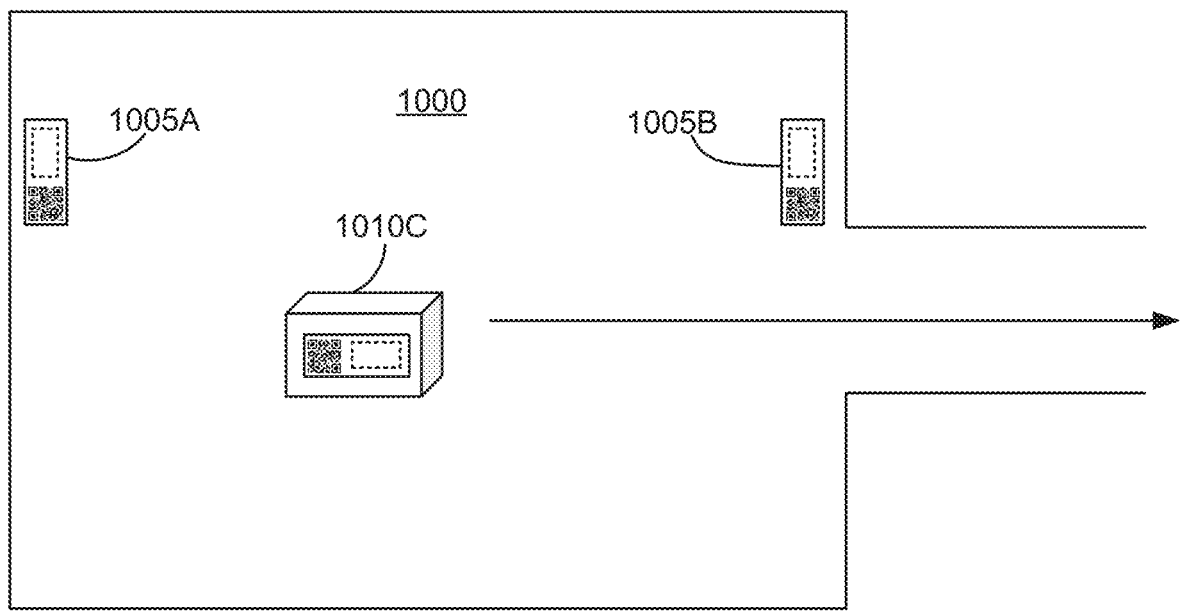

FIG. 11E illustrates the same environment 1000 as FIG. 11A, comprising a first tape node 1005A affixed or adhered to a back wall of the environment and a second tape node 1005B affixed or adhered to a front wall of the environment. A tape node associated with a mobile asset 1010B is inside of the environment 1000 and moves out of the environment, e.g., through a hallway or out of a room. As discussed in conjunction with FIG. 11A, in some embodiments, the tape node associated with the mobile asset 1010B establishes a communication connection with the first tape node 1005A and the second tape node 1005B and transmits sets of data to the first and second tape nodes. In other embodiments, the tape nodes 1005 affixed or adhered to walls of the environment may capture data describing signal strength between the respective tape nodes 1005 and the tape node associated with the mobile asset 1010A. The tape nodes 1005 transmit the sets of data to a server or cloud of the wireless sensing system 400 or to other nodes of the wireless sensing system 400, e.g., such that the tape node associated with the mobile asset 1010A does not capture, store, or transmit the signal strength data.

Figure 11F:
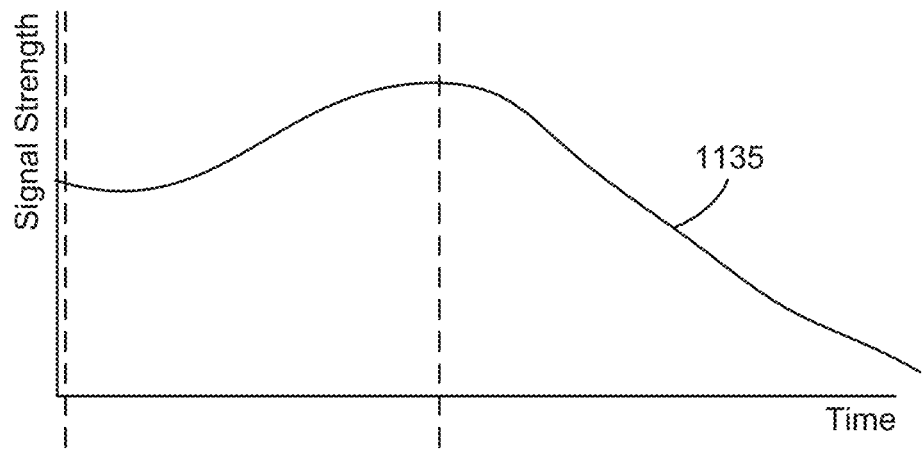
Figure 11F:
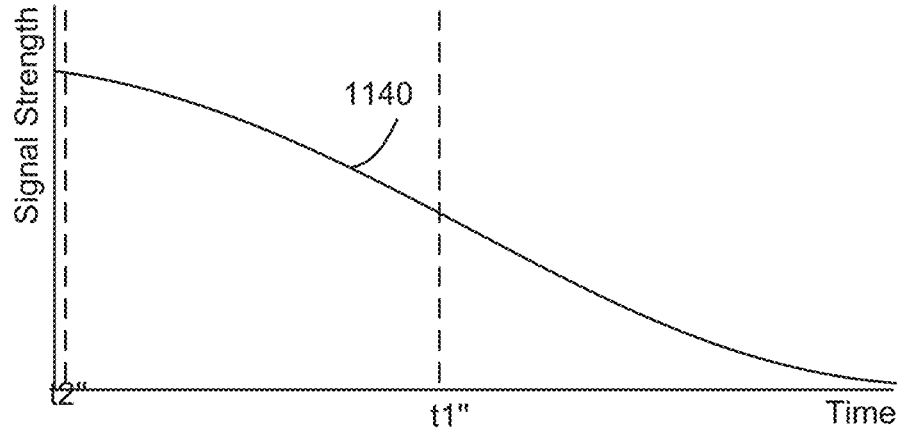

FIG. 11F is an example illustration of sets of data received by the first and second tape nodes 1005 from the tape node associated with the mobile asset 1010C. A first curve 1135 representing RSSI values for the communication between the first tape node 1005A and the tape node associated with the mobile asset 1010B peaks at a time t1'. A second curve 1140 representing RSSI values for the communication between the second tape node 1005B and the tape node associated with the mobile asset 1010C peaks at an earlier time t2'. In the embodiment illustrated in FIG. 11E, because the peaks occur at different times t1' and t2' and the second curve 1140 experiences a decrease in RSSI values over time, the wireless sensing system determines that the mobile asset has moved parallel to the first and second tape nodes 1005 out of the environment 1000. In other embodiments, the wireless sensing system makes the determination based on the peaks occurring sequentially (e.g., at different times t1' and t2' more than a threshold amount of time apart), based on one or more threshold signal strengths being reached (e.g., the signal strengths approaching zero or near-zero over time), based on the peak RSSI values of the first curve 1135 having a peak and then a subsequent decline to zero or near-zero over time, or based on other patterns, methods, or data analysis. In some embodiments, the wireless sensing system determines that the mobile asset 1010C has exited the environment 1000 based on both the first curve and the second curve having a downward or decreasing trend over a period of time.

Figure 12A:
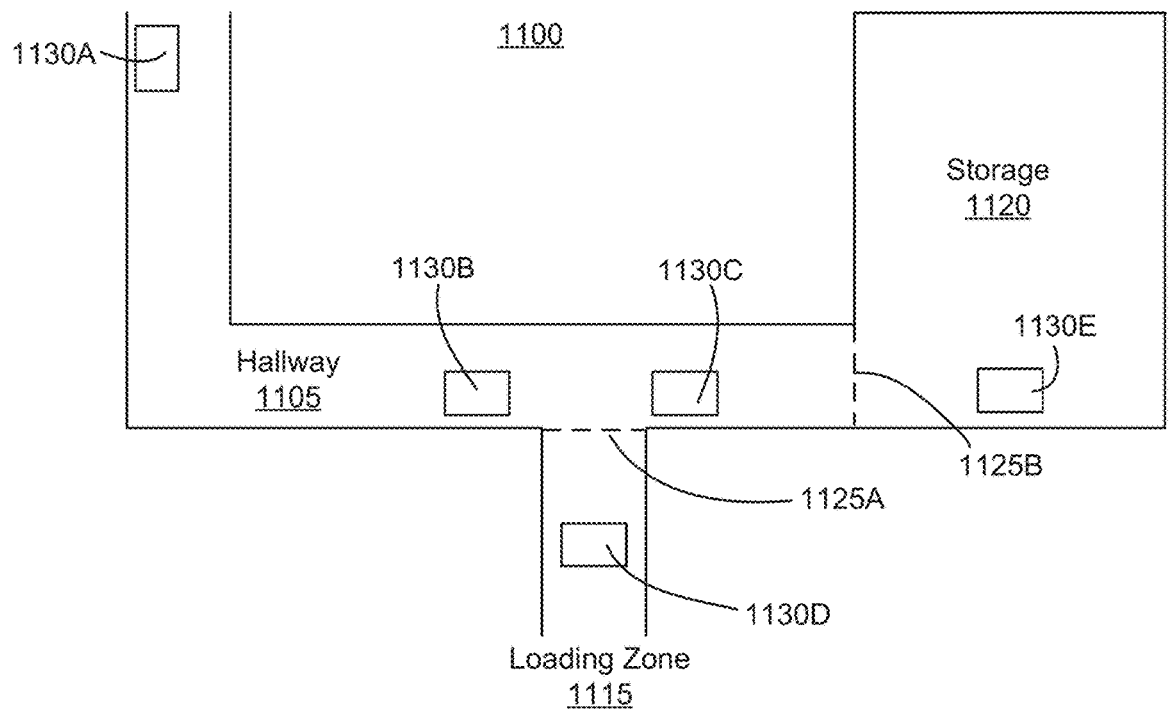
FIGS. 12A-12B are example illustrations of a wireless sensing system using gateway nodes to detect strategically important zones in an environment, according to some embodiments.

FIG. 12A is an example environment 1100 comprising a wireless sensing system having a plurality of gateway nodes 1130 configured to determine paths of movement for assets through gates. A hallway 1105 comprises of a first gate 1125A between the hallway and a loading zone 1115 and a second gate 1125B between the hallway and a storage area 1120. A first gateway node 1130A is deployed to transmit a leading indicator signal to tape nodes passing the first gateway node, and tape nodes within a range of the first gateway node increase a frequency of transmission of a heartbeat signal, responsive to receiving the leading indicator signal. A second set of gateway nodes 1130B, 1130C, 1130D are configured to determine whether a tape node associated with a moving asset moves through the first gate 1125A into the loading zone 1115 or passes by the first gate towards the second gate 1125B to the storage 1120.

Figure 12B:
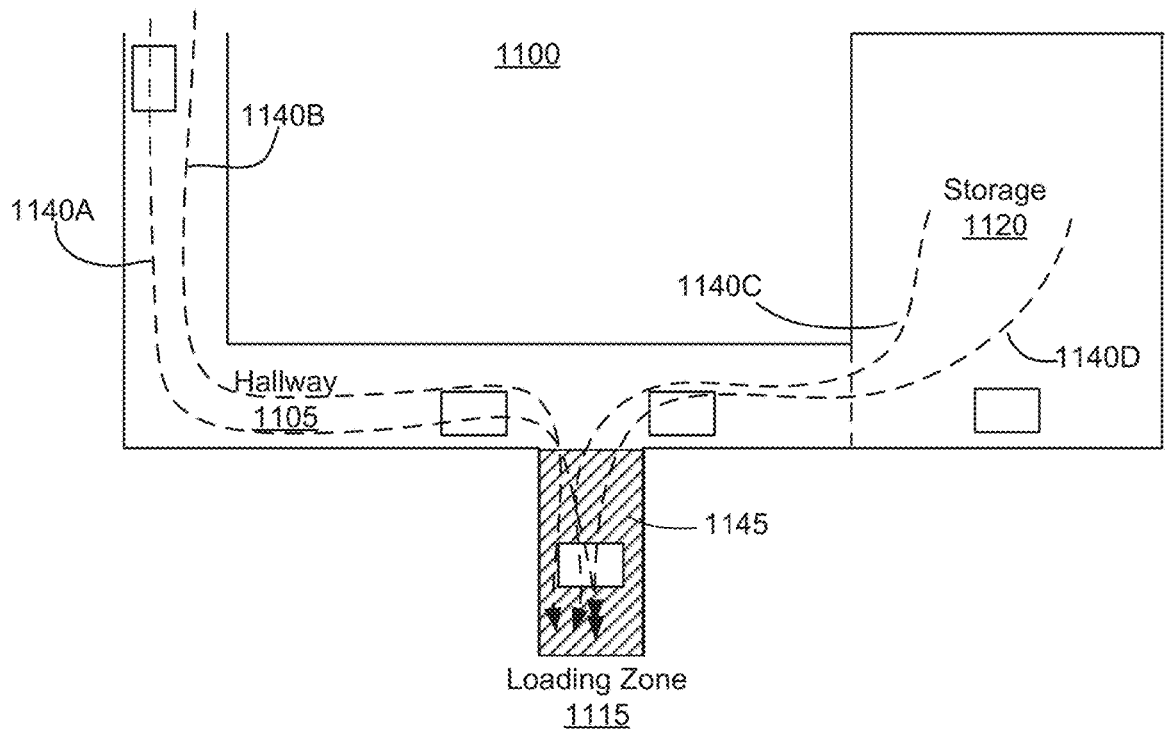

FIG. 12B shows the paths of a plurality of mobile assets moving through the example environment 1100 shown in FIG. 12A. The wireless sensing system identifies a plurality of paths 1140A-D corresponding to a plurality of mobile assets in the environment 1100. Based on the plurality of paths 1140, the wireless sensing system identifies a strategically important zone 1145 corresponding to the loading zone 1115. In an embodiment, the strategically important zone 1145 is delineated by geofences surrounding the strategically important zone. In an embodiment, the wireless sensing system identifies the strategically important zone 1145 using one or more clustering algorithms to the plurality of paths 1140. The clustering algorithms identify a common zone or zone capturing more than a threshold number of paths 1140. For example, the wireless sensing system identifies a strategically important zone 1145 as a loading/unloading zone in a storage facility based on a plurality of paths 1140 entering and exiting the storage facility through the strategically important zone, e.g., a plurality of paths begin and end communications with the wireless sensing system while moving in or through the loading/unloading zone. In other examples, strategically important zones 1145 may include storage areas wherein large numbers of assets are held, refrigeration units for cold chain assets, or areas of a facility wherein assets are processed, inspected, or otherwise altered in some way.

Responsive to the strategically important zone 1145 being identified, the wireless sensing system may transmit an instruction to tape nodes associated with mobile assets to modify one or more operations when the tape nodes approach, enter, leave, or otherwise interact with the strategically important zone or geofences corresponding to the strategically important zone. For example, the instructions to modify one or more operations may include one or more of: an instruction to enter a gate detection mode; an instruction to increase a frequency of communication; an instruction to decrease a frequency of communication; an instruction to enter a hibernation mode; an instruction to activate a particular form of communication. In the example of FIG. 12B, because a loading zone 1115 corresponds to a need for higher frequency communications due to assets moving quickly, the wireless sensing system detecting an mobile asset moving into strategically important zone 1145 transmits an instruction to a corresponding tape node to increase the communication frequency.

Figure 13A:
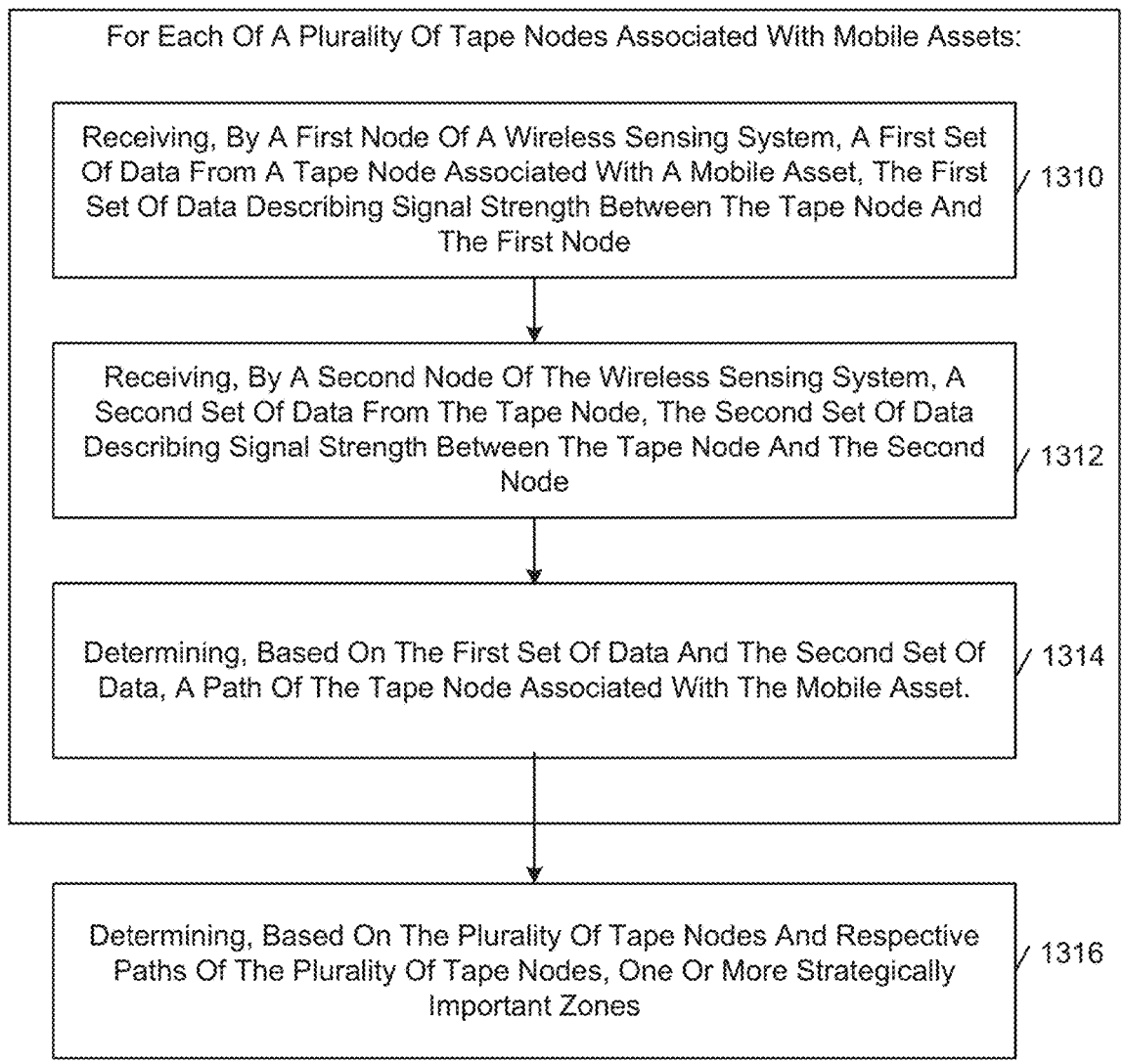
FIGS. 13A-13B are flow diagrams of methods for determining paths of movement and strategically important zones for assets in a wireless sensing system and altering the behavior of wireless devices traveling through the strategically important zones, according to some embodiments.

FIG. 13A is a flow diagram for a method 1301 for determining paths of assets and strategically important zones in an environment. For each of a plurality of tape nodes associated with mobile assets, a first node of the wireless sensing system receives a first set of data from the tape node associated with the mobile asset. The first set of data describes signal strength between the tape node and the first node (FIG. 13A, block 1310). A second node of the wireless sensing system receives a second set of data from the tape node associated with the mobile asset. The second set of data describes signal strength between the tape node and the second node (FIG. 13A, block 1312). Based on the first set of data and the second set of data, the wireless sensing system determines a path of the tape node associated with the mobile asset (FIG. 13A, block 1314). Based on the plurality of tape nodes and respective paths for the plurality of tape nodes, the wireless sensing system determines one or more strategically important zones (FIG. 13A, block 1316). In other embodiments, the method may include additional, fewer, or different steps, and the steps may be performed in a different order. In other embodiments, steps of the method may be performed by different components of the sensing system. The determined strategically important zone may include a geofence which characterizes the geographic boundary and area of the strategically important zone, according to some embodiments.

Figure 13B:
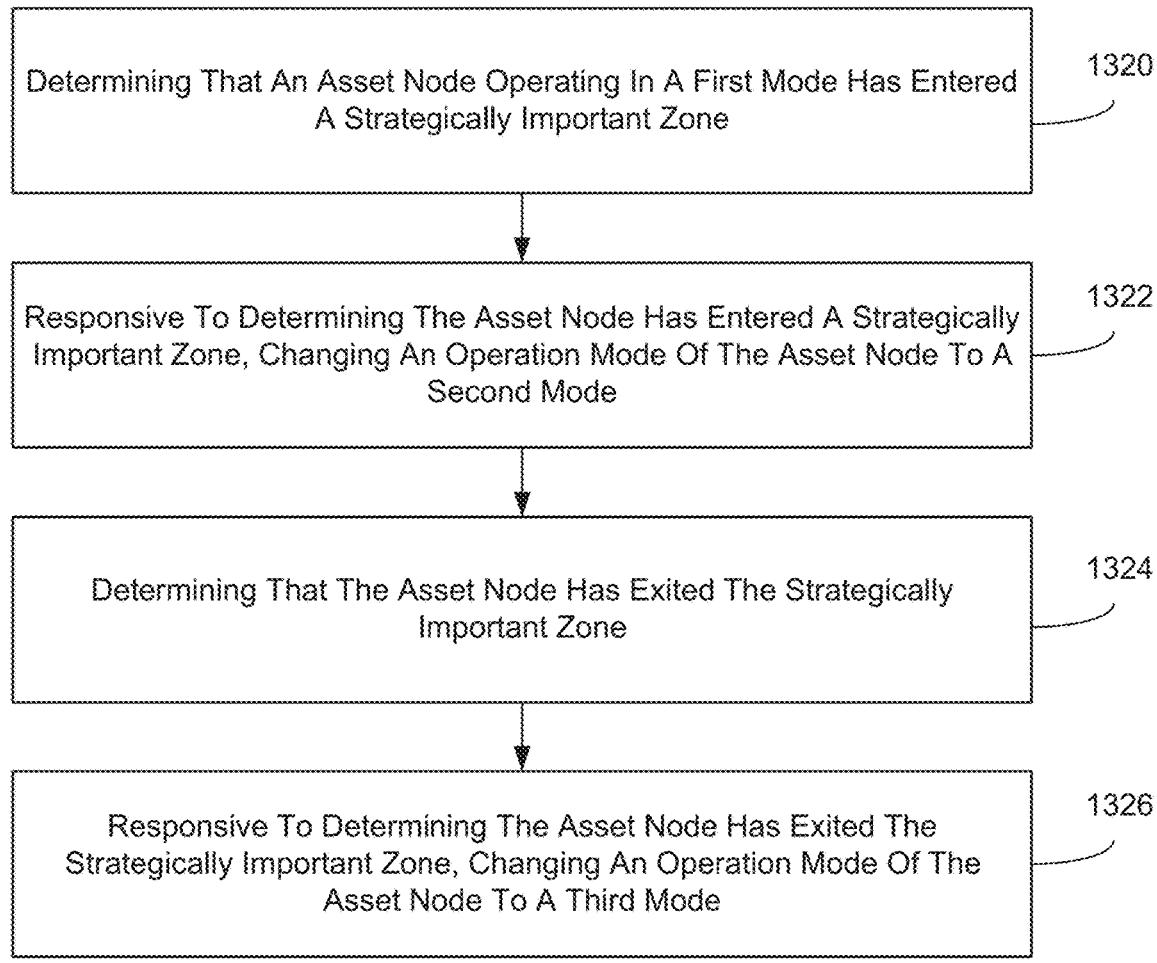

FIG. 13B is a flow diagram for a method 1303 of altering the behavior of a wireless tracking device on an asset (e.g., a tape node) based on the movement of the asset in and out of the strategically important zone, according to some embodiments. The wireless tracking device on the asset may also be referred to herein as an asset node.

The method 1303 includes determining 1320 that an asset node operating in a first mode has entered a strategically important zone. The determination 1320 may be made based on wireless communications with between the asset node and one or more gateway nodes associated with the strategically important zone, as discussed with respect to FIGS. 11A-11F. In other embodiments, the determination 1320 may be made by determining the location of the asset node as being inside a geofence associated with the strategically important zone. The location of the asset node may be determined using other data than data (e.g., RSSI data) corresponding to wireless communications between the asset node and gateway nodes associated with the strategically important zone, such as GPS location data or cellular-based location data (e.g., from cellular location triangulation) collected by a GPS system or cellular communication system onboard the asset node. The strategically important zone may be characterized by a geofence, as mentioned above. The geofence may be predetermined, defined by a user input into the tracking system using a client device, or by other methods, like the one shown in FIG. 13A. Responsive to determining the asset node has entered a strategically important zone, the asset node's operational mode is changed 1322 to a second mode. The second mode is a different operational mode than the first mode, according to some embodiments. The second mode includes functions, events, and logic for the asset node to follow, corresponding to the strategically important zone and one or more tasks assigned to the asset node. Examples of the strategically important zone and the second mode are described in further detail below, with respect to FIGS. 14A-14D.

Later in time, the asset node leaves the strategically important zone, and it is determined 1324 that the asset node has exited the strategically important zone. The determination 1324 may be based on wireless communications, as described above with respect to FIGS. 11A-11F. Responsive to determining the asset node has exited the strategically important zone, the asset node changes 1326 its operation mode to a third mode. The third mode may be different from the second mode, according to some embodiments. In some embodiments, the third mode is the same mode as the first mode.

The first mode, the second mode, and the third mode may include, but are not limited to, the following modes: a low communication mode where the asset node communicates with a first low frequency, a high communication mode where the asset node communicates with a second high frequency that is higher than the first low frequency, a stealth mode where the asset node restricts itself from making wireless transmissions, a sensor activation mode where a sensor of the asset node is activated and collects data, a sensor deactivation mode where a sensor of the asset node is deactivated and does not collect data, a high power mode where the asset node is configured to consume a high level of power, a low power mode where the asset node is configured to conserve battery or energy reserves by restricting power consumption to a low level of power lower than the high level, a hibernation mode where the asset node reduces the active functions of the asset node, a non-stealth mode where the asset node is configured to make wireless transmissions, other modes, and some combination thereof. The modes and the logic for transitioning between different modes may be part of a distributed intelligent software that is partially contained in the asset node. The distributed intelligent software is described in further detail in U.S. patent application Ser. No. 17/448,346, filed on Sep. 21, 2021, which is hereby incorporated by reference, in its entirety.

The asset node may be an embodiment of the adhesive tape platform, according to some embodiments, but is not limited thereto. The asset node may be another wireless node of the tracking system 400, including one with a form factor different from the adhesive tape platform. In some embodiments, the asset node is an embodiment of a mobile gateway. The asset node may be traveling on a vehicle, such as a car, a bicycle, a scooter or moped, a truck, a plane, a boat, or some other vehicle. According to some embodiments, the asset node is attached to an asset and tracks the location of the asset using methods described above.

Altering Behavior of Wireless Devices Based on Strategic Zones

FIGS. 14A-14D are diagrams illustrating examples of assets with associated tape nodes traveling through strategically important zones, according to some embodiments. FIGS. 14A-14D illustrate specific examples of strategically important zones and alterations to the behavior of an asset node 1410, 1412 when traveling through the strategically important zones.

Figure 14A:
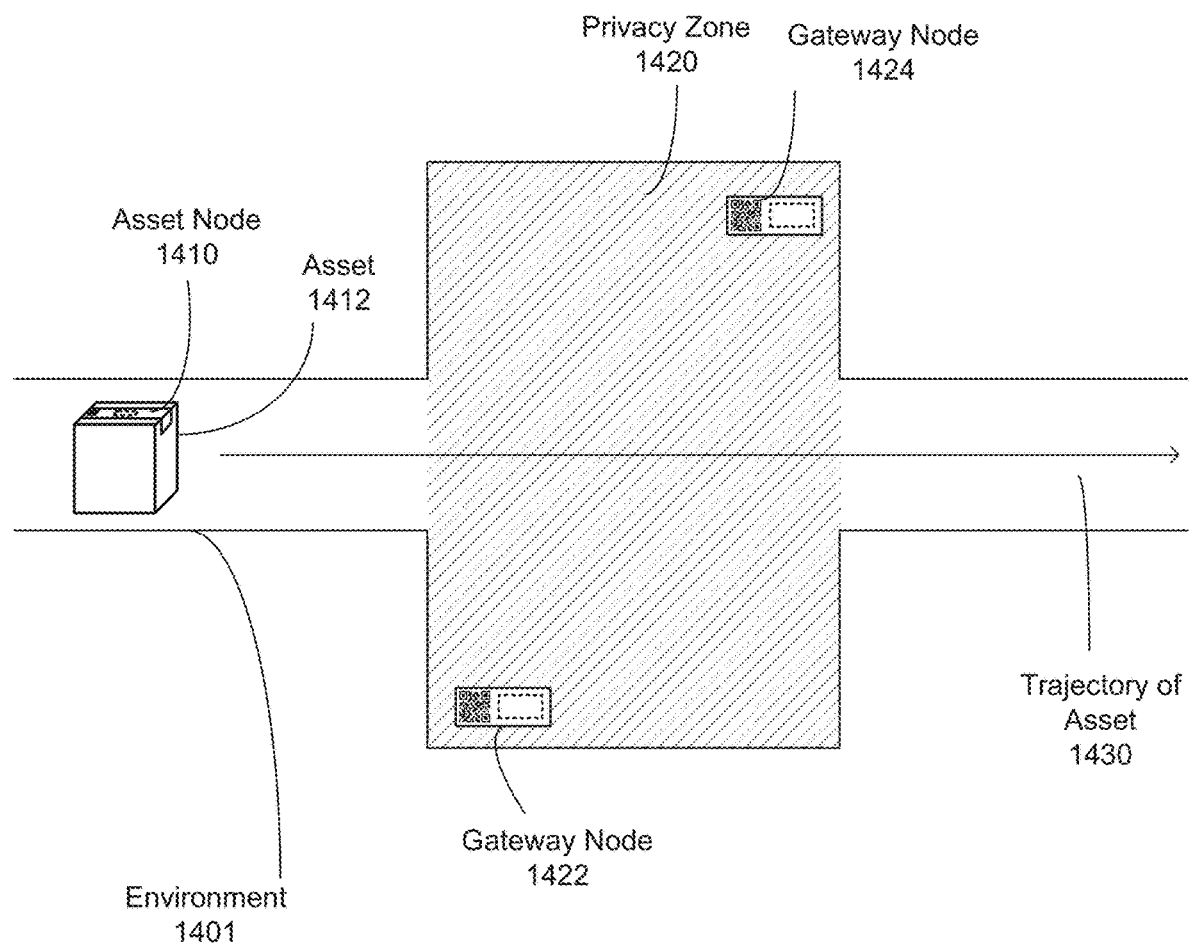
FIGS. 14A-14D are diagrams illustrating examples of assets with associated tape nodes traveling through strategically important zones, according to some embodiments.

FIG. 14A shows an example of an as asset node 1410 attached to an asset 1412 traveling through a strategically important zone which is a privacy zone 1420 geofenced by the shaded area in FIG. 14A. The privacy zone 1420 is part of an environment 1401, which may be an indoor environment, an outdoor environment, or some combination thereof. In the privacy zone 1420, wireless transmissions of the asset node's location are restricted to preserve privacy of a user or affiliate associated with the asset 1412. The privacy zone may correspond to an area where privacy policies require that the location of the asset 1412 or user data relevant to the asset not be tracked by the tracking system 400 or administrator of the tracking system 400. In this case, the asset node 1410 does not transmit or store the location of the asset 1412 while in the privacy zone. The same may apply to the gateway nodes 1422, 1424. The gateway nodes 1422, 1424 are used to detect when the asset node 1410 has entered the privacy zone 120, according to some embodiments, as described above.

As discussed herein, a gateway node is a wireless device associated with an area or an asset that is used to wirelessly communicate with multiple asset nodes within wireless communication range of the gateway node. The gateway node may be configured to store data and transmit data received from an asset node and transmit the data to other wireless nodes of the tracking system 400. The gateway node may also transmit data and wireless signals to the asset node 1410 to aid it in tasks, such as location tracking. For example, the gateway node may transmit a location of the gateway node to an asset node to aid the asset node in determining its own location. Similarly, the gateway node may receive a wireless transmission from an asset node and determine the asset node's location relative to the gateway node, and further determine the absolute location based on the gateway node's known location. A gateway node may be an embodiment of the adhesive tape platform. For example, a gateway node may be an example of a green tape node or a black tape node, as described above.

In some embodiments, the transmissions of the asset node's location is restricted for security reasons. For example, the privacy zone may be associated with a classified or high-security area, such as a military outpost. Users associated with the asset or the environment may require that location of the asset 1412 may not be tracked, so as to not compromise the security or classified nature of operations inside the privacy zone.

Figure 14B:
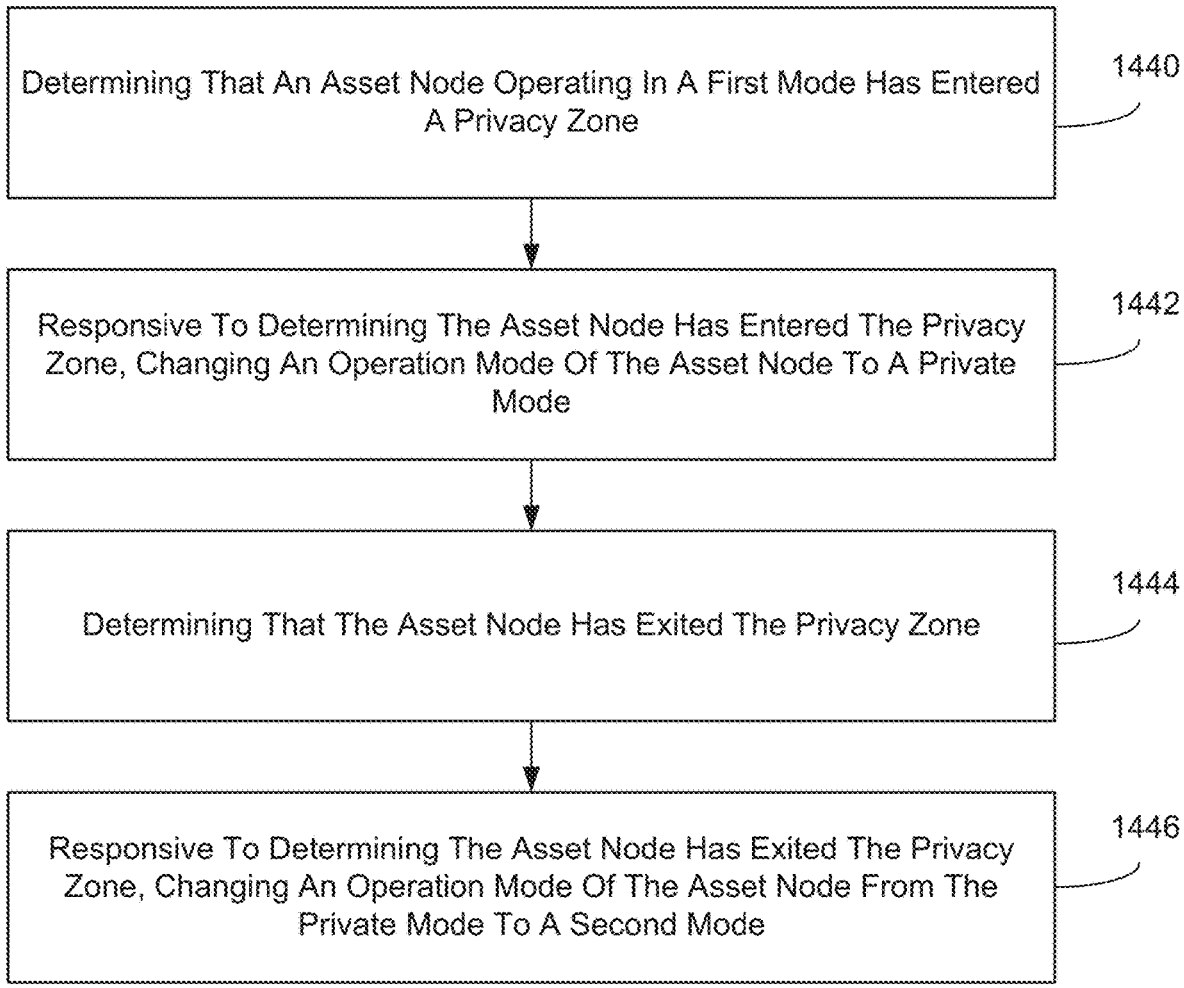

FIG. 14B is a flow diagram of a method for altering the behavior of an asset node traveling through a privacy zone, according to some embodiments. The method 1401 includes determining 1440 that an asset node operating in a first mode has entered a privacy zone. The determination 1440 is based on wireless communications with one or more wireless nodes associated with the privacy zone, according to some embodiments. Responsive to determining the asset node has entered the privacy zone, the asset node's operation mode is changed 1442 to a private mode 1442. While in the private mode, the tracking system does not track the location of the asset node, according to some embodiments. In further embodiments, the asset node does not transmit or store the location of the asset node while in the private mode. In some embodiments, other types of tracking, such as tracking of sensor measurements made by a sensor of the asset node, are disabled while in the private mode. In some embodiments, transmissions of any data that may include identifying information is restricted or disabled while in the private mode. This may be done in order to comply with privacy policies that apply to an area associated with the privacy zone.

At a later time, the asset node exits the privacy zone. It is determined 144 that the asset node has exited the privacy zone. This may be determined by nodes of the tracking system 400 or by the asset node itself. In one example, the asset node determines this based on wireless communications with one or more gateway nodes associated with the privacy zone, as illustrated in FIGS. 11E, 11F, and 14A. Responsive to determining the asset node has exited the privacy zone, an operation mode of the asset node changes 1446 from the private mode to a second mode. The second mode may be the same as the first mode, in some embodiments. The second mode is a non-private mode that does not carry the same privacy restrictions as the private mode. In other embodiments, the second mode is another private mode or the same private mode as in step 1442, and the asset node continues operating in the private mode until an event is detected that corresponds to entering a non-private operational mode.

Figure 14C:
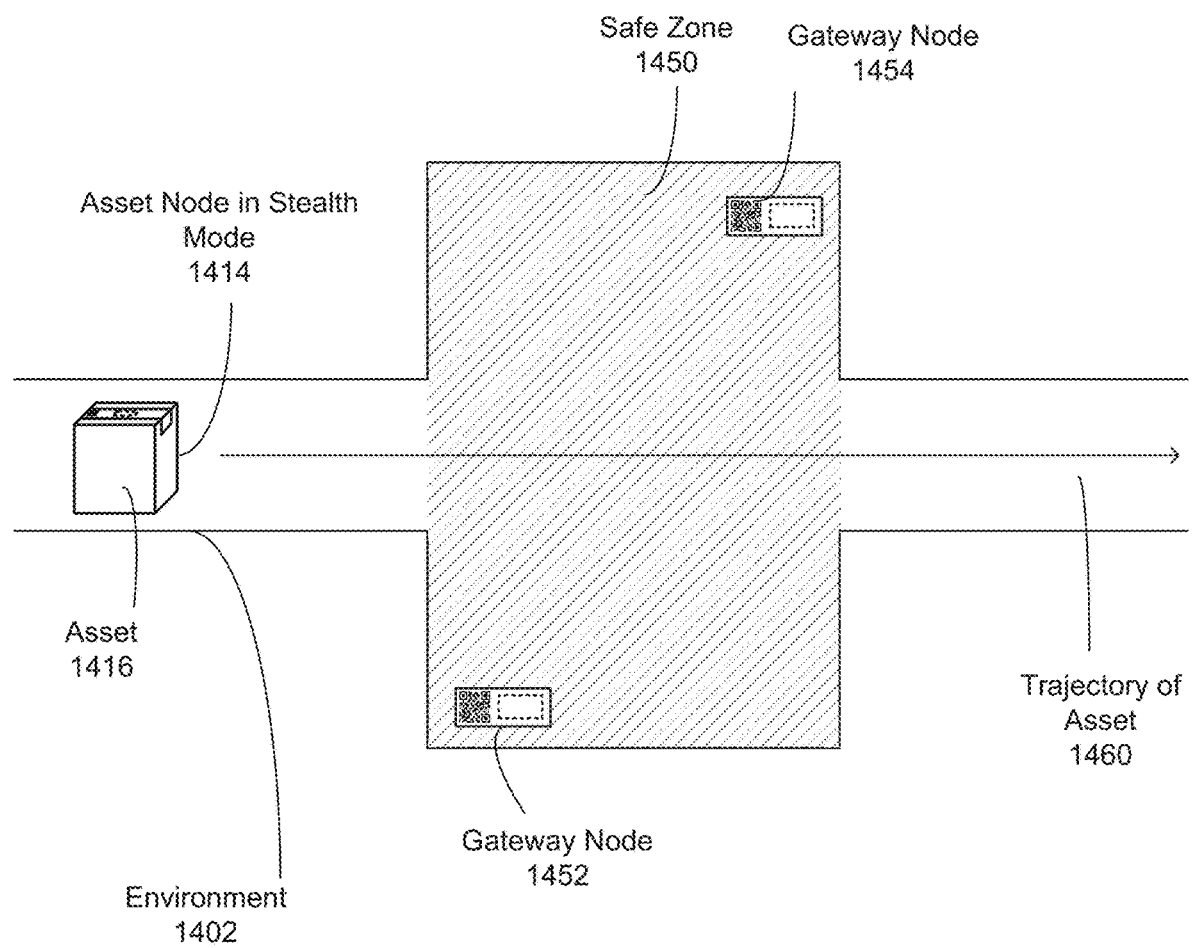

FIG. 14C shows an example of an as asset node 1414 attached to an asset 1416 traveling through a strategically important zone which is a safe zone 1450 geofenced by the shaded area in FIG. 14C. The safe zone 1450 is part of an environment 1402, which may be an indoor environment, an outdoor environment, or some combination thereof. Prior to entering the safe zone, the asset node 1414 operates in a stealth mode which restricts the asset node 1414 from making wireless transmissions. This may be done to prevent malicious actors from intercepting the wireless transmissions from the asset node 1414 and determining information on the asset 1416 or a user associated with the asset 1416, while the asset 1416 is outside of the safe zone. For example, outside of the safe zone there may be opportunities for malicious actors to intercept or tamper with the asset 1416. The stealth mode prevents malicious actors from identifying that the asset node 1414 is a wireless communication device, in some instances. In particular if the asset node 1414 is an adhesive tape platform, it is difficult for a malicious actor to distinguish the asset node 1414 from regular tape or labels.

In the safe zone 1450, wireless transmissions of the asset node's location are not restricted, and the asset node 1414 may change its operation mode from a stealth mode to a non-stealth mode. In the non-stealth mode, the asset node 1414 may transmit wireless data to other wireless nodes of the tracking system 400, such as the gateway nodes 1454, 1452. The asset node 1414 may transmit data stored on the memory of the asset node 1414, as well as communicate with the gateway nodes 1452, 1454 and/or other wireless nodes (such as client devices or a server of the tracking system 400) directly or indirectly. The safe zone 1450 may correspond to an area where the asset 1416 is secure and will not be intercepted by an unauthorized user. The gateway nodes 1422, 1424 are used to detect when the asset node 1410 has entered the privacy zone 120, according to some embodiments, as described above.

Figure 14D:
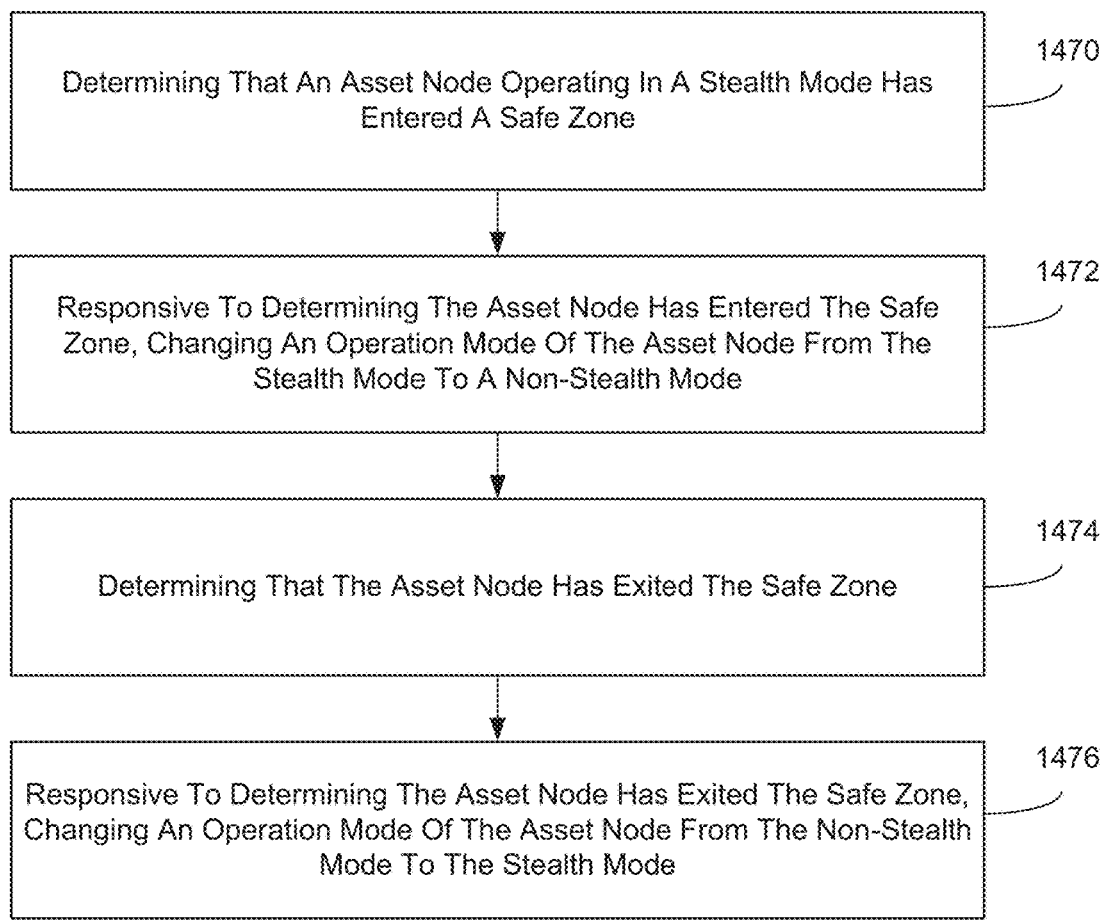

FIG. 14D is a flow diagram of a method 1403 for altering the behavior of an asset node traveling through a safe zone, according to some embodiments. The asset node is operating in the stealth mode while outside of the safe zone. The method 1401 includes determining 1470 that the asset node operating in the stealth mode has entered a safe zone. The determination 1440 is based on wireless communications with one or more wireless nodes associated with the privacy zone, according to some embodiments. Responsive to determining the asset node has entered the safe zone, the asset node's operation mode is changed 1472 to a non-stealth mode 1472. While in the non-stealth mode, the tracking system 400 enables the asset node to perform wireless transmissions to other wireless nodes of the tracking system 400. In some embodiments, other types of tracking, such as tracking of sensor measurements made by a sensor of the asset node, are disabled while in the stealth mode and enabled while in the non-stealth mode. The stealth mode may be used to comply with security policies that apply to sensitive assets or for security related applications, in some cases.

At a later time, the asset node exits the safe zone. It is determined 1474 that the asset node has exited the safe zone. This may be determined by nodes of the tracking system 400 or by the asset node itself. In one example, the asset node determines this based on wireless communications with one or more gateway nodes associated with the safe zone, as illustrated in FIGS. 11E, 11F, and 14C. Responsive to determining the asset node has exited the safe zone, an operation mode of the asset node changes 1476 from the non-stealth mode to the stealth mode. In some embodiments, the asset node changes to a different stealth mode from the stealth mode of the step 1470.

Figure 15:
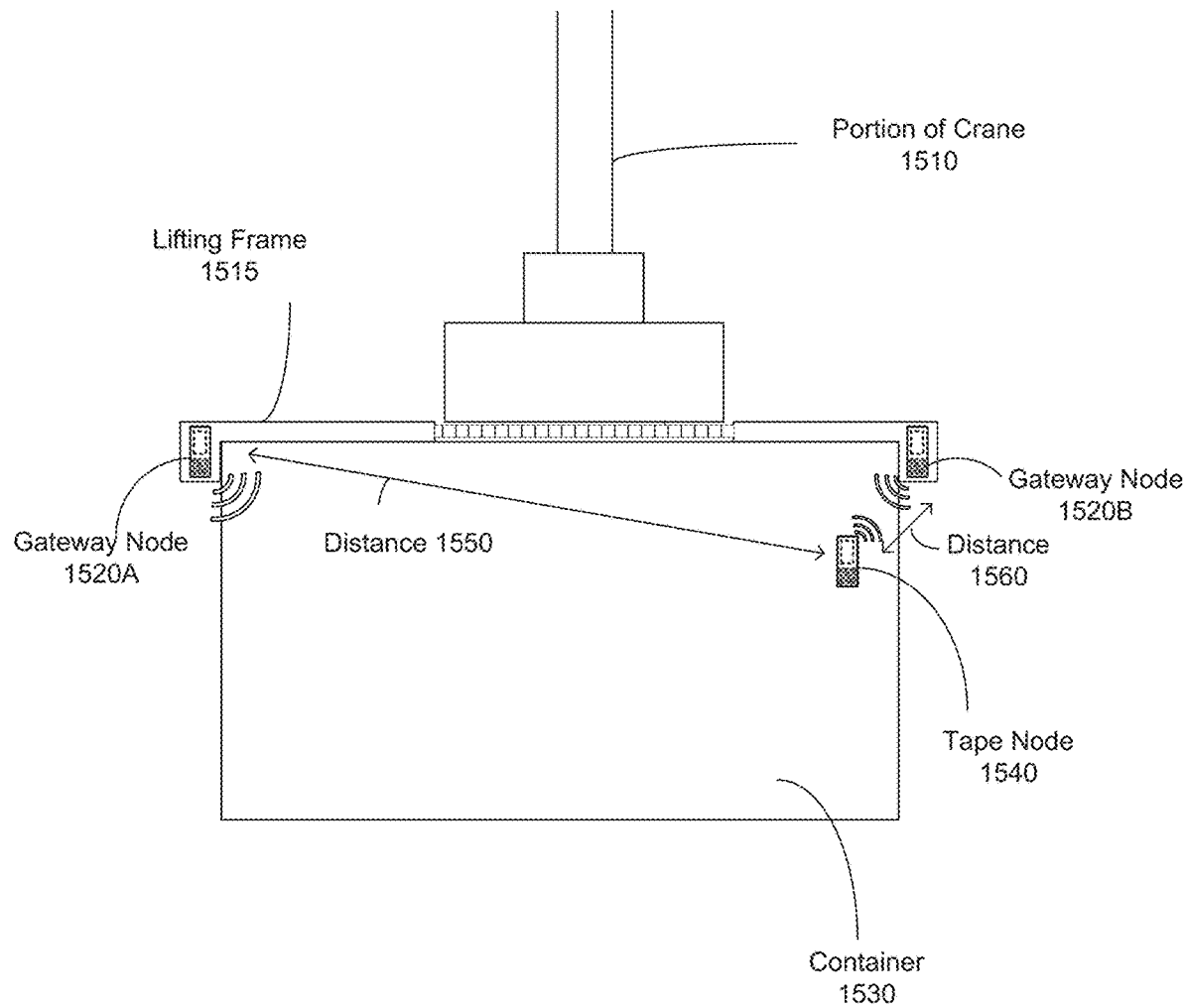
FIG. 15 is a diagram of an example of using wireless nodes of a tracking system to alter the operation of a tape node when an associated container or asset undergoes a strategically important interaction, according to some embodiments.

FIG. 15 is a diagram of an example of using wireless nodes of a tracking system to alter the operation of a tape node 1540 when an associated container 1530 or asset undergoes a strategically important interaction, according to some embodiments. The tape node 1540 is attached to the outside of the container 1530, in the embodiment illustrated in FIG. 15, but in other embodiments, the tape node 1540 may be contained inside the container 1530. For example, the tape node 1540 may be associated with an asset held inside the container 1530. The container 1530 may be a shipping container, an intermodal container, a different type of container, or another type of container. In other embodiments, the container 1530 is instead an asset that is not a container. Instead of changing an operation mode of the tape node 1540 while the tape node 1540 is located in a strategically important zone, as with the examples of FIGS. 14A-14D, the tape node 1540 has its operation mode changed when the container 1530 is experiencing a strategically important interaction with an object, person, or environment. In the example of FIG. 15, the strategically important interaction is an interaction of a crane 1510 lifting and/or moving the container 1530, according to some embodiments.

A portion of the crane 1510 is shown in FIG. 15. The crane 1510 may be a gantry crane, an overhead crane, a ship-to-shore crane, a container crane, a different type of crane, or some combination thereof. The crane 1510 includes a lifting frame 1515 which is configured to attach or grip to the container 1530 for lifting and transporting the container 1530. The lifting frame 1515 may be a spreader, a hook, or a different mechanism, according to some embodiments. When the lifting frame attaches to the container 1530, the tape node 1540 detects that the container 1530 is being lifted and/or transported by the crane 1510. The detection may be based at least in part on communications between the tape node 1540 and one or more gateway nodes 1520A, 1520B attached to the lifting frame. The gateway nodes may be embodiments of the adhesive tape platform adhered to the lifting frame. Although two gateway nodes 1520A, 1520B (collectively referred to herein as gateway nodes 1520) are shown in FIG. 15, a different number of gateway nodes 1520 may be attached to the lifting frame 1515 and the crane 1510.

For example, based on detected RSSI for communications between the gateway nodes 1520, distance from one of the gateway nodes 1520 to the tape node 1540 may be determined or estimated. The strategically important interaction may then be detected based on the determined distance of each of the gateway nodes 1520 to the tape node 1540 corresponding to the strategically important interaction. For example, if the determined distance between gateway node 1520A and tape node 1540 matches the distance 1550 and the determined distance between gateway node 1520B and the tape node 1540 matches the distance 1560 at a given time, the tracking system (e.g., via the tape node itself) may determine that the container 1530 is being lifted and/or transported by the crane 1510 at the given time. During the strategically important interaction, the tape node 1540 may enter a second operation mode that is different from a first operation mode that the tape node 1540 operates in outside of the strategically important interaction, according to some embodiments. In an example, the first operation mode is an operation mode where the tape node 1540 performs a particular wireless communication activity at a first frequency (e.g., once every minute). This may be the case when the container 1530 is stationary and stored in storage or shipping yard, for example. Since mobility of the container 1530 is low during this time, the tape node 1540 may not need to track or report its location very frequently. In the second operation mode, during the strategically important interaction, the second operation mode includes performing the particular wireless communication activity at a second frequency higher than the first frequency (e.g., once every 5 seconds). Since the container 1530 is highly mobile during the strategically important interaction, the tape node 1540 tracks and stores its location data with higher frequency and precision, to provide accurate information to the tracking system 400. In further embodiments, the second operation mode includes reporting data stored on the tape node's memory to one or more of the gateway nodes 1520, such as tampering data or event data.

Figure 16:
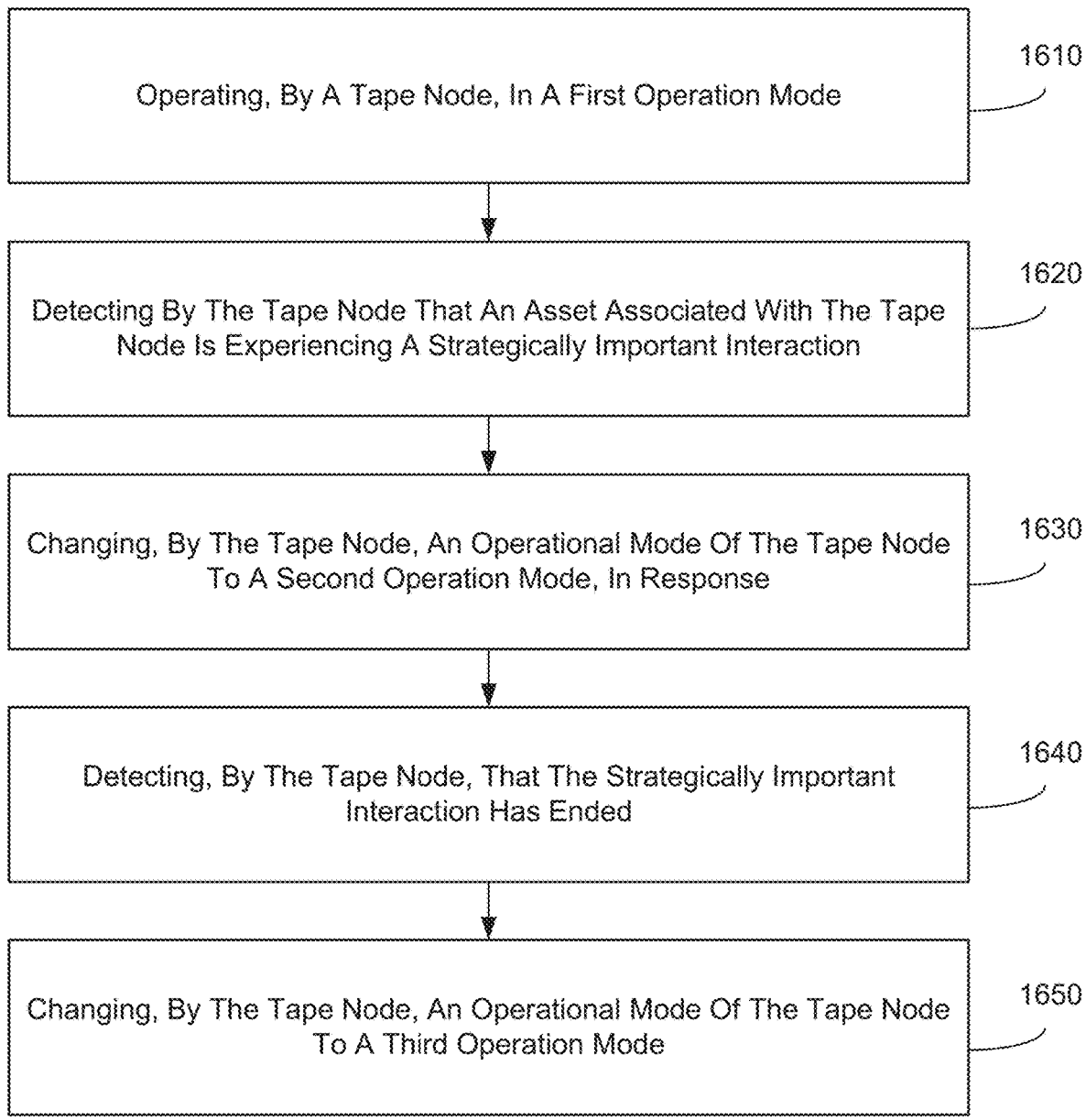
FIG. 16 is flow diagram of a method for altering the behavior of a tape node in response to detecting that an asset associated with the tape node is experiencing a strategically important interaction, according to some embodiments.

FIG. 16 is flow diagram of a method 1601 for altering the behavior of a tape node in response to detecting that an asset associated with the tape node is experiencing a strategically important interaction, according to some embodiments. The method 1601 includes operating, by a tape node, in a first operation mode, prior to the strategically important interaction. For example, the strategically important interaction may be a crane lifting and/or transporting the associated asset, as shown in FIG. 15. The tape node detects 1620 that the asset is experiencing a strategically important interaction. The detection 1620 may be based on wireless communications with one or more other wireless nodes, such as the gateway nodes 1520 shown in FIG. 15. In response to detecting the strategically important interaction, the tape node changes 1630 the operation mode of the tape node to a second operation mode. At a later time, the strategically important interaction ends. The tape node detects 1640 that the strategically important interaction has ended. In the example of FIG. 15, this may be detected based on detecting that the RSSI for communications between the tape node 1540 and the gateway nodes 1520 corresponds to distances greater than distances associated with the lifting frame 1515 being attached to the container 1530. In response, the tape node changes 1650 the operation mode of the tape node to a third operation mode.

The first mode, the second mode, and the third mode may include, but are not limited to, the following modes: a low communication mode where the asset node communicates with a first low frequency, a high communication mode where the asset node communicates with a second high frequency that is higher than the first low frequency, a stealth mode where the asset node restricts itself from making wireless transmissions, a sensor activation mode where a sensor of the asset node is activated and collects data, a sensor deactivation mode where a sensor of the asset node is deactivated and does not collect data, a high power mode where the asset node is configured to consume a high level of power, a low power mode where the asset node is configured to conserve battery or energy reserves by restricting power consumption to a low level of power lower than the high level, a hibernation mode where the asset node reduces the active functions of the asset node, a non-stealth mode where the asset node is configured to make wireless transmissions, other modes, and some combination thereof. The modes and the logic for transitioning between different modes may be part of a distributed intelligent software that is partially contained in the asset node. The distributed intelligent software is described in further detail in U.S. Patent Application No.

Figure 17:
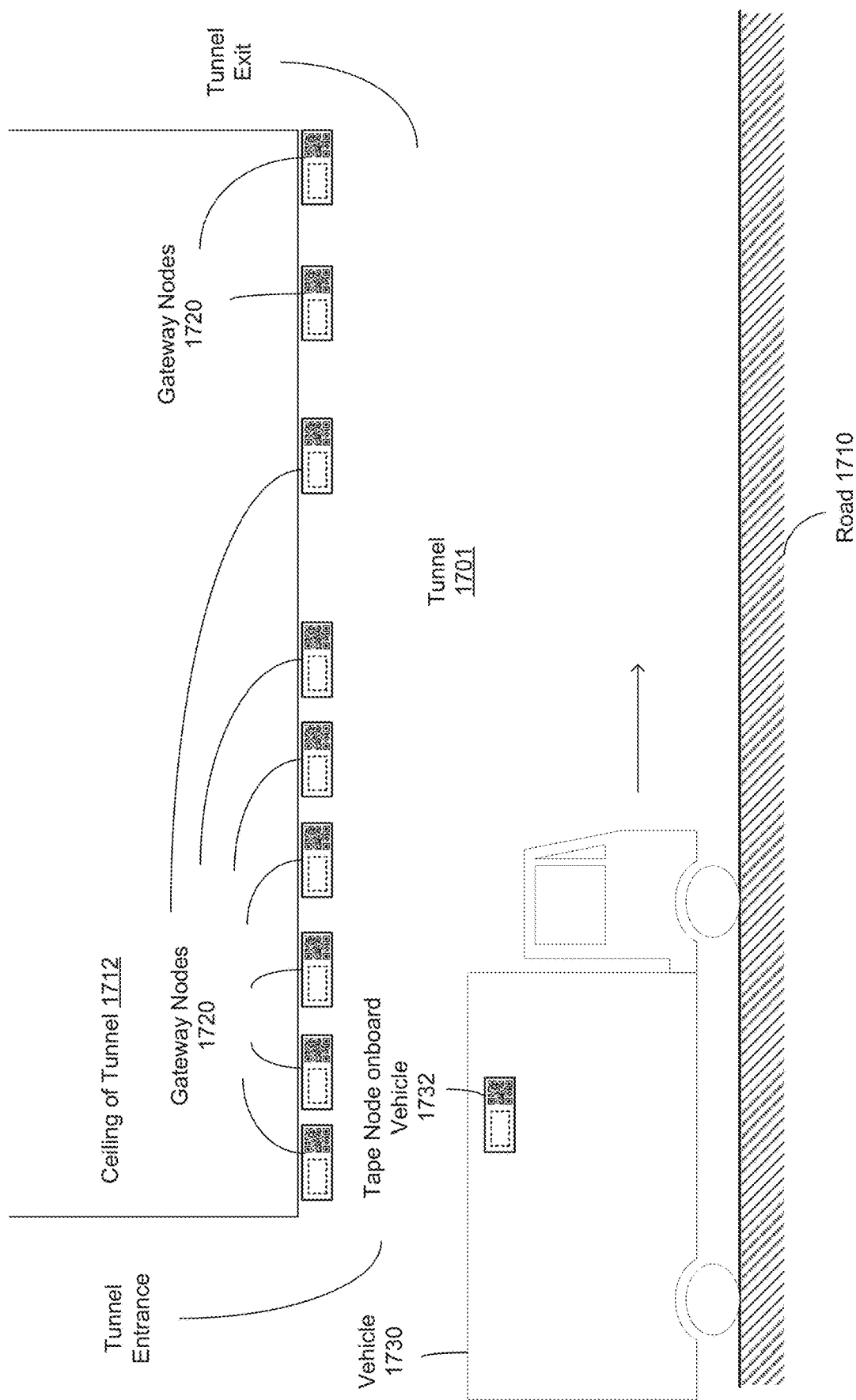
FIG. 17 is an example diagram of tracking a vehicle or moving object traveling through a high speed area monitored by a plurality of gateway nodes, according to some embodiments.

FIG. 17 is an example diagram of tracking a vehicle 1732 or moving object traveling through a high-speed area monitored by a plurality of gateway nodes 1720, according to some embodiments. In the example of FIG. 17, the high-speed area is a tunnel 1701 in which a vehicle 1730 passes through at a high speed. For example, the vehicle 1730 may travel through the tunnel at a speed greater than 15 miles per hour. In other examples, the vehicle 1730 travels through the high-speed area at a speed greater than 50 miles per hour.

Inside the tunnel 1701, communication system onboard the vehicle 1730 may not have wireless reception and may not be able to connect to various wireless networks. This may include the tape node 1732 not being able to receive or transmit data using cellular networks, GPS networks, satellite networks, or other networks, for example. The location of the vehicle 1730 may be determined using communications between the tape node 1732 and one or more of the gateway nodes 1720. The gateway nodes are located inside the tunnel, for example on the ceiling of the tunnel 1712 as shown in FIG. 17. In other embodiments, the gateway nodes are located elsewhere inside the tunnel 1701.

Prior to entering the tunnel, the tape node 1732 may operate in a first operation mode. For example, the first operation mode may include performing a particular wireless communication activity with available gateway nodes, such as the gateway nodes 1720 at a first frequency. For example, the first frequency may be once every 5 minutes.

When the tape node 1732 detects that the vehicle 1730 is within a threshold distance from the entrance of the tunnel prior to entering the tunnel 1701 or has entered the tunnel, the tape node 1732 changes its operation mode to a second operation mode. For example, the second operation mode may include performing a particular wireless communication activity with available gateway nodes, such as the gateway nodes 1720 at a second frequency higher than the first frequency. For example, the second frequency may be once every 20 seconds. The location and trajectory of the vehicle relative to the tunnel may be determined based on wireless communications between the tape node 1730 and the gateway nodes 1720, as also described above with respect to FIGS. 11A-11F.

Since the vehicle is moving at high speeds, if the frequency of communication is too low, the vehicle may pass through the tunnel without tracking its location with a high precision or granularity. By increasing the communication frequency, the location of the vehicle 1730 determined based on communications between the tape node 1732 and the gateway nodes 1720 may be more precise.

Additionally, at the first frequency, the vehicle 1730 may enter the tunnel before the tape node can detect that it is about to enter the tunnel. Since multiple gateway nodes are distributed throughout the tunnel 1701 with a density that corresponds to the first frequency and an expected speed of the vehicle 1730 (e.g., a speed limit for the vehicle), the tape node 1732 may nonetheless detect that it is inside the tunnel 1701 based on wireless communications with gateway nodes 1720 that are past the entrance of the tunnel 1701. In some embodiments, the density of gateway nodes distributed inside the tunnel will increase with distance from the tunnel exit. since the tape node 1732 will enter the second operation mode inside the tunnel which has a higher frequency of communication with the gateway nodes 1720, it is less likely that the tape node 1732 will fail to determine its location or fail to connect with one of the gateway node 1720 at a time of wireless communication activity with an available gateway node. The diagram of FIG. 17 shows gateway nodes corresponding to a single direction of travel through the tunnel 1701. In other examples, the tunnel may facilitate travel in both directions and another set of gateway nodes (not shown) may be distributed in locations that correspond to the reverse direction of travel.

Figure 18:
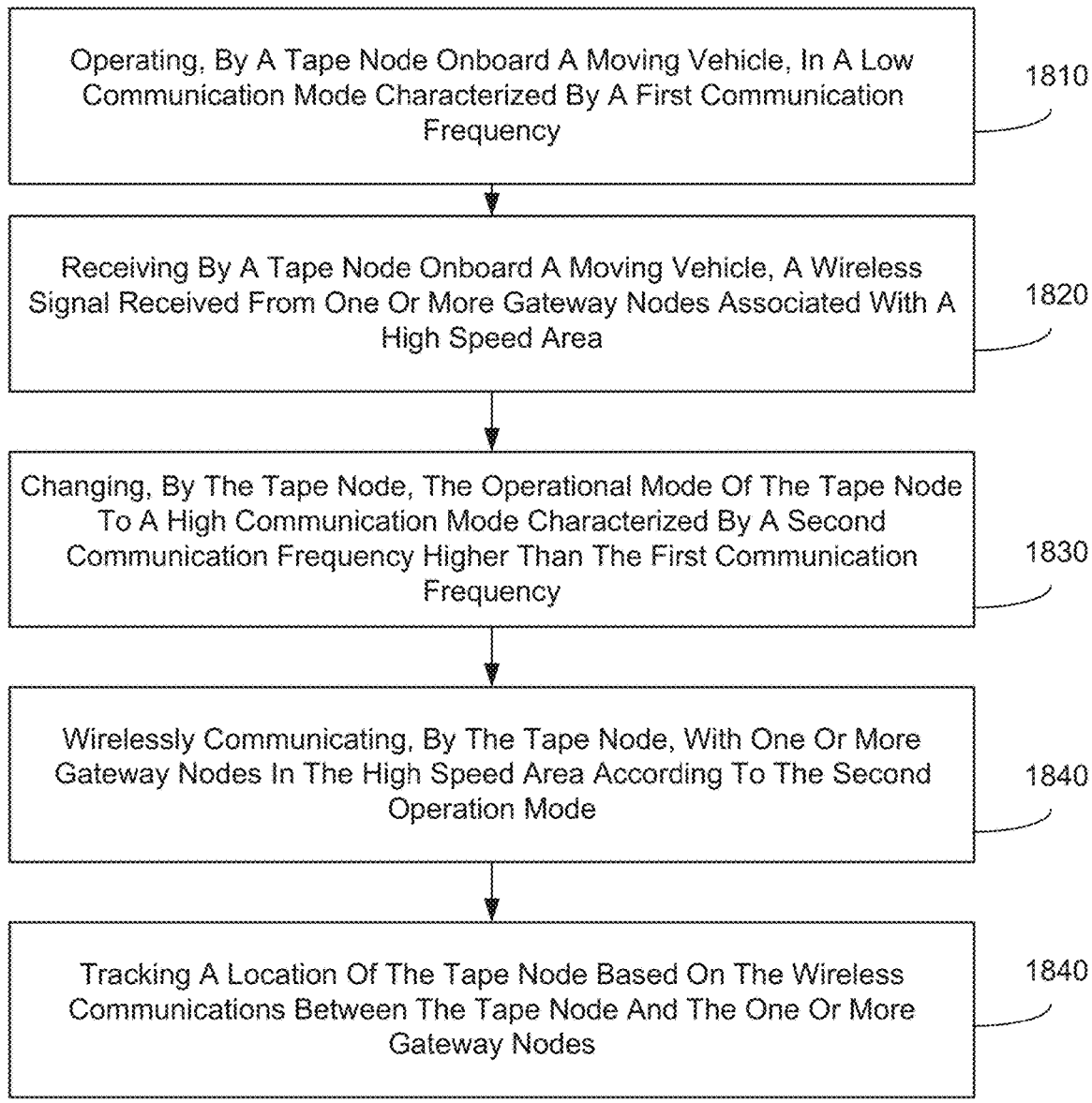
FIG. 18 is a flow diagram of a method for tracking fast moving objects in a high speed area, according to some embodiments.

FIG. 18 is a flow diagram of a method 1801 for tracking fast moving objects in a high-speed area, according to some embodiments. The method 1801 includes operating 1810, by a tape node onboard a moving object, in a low communication mode characterized by a first communication frequency. In some embodiments, the moving object is a vehicle. The moving object travels through a high-speed area where multiple gateway nodes are distributed throughout the high-speed area along the direction of the moving object's travel. The moving object may be traveling at a high speed while in the high-speed area, for example at a speed greater than 50 miles per hour. When the moving object is inside the tunnel or within a threshold distance from the tunnel's entrance, the tape node receives 1820 a wireless signal from one or more of the gateway nodes associated with the high-speed area. Based on the received wireless signals, the gateway node determines that it has entered or is about to enter the high-speed area. In response, the tape node changes 1830 the operational mode of the tape node to a second operation mode characterized by a second communication frequency higher than the first communication frequency. In other embodiments, the first communication mode and the second communication mode include different modes. The tape node wirelessly communicates 1840 with one or more gateway nodes in the high-speed area according to the second operation mode. The location of the tape node is tracked 1840 by the tape node and/or by the tracking system based on the wireless communications between the tape node and the one or more gateway nodes. In further embodiments, when the moving object exits the high-speed area the tape node detects that the moving object has exited and changes its operational mode to a third operation mode.

Computer Apparatus

Figure 19:
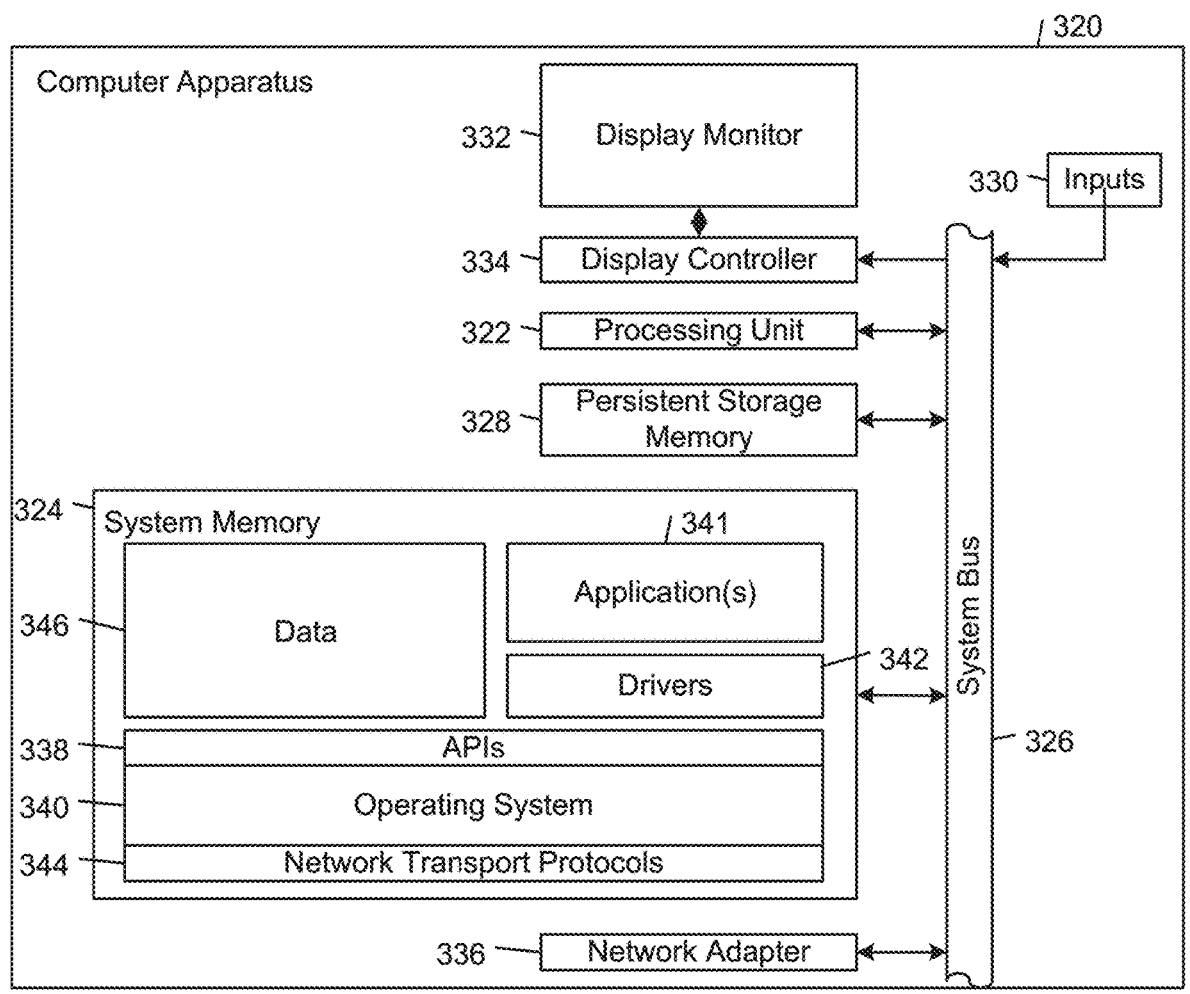
FIG. 19 shows an example embodiment of computer apparatus, according to some embodiments.

FIG. 19 shows an example embodiment of computer apparatus 320 that, either alone or in combination with one or more other computing apparatus, is operable to implement one or more of the computer systems described in this specification.

The computer apparatus 320 includes a processing unit 322, a system memory 324, and a system bus 326 that couples the processing unit 322 to the various components of the computer apparatus 320. The processing unit 322 may include one or more data processors, each of which may be in the form of any one of various commercially available computer processors. The system memory 324 includes one or more computer-readable media that typically are associated with a software application addressing space that defines the addresses that are available to software applications. The system memory 324 may include a read only memory (ROM) that stores a basic input/output system (BIOS) that contains start-up routines for the computer apparatus 320, and a random access memory (RAM). The system bus 326 may be a memory bus, a peripheral bus or a local bus, and may be compatible with any of a variety of bus protocols, including PCI, VESA, Microchannel, ISA, and EISA. The computer apparatus 320 also includes a persistent storage memory 328 (e.g., a hard drive, a floppy drive, a CD ROM drive, magnetic tape drives, flash memory devices, and digital video disks) that is connected to the system bus 326 and contains one or more computer-readable media disks that provide non-volatile or persistent storage for data, data structures and computer-executable instructions.

A user may interact (e.g., input commands or data) with the computer apparatus 320 using one or more input devices 330 (e.g. one or more keyboards, computer mice, microphones, cameras, joysticks, physical motion sensors, and touch pads). Information may be presented through a graphical user interface (GUI) that is presented to the user on a display monitor 332, which is controlled by a display controller 334. The computer apparatus 320 also may include other input/output hardware (e.g., peripheral output devices, such as speakers and a printer). The computer apparatus 320 connects to other network nodes through a network adapter 336 (also referred to as a "network interface card" or NIC).

A number of program modules may be stored in the system memory 324, including application programming interfaces 338 (APIs), an operating system (OS) 340 (e.g., the Windows® operating system available from Microsoft Corporation of Redmond, Washington U.S.A.), software applications 341 including one or more software applications programming the computer apparatus 320 to perform one or more of the steps, tasks, operations, or processes of the locationing and/or tracking systems described herein, drivers 342 (e.g., a GUI driver), network transport protocols 344, and data 346 (e.g., input data, output data, program data, a registry, and configuration settings).

Examples of the subject matter described herein, including the disclosed systems, methods, processes, functional operations, and logic flows, can be implemented in data processing apparatus (e.g., computer hardware and digital electronic circuitry) operable to perform functions by operating on input and generating output. Examples of the subject matter described herein also can be tangibly embodied in software or firmware, as one or more sets of computer instructions encoded on one or more tangible non-transitory carrier media (e.g., a machine readable storage device, substrate, or sequential access memory device) for execution by data processing apparatus.

The details of specific implementations described herein may be specific to particular embodiments of particular inventions and should not be construed as limitations on the scope of any claimed invention. For example, features that are described in connection with separate embodiments may also be incorporated into a single embodiment, and features that are described in connection with a single embodiment may also be implemented in multiple separate embodiments. In addition, the disclosure of steps, tasks, operations, or processes being performed in a particular order does not necessarily require that those steps, tasks, operations, or processes be performed in the particular order; instead, in some cases, one or more of the disclosed steps, tasks, operations, and processes may be performed in a different order or in accordance with a multi-tasking schedule or in parallel.

Other embodiments are within the scope of the claims.
Additional Configuration Information The foregoing description of the embodiments of the disclosure have been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A method comprising:
receiving, by the wireless sensing system, a first set of data describing signal strength between a tape node associated with an asset and a first node associated with a first portion of an area;
receiving, by the wireless sensing system, a second set of data describing signal strength between the tape node and a second node associated with a second portion of an area different from the first portion;
determining, by the wireless sensing system, based at least in part on the first set of data and the second set of data, a path of the tape node associated with the asset.

2. The method of claim 1, wherein the first set of data comprises a first peak of signal strength at a first time, the second set of data comprises a second peak of signal strength at a second time, and the determining is performed based at least in part on the first and second times.

3. The method of claim 2, wherein the first time is the same as the second time and the path of the tape node is determined to be perpendicular to locations of the first and second nodes of the wireless sensing system.

4. The method of claim 3, wherein the path of the tape node being perpendicular to locations of the first and second nodes of the wireless sensing system corresponds to the path of the tape node being past a gateway, room, entrance, or area of interest.

5. The method of claim 2, wherein the first time is before the second time and the path of the tape node is determined to be parallel to the locations of the first and second nodes of the wireless sensing system.

6. The method of claim 5, wherein the path of the tape node being parallel to the locations of the first and second nodes of the wireless sensing system corresponds to the path of the tape node being into or out of a gateway, room, entrance, or area of interest.

7. The method of claim 1, wherein the wireless sensing system determines a region around a gateway, a room, an entrance, or an area of interest is a strategically important zone based at least in part on a plurality of mobile assets having respective paths into, out of, around, or through the gateway, room, entrance, or area of interest, wherein a strategically important zone corresponds to an area where the asset is likely to experience an event.

8. The method of claim 7, wherein the wireless sensing system applies a clustering algorithm to the respective paths of the plurality of mobile assets to determine the strategically important area.

9. The method of claim 7, further comprising responsive to determining that the path of the mobile asset, transmitting, by the wireless sensing system, an instruction to the tape node associated with the mobile asset to modify one or more operations.

10. The method of claim 9, wherein the instruction to modify one or more operations includes one or more of: an instruction to enter a gate detection mode; an instruction to increase a frequency of communication; an instruction to decrease a frequency of communication; an instruction to enter a hibernation mode; an instruction to activate a particular form of communication.

11. The method of claim 1, wherein receiving the first set of data is performed by the first node of the wireless sensing system, and wherein receiving the second set of data is performed by the second node of the wireless sensing system.

12. A tracking system for tracking movement of assets through a strategically important zone comprising:
one or more wireless gateway nodes associated with the strategically important zone configured to wirelessly communicate with wireless asset nodes associated with assets moving into, out of, or around the strategically important zone;
a wireless asset node associated with an asset and configured to wirelessly communicate with other wireless nodes of the tracking system, wherein
a trajectory of the wireless asset node is determined based on wireless communications between the wireless asset node and at least one of the one or more gateway nodes, and
based on the determined trajectory, the tracking system detects if the wireless asset node enters or exits the strategically important zone,
wherein the strategically important zone corresponds to a geofenced area that is determined based on a clustering algorithm or based on information received from users of the tracking system.

13. The tracking system of claim 12, wherein the asset is one or more of a parcel, a container, a piece of equipment, a medical device, and a vehicle.

14. The tracking system of claim 12, wherein
outside of the strategically important zone, the wireless asset node is configured to operate according to a first operation mode, and
inside of the strategically important zone, the wireless asset node is configured to operate according to a second operation mode.

15. The tracking system of claim 14, wherein one or more the first operation mode and the second operation mode comprises a stealth mode, the stealth mode restricting the wireless asset node from performing wireless transmissions.

16. The tracking system of claim 14, wherein one or more of the first operation mode and the second operation mode comprises a private mode, the privacy mode restricting the tracking of location data by the tracking system and restricting the wireless asset node from transmitting or storing the location of the asset while in the private mode.

17. A method comprising:
operating, by a first wireless node of a tracking system, in a first operation mode;
detecting, by the first wireless node, an interaction between an asset associated with the first wireless node and another object, a person, or an environment, based on wireless communications with one or more second wireless nodes associated with the other object, person, or environment;
responsive to detecting the interaction, operating, by the first wireless node, according to a second operation mode during the interaction.

18. The method of claim 17, wherein
the asset is a container,
the other object, person or environment is a crane, and
the interaction comprises the crane lifting or transporting the asset.

19. The method of claim 17, wherein
the first operation mode is characterized by the first wireless node performing a wireless communication activity with available second wireless nodes with a first frequency of communication, and
the second operation mode is characterized by the first wireless node performing the wireless communication activity with a second frequency higher than the first frequency.

* * * * *